US012206543B2

(12) United States Patent
Demir et al.

(10) Patent No.: US 12,206,543 B2
(45) Date of Patent: Jan. 21, 2025

(54) TRANSPARENCY WINDOW AWARE SEQUENCE SELECTION AND TRANSMISSION PROCEDURE FOR DEVICE DISCOVERY AND RANGE ESTIMATION

(71) Applicant: InterDigital Patent Holdings, Inc., Wilmington, DE (US)

(72) Inventors: Alpaslan Demir, East Meadow, NY (US); Tanbir Haque, Jackson Heights, NY (US); Ravikumar Pragada, Warrington, PA (US); Hussain Elkotby, Conshohocken, PA (US); Mahmoud Abdelgelil, San Diego, CA (US); Patrick Cabrol, Bayshore, NY (US)

(73) Assignee: InterDigital Patent Holdings, Inc, Wilmington, DE (US)

( * ) Notice: Subject to any disclaimer, the term of this patent is extended or adjusted under 35 U.S.C. 154(b) by 350 days.

(21) Appl. No.: 17/795,773

(22) PCT Filed: Jan. 28, 2021

(86) PCT No.: PCT/US2021/015443
§ 371 (c)(1),
(2) Date: Jul. 27, 2022

(87) PCT Pub. No.: WO2021/154960
PCT Pub. Date: Aug. 5, 2021

(65) Prior Publication Data
US 2023/0093950 A1 Mar. 30, 2023

Related U.S. Application Data

(60) Provisional application No. 63/051,533, filed on Jul. 14, 2020, provisional application No. 62/967,718, filed on Jan. 30, 2020.

(51) Int. Cl.
*H04L 27/06* (2006.01)
*H04L 27/26* (2006.01)

(52) U.S. Cl.
CPC ........ *H04L 27/266* (2013.01); *H04L 27/2659* (2013.01); *H04L 27/2695* (2013.01)

(58) Field of Classification Search
CPC .............. H04L 27/266; H04L 27/2659; H04L 27/2695; H04L 7/033; H04L 27/2663;
(Continued)

(56) References Cited

U.S. PATENT DOCUMENTS

2007/0071123 A1\* 3/2007 Charbit ............... H04L 27/2675
375/260
2009/0310524 A1\* 12/2009 Katsube .............. H04L 27/3854
375/322

(Continued)

OTHER PUBLICATIONS

C.A. Balanis, "Antenna Theory: Analysis and Design," Third Ed. John Wiley & Sons, Inc. 2005, ISBN: 0-471-66782-X, CH14. https://books.google.fr/books?id=jwjeAwAAQBAJ&printsec=frontcover&dq=C.A.+Balanis,+%E2%80%9CAntenna+Theory:+Analysis+and+Design%22&hl=fr&sa=X&ved=0ahUKEwiP3pC9h-0AhUNBGMBHThtA304HhDoAQgnMAA#v=onepage&q=C.A.%20Balanis%2C%20%E2%80%9CAntenna%20Theory%3A%20Analysis%20and%20Design%22&f=false abstract 5 pages.

(Continued)

*Primary Examiner* — Atique Ahmed
(74) *Attorney, Agent, or Firm* — Flaster Greenberg P.C.

(57) ABSTRACT

A method for initial timing synchronization for a WTRU to communicate with a network includes receiving an in-channel narrowband synchronization sequence from the network to enable initial coarse timing synchronization, determining coarse timing offset and a range between a beam source of a network transmitter and the WTRU, (Continued)

selecting a wideband sequence for fine timing synchronization using the estimated range, transmitting the selected wideband sequence for fine timing synchronization during an uplink timing occasion, receiving from the network a transmission of the selected wideband sequence for fine timing synchronization, and establishing fine timing synchronization between the WTRU and the network using the selected sequence.

20 Claims, 50 Drawing Sheets

(58) Field of Classification Search
CPC .............. H04L 27/2665; H04L 27/2675; H04L 27/2692; H04L 27/06; H01Q 9/0414; H01Q 9/0457; H01Q 19/005; H01Q 21/065; H04W 56/0015; H04W 56/004; H04W 64/006; H04B 7/0695; H04B 7/088

See application file for complete search history.

(56) References Cited

U.S. PATENT DOCUMENTS

| | | | | |
|---|---|---|---|---|
| 2010/0046494 | A1* | 2/2010 | Palanki | H04W 56/0015 370/344 |
| 2014/0270024 | A1* | 9/2014 | Papadimitriou | H04L 27/2675 375/355 |
| 2018/0006794 | A1* | 1/2018 | Lee | H04L 5/14 |
| 2020/0396703 | A1* | 12/2020 | Luo | H04W 74/0833 |

OTHER PUBLICATIONS

H. Takahashi, T. Kosugi, A. Hirata, K. Murata, and N. Kukutsu, "10-Gbit/s quadrature phase-shift-keying modulator and demodulator for 120-GHz-band wireless links," IEEE Trans. Microw. Theory Tech., vol. 58, No. 12, pp. 4072-4078, 2010 > other source.
S. Moghadami, F. Hajilou, p. Agrawal and S. Ardalan, "A 210 GHz Fully-Integrated OOK Transceiver for Short-Range Wireless Chip-to-Chip Communication in 40 nm CMOS Technology," in IEEE Transactions on Terahertz Science and Technology, vol. 5, No. 5, pp. 737-741, Sep. 2015. doi: 10.1109/TTHZ.2015.2459673.
Wang L, Guo YX, Sheng WX. Wideband high-gain 60-GHz LTCC L-probe patch antenna array with a soft surface. IEEE Transactions on Antennas and Propagation. 2013;61(4): 1802-1809.
Xia Qing et al., "A Link-Layer Synchronization and Medium Access Control Protocol for Terahertz-Band Communication Networks", 2015 IEEE Global Communications Conference, IEEE, Dec. 6, 2015, pp. 1-7.

FCC 18-17 (adopted Feb. 22, 2018) https://docs.fcc.gov/public/attachments/FCC-18-17A1.pdf internet, 74 pages.
Hall, P. S. Multi-octave bandwidth log-periodic microstrip antenna array. IEE Proceedings—Microwaves, Antennas and Propagation. 1986;133(2):127-136.
C. Han, A. O. Bicen and I. F. Akyildiz, "Multi-Ray Channel Modeling and Wideband Characterization for Wireless Communications in the Terahertz Band," in IEEE Transactions on Wireless Communications, vol. 14, No. 5, pp. 2402-2412, May 2015.
R. Han et al., "A 280-GHz Schottky Diode Detector in 130-nm Digital CMOS," in IEEE Journal of Solid-State Circuits, vol. 46, No. 11, pp. 2602-2612, Nov. 2011.doi: 10.1109/JSSC.2011.2165234.
https://books.google.fr/books?id=XZ0vDwAAQBAJ&pg=PA249&dq=Kumar+G,+Ray+KP.+%22Broadband+Microstrip+Antennas%22&hl=fr&sa=X&ved=0ahUKEwinmd7UjO_oAhWs0eAKHV1wCo8Q6AEIKjAA#v=onepage&q=Kumar%20G%2C%20Ray%20KP.%20%22Broadband%20Microstrip%20Antennas%22&f=false, Kumar G, Ray KP. Broadband Microstrip Antennas. Artech House; Boston; 2003 abstract 6 pages.
https://books.google.fr/books?id=jU3UBwAAQBAJ&printsec=frontcover&dq=%22Microstrip+Patch+Antennas:+A +Designer%27s+Guide%22&hl=fr&sa=X&ved=0ahUKEwjp99C1jO_oAhW950AKHVo1ATYQ6AEILzAA#v=onepage&q=%22Microstrip%20Patch%20Antennas%3A%20A%20Designer's%20Guide%22&f=false, Waterhouse RB. Microstrip Patch Antennas: A Designer's Guide. Springer Science & Business Media; New York; 2003 abstract 9 pages.
S. V. Thyagarajan, S. Kang and A. M. Niknejad, "A 240 GHz Fully Integrated Wideband QPSK Receiver in 65 nm CMOS," in IEEE Journal of Solid-State Circuits, vol. 50, No. 10, pp. 2268-2280, Oct. 2015.doi: 10.1109/JSSC.2015.2467216.
Petrov, Vitaly, et al. "Terahertz band communications: Applications, research challenges, and standardization activities." 2016 8th International Congress on Ultra Modern Telecommunications and Control Systems and Workshops (ICUMT). IEEE, 2016.
Anonymous: "High Rate 60GHZ, PHY, MAC, and HDI PAL", Standard ECMA-387, 1st Ed, Dec. 1, 2008, pp. 16pp. 1-328, p. 73.
Boronin, Pavel, et al. "Capacity and throughput analysis of nanoscale machine communication through transparency windows in the terahertz band." Nano Communication Networks 5.3 (2014): 72-82.
Kuo I-S, et al. A dual-frequency L-shaped patch antenna. Microwave and Optical Technology Letters. 2000;27:177-179.
V. Petrov, D. Moltchanov, and Y. Koucheryavy, "On the efficiency of spatial channel reuse in ultra-dense thz networks," in 2015 IEEE Global Communications Conference (GLOBECOM), pp. 1-7, Dec. 2015.

* cited by examiner

Bandwidth Versus Substrate Permittivity

Topology of Proximity Coupled Feed

Bandwidth Enhancement with Dummy Patch of Different Resonance Frequencies

Configuration and Frequency Response of Antenna using Stacking Concept with Parasitic Elements Technique The General Configuration of an Aperture-stacked Patch Antenna Reflection Coefficient of Aperture-stacked Patch Antenna Microstrip Patches in log-periodic Array Formation and VSWR Plot Patch Antenna Fed with an L-shaped Probe & Simulated S11

The Total Path Loss and Transparency Windows in the THz Frequency Band

Path Gain as a Function of Frequency for Separation Distances m

Distance Normalized Path Loss Versus Frequency Range in GHz for a US Standard Atmosphere Self Mixing Architecture Example Known 280 GHz Schottky Diode Detector Sub-THz/THz Molecular Absorption Level vs. Distance Indoor Full Coverage Scenario Example Synchronization Burst(s) Sequences Cluster Based Initial Timing Synchronization Example Example of more Generic Approach to Initial Timing Synchronization Bidirectional Sub-THz/THz Initial Timing Synchronization Example High Level Flow Diagram of Bidirectional Standalone Approach Example High Level Flow Diagram of Flexible UL Transmission DL only Initial Timing Synchronization with Minimum and Maximum Delay Note: The Maximum Delay is Integer Multiples of the Minimum Delay Deployment Scenario Showing Single gNb with Multiple Transmission Reception Points Illustration of UL/DL Scheduling for a Single WTRU OOB Assisted Sub-THz Synchronization Call Flow for a New WTRU Link Establishment Two WTRU Connected Sub-THz Link Flow Chart of the Molecule Detection Procedure/Algorithm Flow Chart of the Range and Equivalent Molecular Absorption Coefficient Estimation Algorithm Exemplary Block Diagram for Range and Equivalent Molecular Absorption Coefficient Estimation Power Spectral Density of a Generated QPSK Code that has the Shaping of C3

Power Spectral Density of a Generated QPSK Code that has the Shaping of C4

TRANSPARENCY WINDOW AWARE SEQUENCE SELECTION AND TRANSMISSION PROCEDURE FOR DEVICE DISCOVERY AND RANGE ESTIMATION

CROSS REFERENCE TO RELATED APPLICATIONS

This application is a U.S. National Stage Application under 35 U.S.C. § 371 of International Patent Application No. PCT/US2021/015443, filed 28 Jan. 2021, which is incorporated herein by reference in its entirety. This application claims the benefit of U.S. provisional patent application No. 62/967,718 filed 30 Jan. 2020, and U.S. provisional patent application No. 63/051,533 filed 14 Jul. 2020, which are incorporated by reference herein in their entirety.

BACKGROUND 5G specifications have increased the range of frequencies and bandwidths that can be used for communications between devices. The use of Terahertz bands represents a challenge for implementation. Some of those challenges include high path loss, antenna development, and methods for implementation of communication links. The present disclosure assists in defining and addressing some of the challenges.

SUMMARY

In one embodiment, a method for initial timing synchronization for a WTRU to communicate with a network includes receiving an in-channel narrowband synchronization sequence from the network to enable initial coarse timing synchronization, determining coarse timing offset and a range between a beam of a network transmitter and the WTRU, selecting a wideband sequence for fine timing synchronization by using the estimated range and wideband communication channel spectral information, transmitting the selected wideband sequence for fine timing synchronization during an uplink timing occasion, receiving from the network a transmission of the selected wideband sequence for fine timing synchronization, and establishing fine timing synchronization between the WTRU and the network using the selected sequence.

In other embodiment, a method for initial timing synchronization for a WTRU to communicate with a network includes receiving a combination of in-channel narrowband and wideband synchronization sequences from the network. The WTRU, determining coarse timing offset and a range between a beam of a network transmitter and the WTRU after detecting an in-channel narrowband sequence, estimating the range between the beam and the WTRU, selecting a set of wideband sequences for fine timing synchronization, receiving a wideband sequence from the network for fine timing synchronization during a downlink timing occasion, synchronization, and establishing fine timing synchronization between the WTRU and the network using the selected sequence.

In another embodiment, parameters of a network link with a first WTRU can be transmitted to a second WTRU using an Out-of-Band link to the second WTRU. The second WTRU can then utilize the parameters to construct a synchronization sequence for a sub-Terahertz or Terahertz link establishment procedure.

Although various embodiments are described and/or claimed herein in which an apparatus, system, device, etc. and/or any element thereof carries out an operation, process, algorithm, function, etc. and/or any portion thereof, it is be understood that any embodiments described and/or claimed herein assume that any apparatus, system, device, etc. and/or any element thereof is configured to carry out any operation, process, algorithm, function, etc. and/or any portion thereof.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref") in the Figures indicate like elements, and wherein.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application. In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Figure 1A:
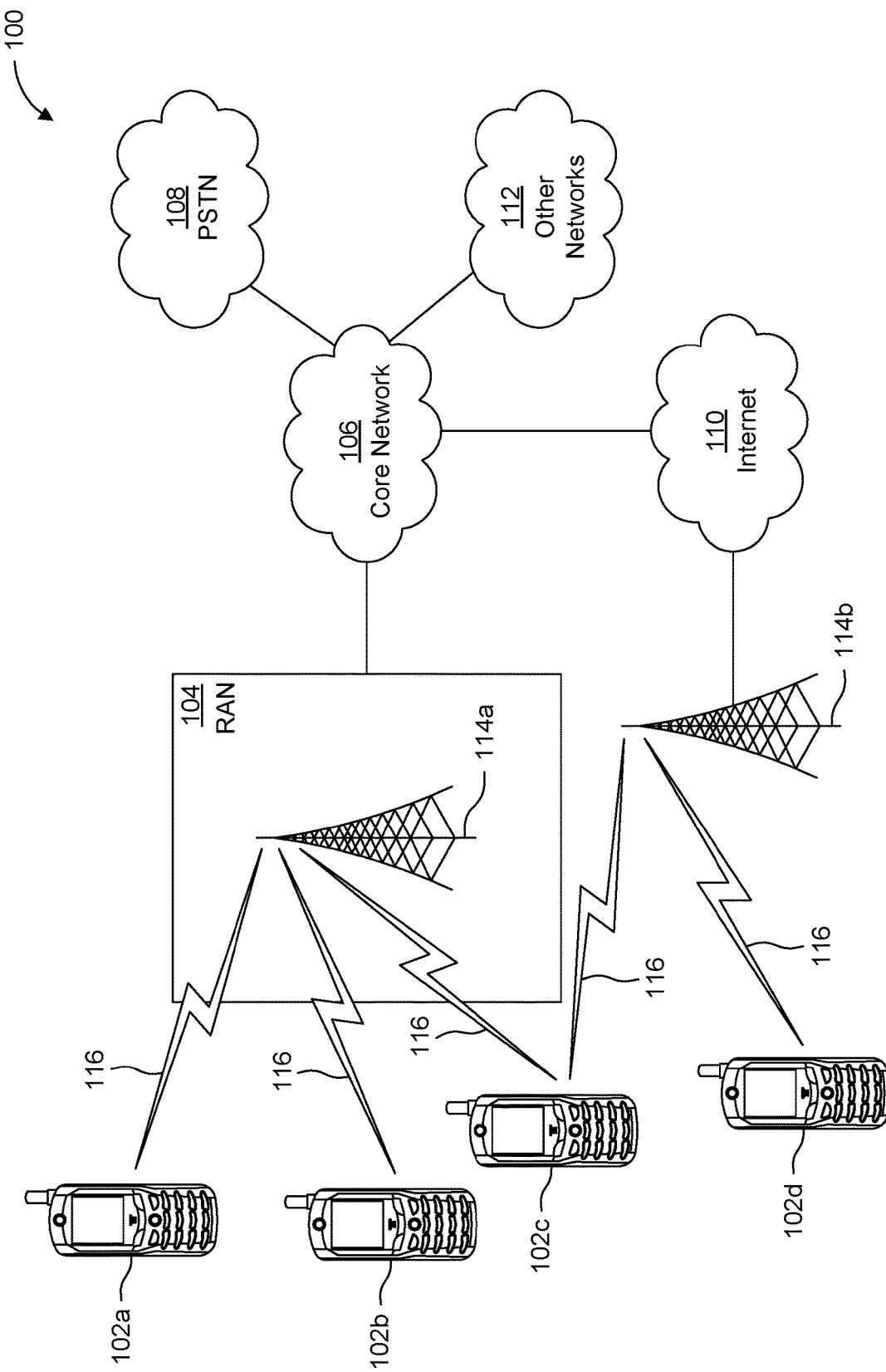
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc.

The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
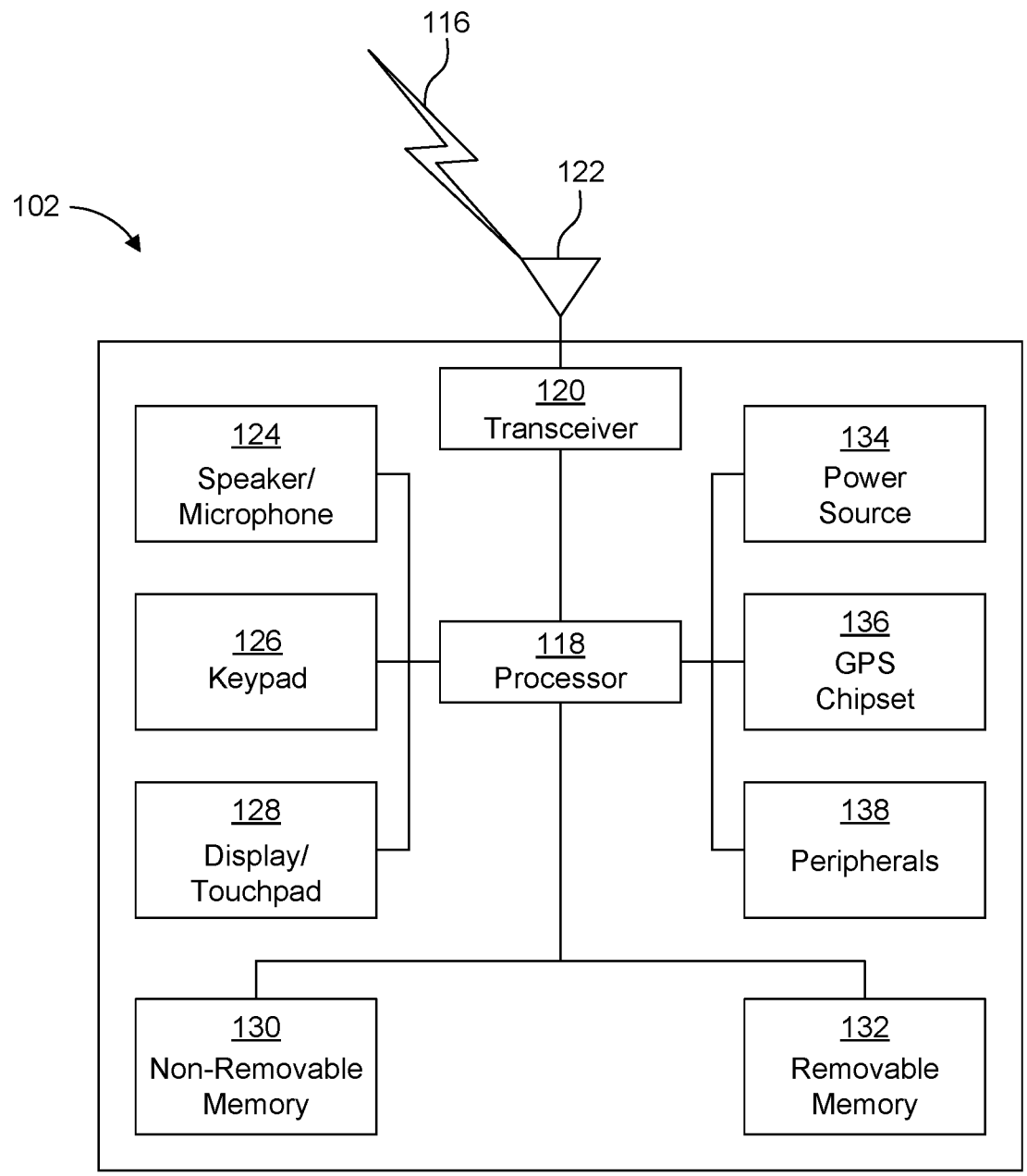
FIG. 1B is a system diagram illustrating an example WTRU that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (UL) (e.g., for transmission) and downlink (DL) (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (UL) (e.g., for transmission) or the downlink (DL) (e.g., for reception)).

Figure 1C:
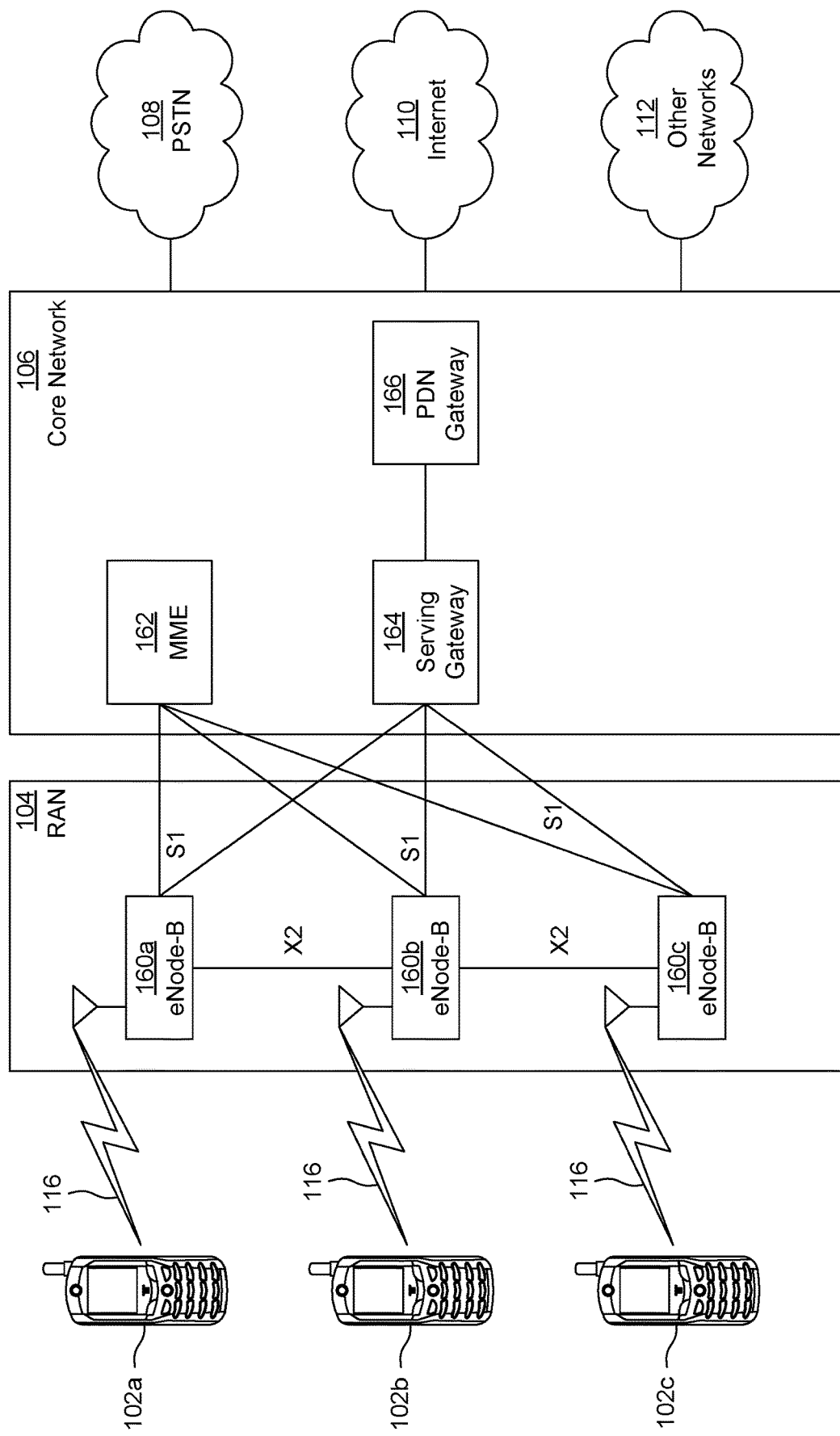
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an Si interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the Si interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
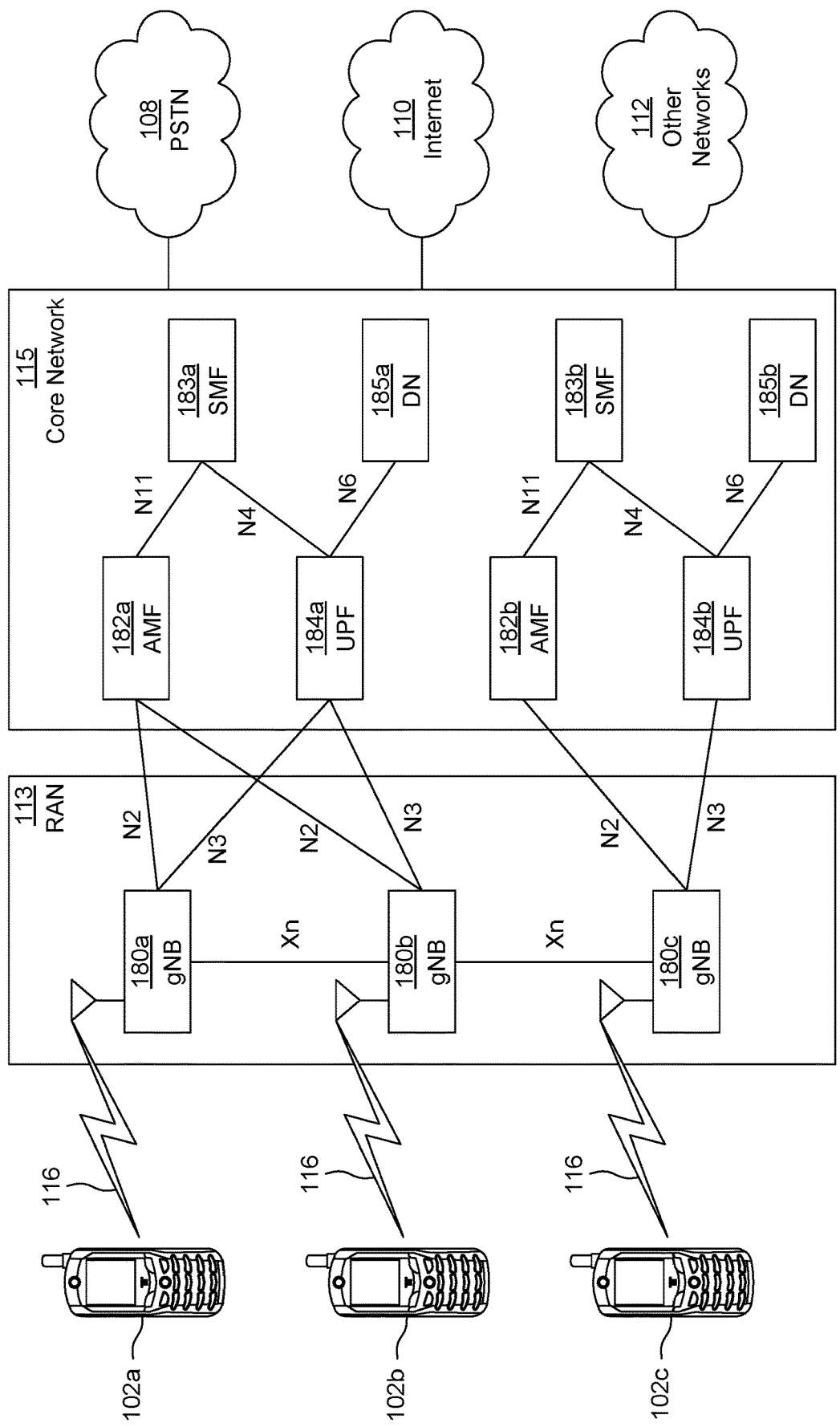
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of (non-access stratum) (NAS) signaling, mobility management, and the like. Network slicing may be used by the AMF 182a, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating WTRU/UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-ab*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Examples provided herein do not limit applicability of the subject matter to other wireless technologies, e.g., using the same or different principles as may be applicable.

As explained herein, a wireless transmit receive unit (WTRU) may be an example of a user equipment (UE). Hence the terms UE and WTRU may be used in equal scope herein.

RF Front-End Capabilities

On Higher Order Modulation for sub-Terahertz Bands

The Terahertz (THz) Band offers a much larger bandwidth ranging from tens of Giga Hertz (GHz) to several THz depending on the transmission distance. However, several challenges need to be overcome such as: high path loss, design of compact THz Band transceivers, development of efficient ultra-broadband antennas, etc.

Currently amplitude shift keying (ASK) modulation schemes are the simplest transceiver architectures that can be implemented at Terahertz, but they offer poor spectral efficiency and low sensitivity. Due to the need for a phase-comparison circuit, the design of a better performing phase shift keying (PSK) demodulator is more complex than that of an ASK demodulator using simple diode-based detectors.

Though, in an article by H. Takahashi, T. Kosugi, A. Hirata, K. Murata, and N. Kukutsu, "10-Gbit/s quadrature phase-shift-keying modulator and demodulator for 120-GHz-band wireless links," IEEE Trans. Microw. Theory Tech vol. 58, no. 12, pp. 4072-4078, 2010, the architecture of a PSK transceiver was simplified by using a differential coherent detection scheme for demodulation where a carrier-recovery circuit was not necessary. In addition, the modulator and demodulator were designed without intermediate-frequency circuits. This example is more of an exception. By far, the lower cost and complexity currently associated with diode-based detectors make ASK based systems make them more attractive for WTRUs operating in the sub-THz bands.

Antenna Systems for Bandwidth Enhancement

Figure 2:
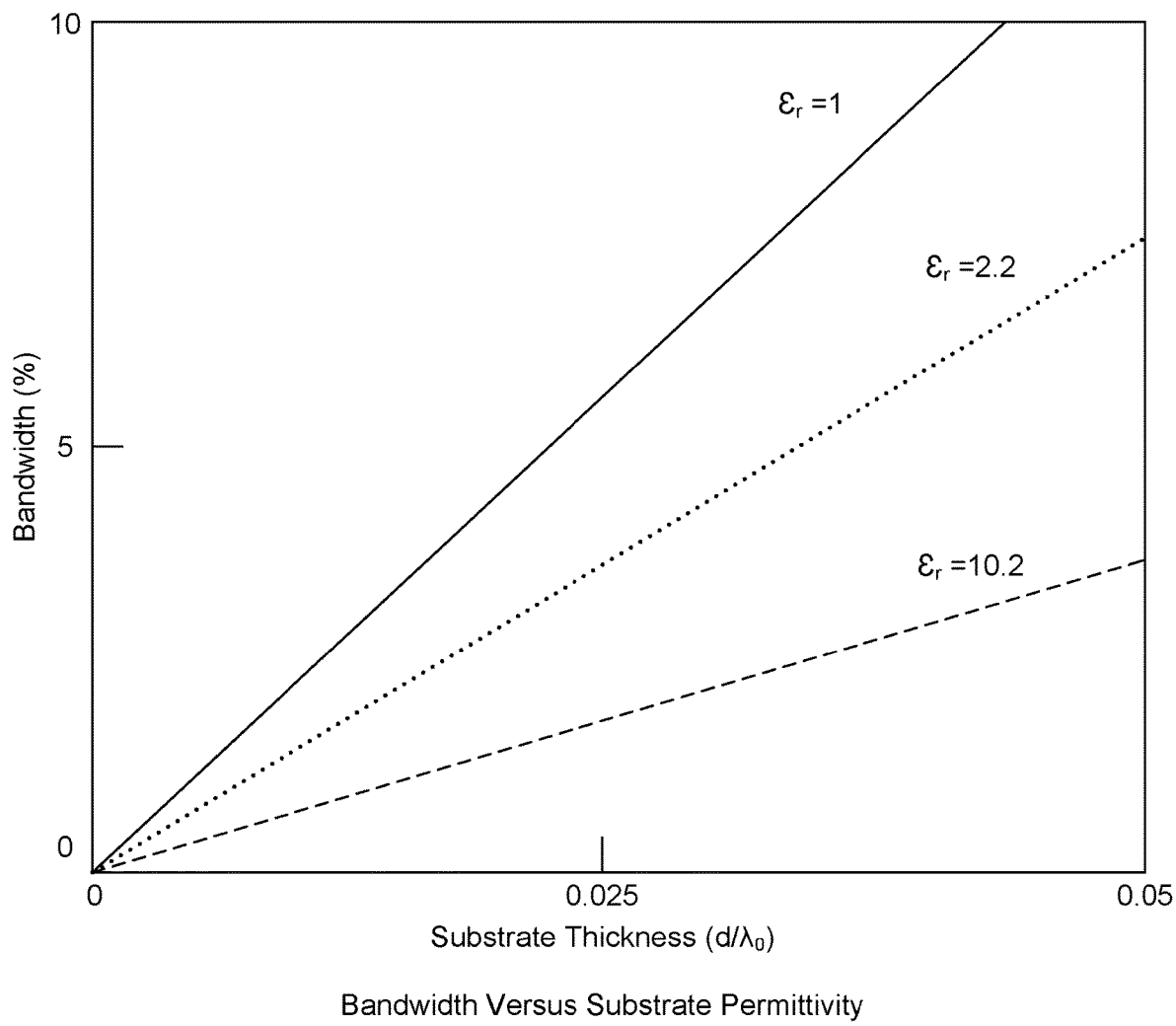
FIG. 2 depicts an example chart of bandwidth versus substrate permittivity.

Conventional microstrip patch antennas are narrow-band structures. As is known in the art, their 3 dB bandwidth is typically on the order of 2-5% relative to the center frequency. This can be attributed to two main factors: (1) the antenna narrowband resonance which is conducive to more efficient radiation and, (2) the generally thin thickness of the antenna substrate, typically less than 0.05λ. A variety of techniques and procedures have been proposed and demonstrated in the literature to increase the 3 dB bandwidth of microstrip patch antennas Intrinsic Techniques Intrinsic techniques applied to improve the bandwidth of a single layer direct fed microstrip patch antenna are known and consist of increasing substrate thickness and decreasing the dielectric constant of the antenna substrate ($\varepsilon_r\sim 1$), as presented in FIG. 2 where the bandwidth of a direct fed single layer microstrip patch versus substrate permittivity and thickness are shown. However, as substrate thickness increases and dielectric constant is reduced, the patch size becomes smaller which provides lower gain. In addition, feed network losses increases and surface waves causes a reduction in antenna radiation efficiency. Accounting for the above limitations, as known in the art, the bandwidth enhancement achievable with these intrinsic techniques cannot exceed 10% which is still not adequate for broadband terahertz applications.

Feeding Techniques

Figure 3:
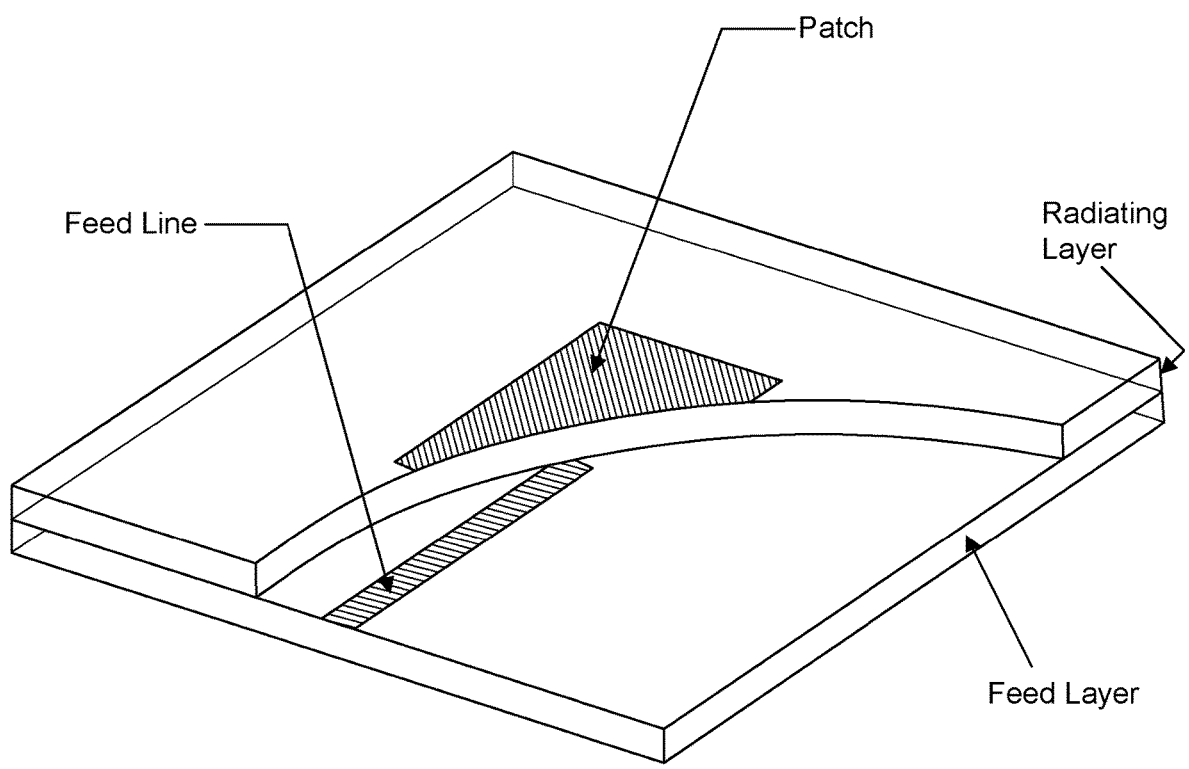
FIG. 3 depicts an example topology of a proximity coupled feed.

By introducing a coupling mechanism between the feed network and patch, a resonance is created in the vicinity of the patch resonance which can result in antenna bandwidth enhancement. FIG. 3 depicts the topology of proximity coupled feed-network. In this feeding mechanism, the fields are coupled to the patch via the open end of a stub. With this method, a bandwidth in the order of 8% can be achieved.

Parasitic Elements

Figure 4:
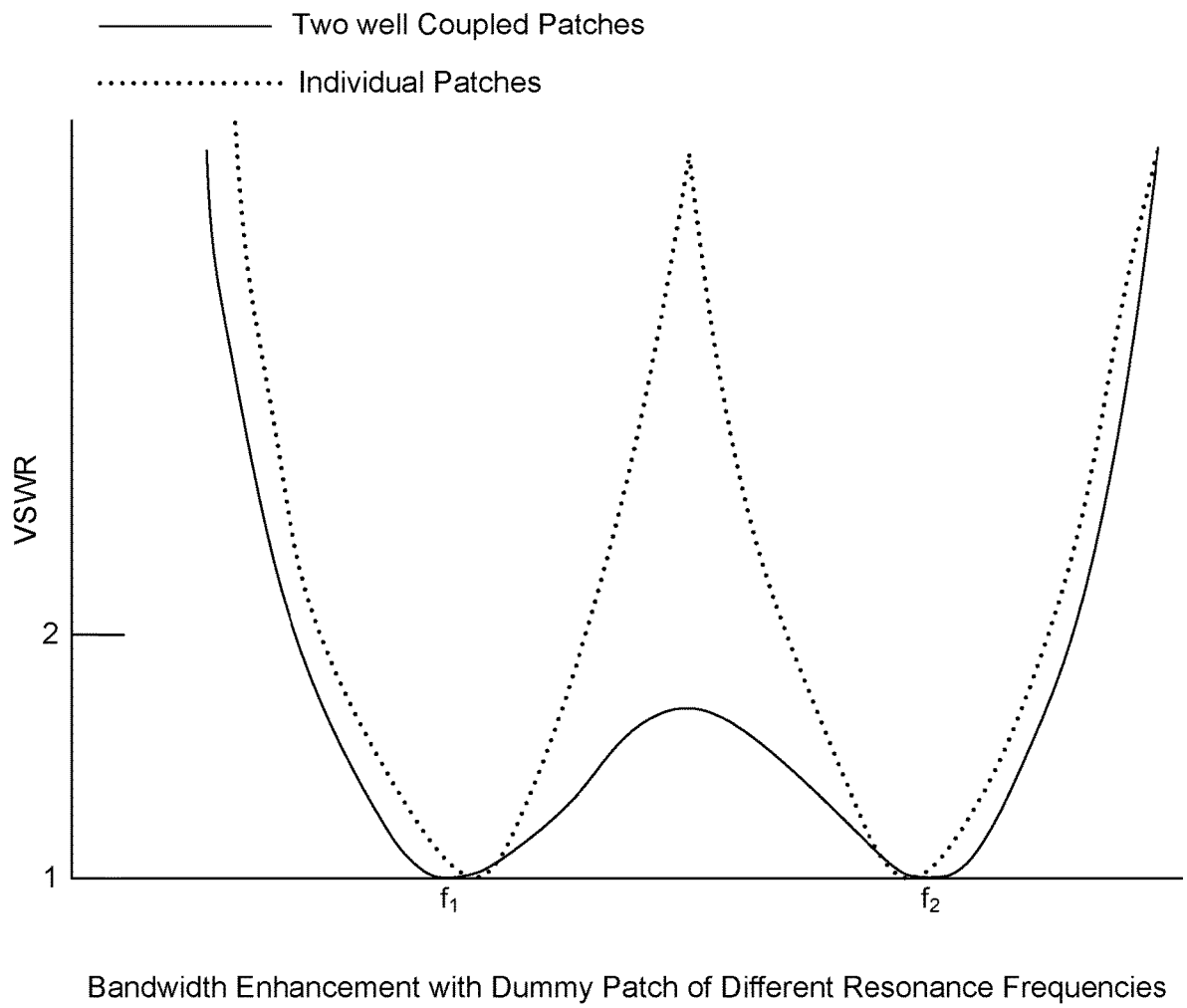
FIG. 4 depicts a bandwidth enhancement with a dummy patch of different resonant frequencies.

The introduction of dummy or parasitic patch elements coupled to the driven element on the same radiating layer, can improve the overall bandwidth of the antenna if the resonant frequency of the coupled elements are slightly different to that of the driven patch since, as shown in FIG. 4, the overall frequency response is the superposition of the frequency responses of individual patches. Using this technique, bandwidth of the order of 20% can be obtained. Similar results can be obtained by coupling the parasitic patches via non-radiating edges or via the four edges or corners.

Stacked Patches

Figure 5:
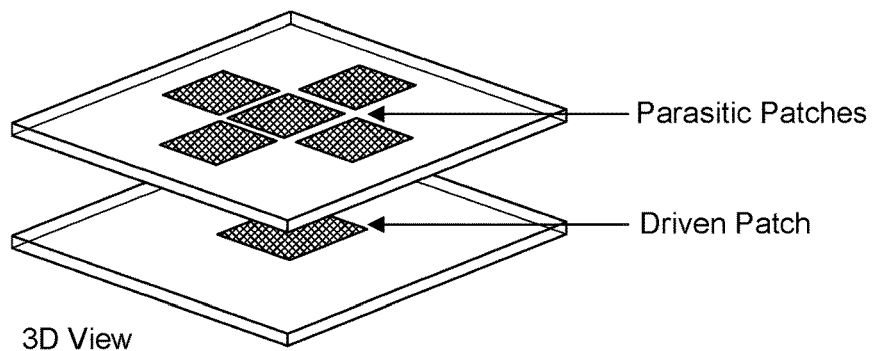
FIG. 5 depicts a configuration and frequency response of antenna using stacking concept with parasitic elements technique.
Figure 5:
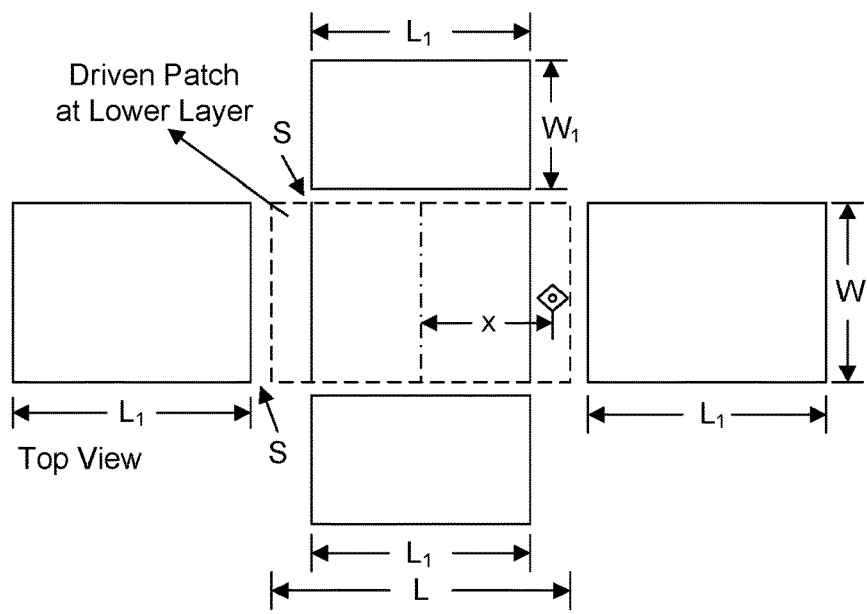
Figure 5:
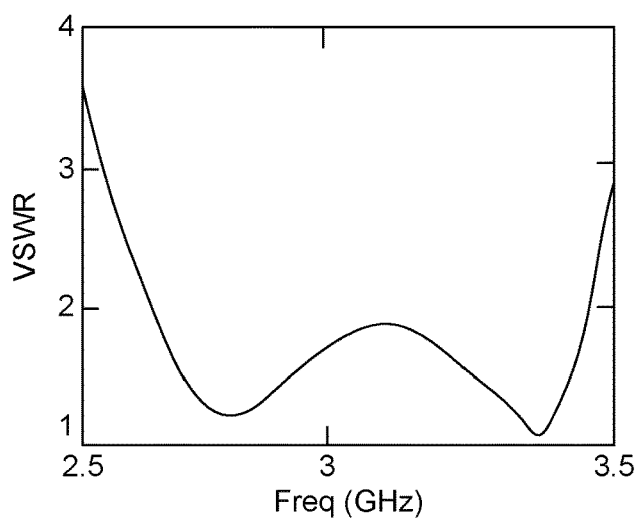

The concept of stacking can also be used with the parasitic elements technique presented above. Placing the driven patch on a lower layer, while the parasitic patches are placed on an upper layer. As known in the art, a 30% bandwidth could be obtained using one rectangular patch on the bottom layer as the driven path and five parasitic rectangular patches placed on the top layer. FIG. 5 shows an example configuration and its frequency response.

Aperture-Stacked Patches

Figure 6:
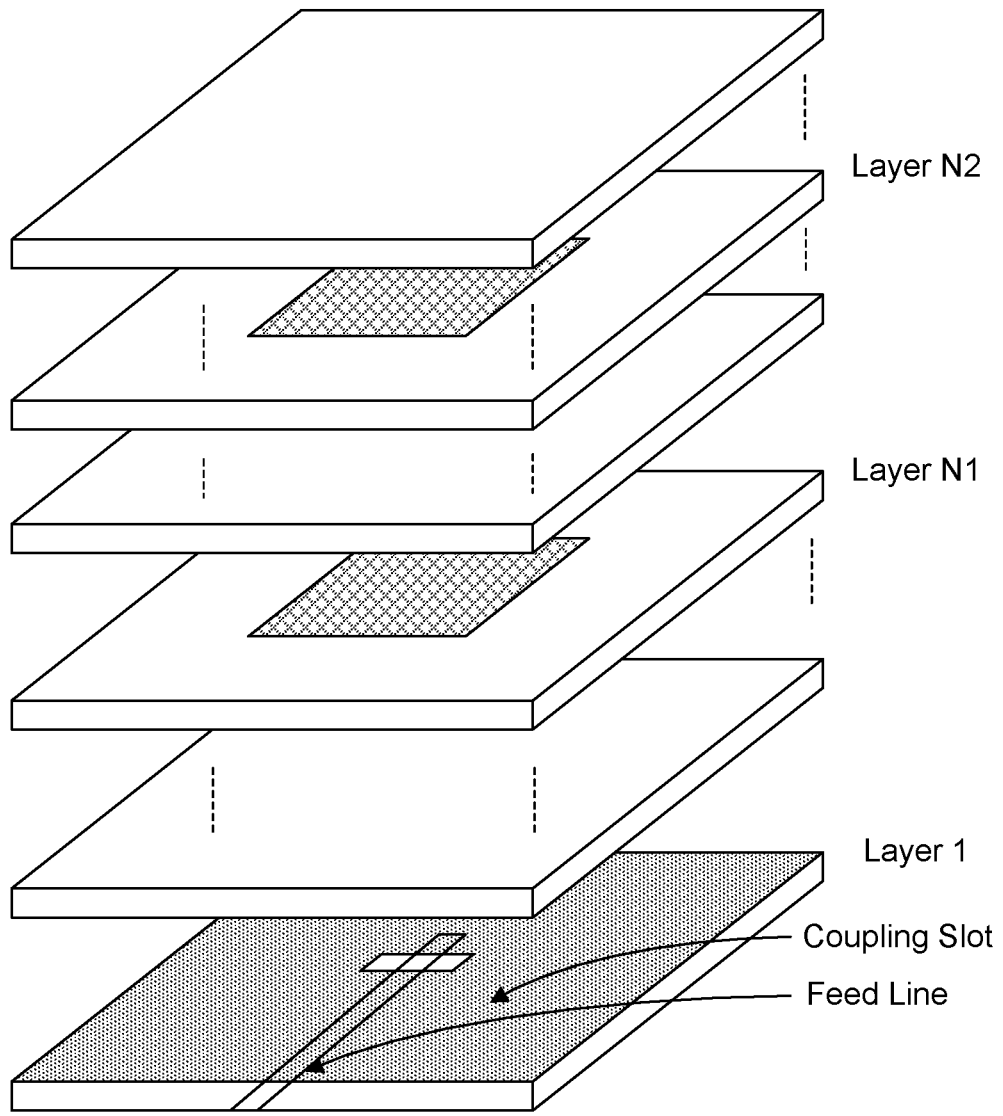
FIG. 6 depicts a general configuration of an aperture-stacked patch antenna.

The aperture-stacked patches are multilayered structures able to achieve bandwidths in the order of 50-70%. FIG. 6 shows the general configuration of an aperture stacked patch antenna. The driven patch (bottom) is fed indirectly introducing one more coupling mechanism (between feed line and driven patch) which results in a wider impedance bandwidth.

Figure 7:
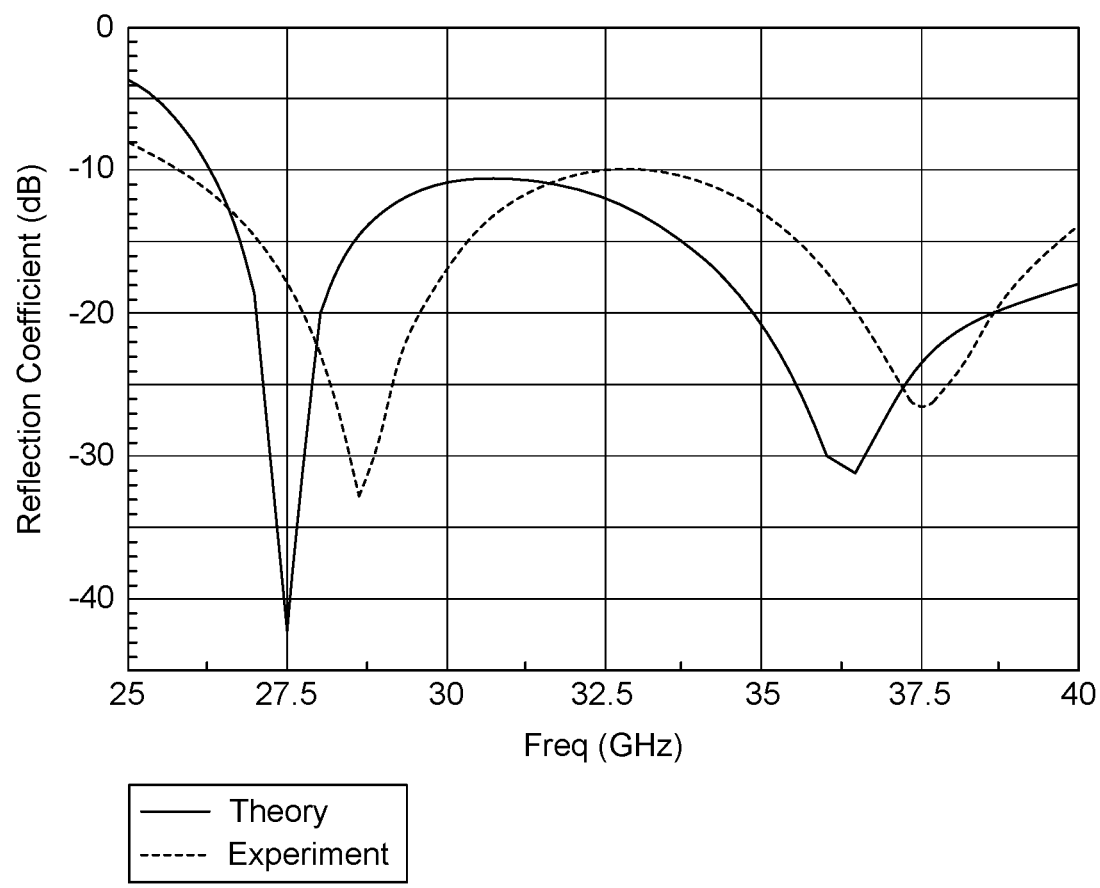
FIG. 7 depicts reflection coefficient of aperture-stacked patch antenna.

In FIG. 7, the reflection coefficient, S11, of an example triple layer aperture-stacked patch antenna designed known in the art for Ka band is presented. It can be observed that the impedance bandwidth of more than 46% relative to center frequency is obtained. The designed antenna gain is greater than 6 dBi across 26-40 GHz. It should be noted that the known FIG. 7 stacked patch antenna is backed by a cavity to increase both front to back ratio and gain.

Log-Periodic Array of Patches

Figure 8:
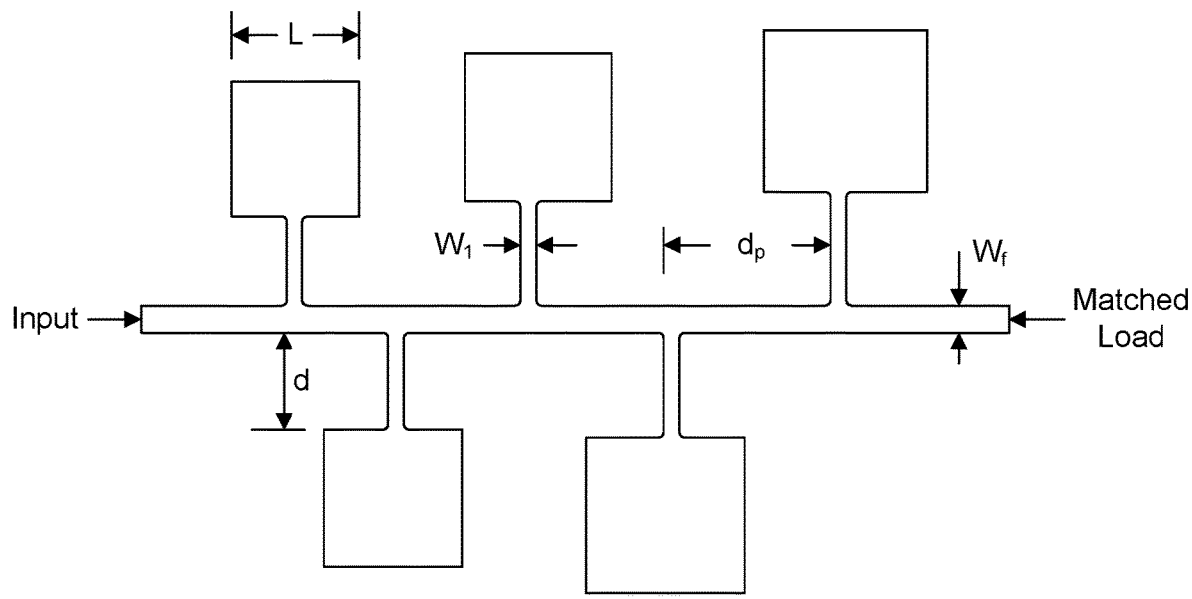
FIG. 8 depicts microstrip patches in log-periodic array formation and VSWR plot.
Figure 8:
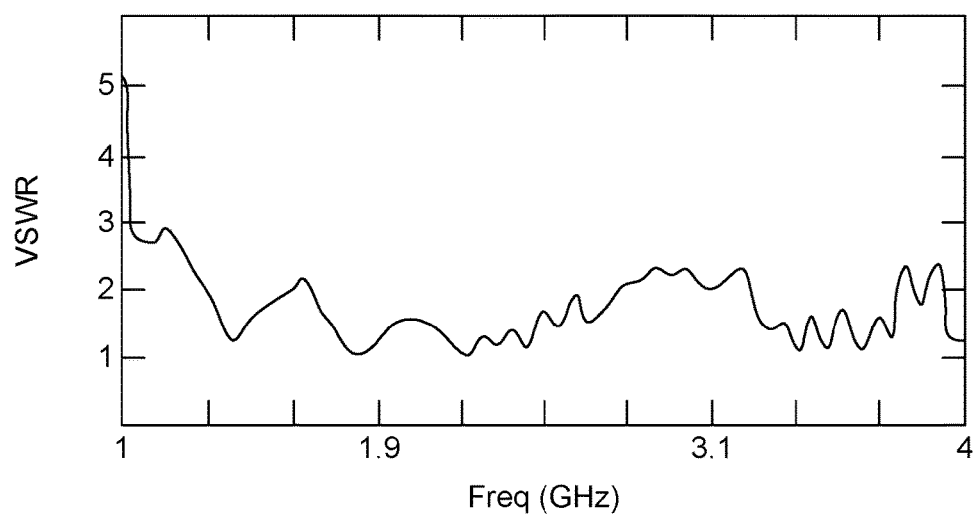

In Han PS., Multi-octave bandwidth log-periodic microstrip antenna array., IEEE Proceedings—Microwaves, Antennas and Propagation. 1986; 133(2):127-136, the concept of log-periodic antennas for providing very wide bandwidths has been applied to microstrip patches. The patches are arranged in a log-periodic formation and are series fed by a microstrip line either directly or indirectly. In FIG. 8, a direct-fed configuration is illustrated. A very wide bandwidth (about 100%) is obtained with this configuration. The radiation pattern of the antenna shown is broadside, unlike the conventional log-periodic dipole array which radiates at end-fire. Although a wide bandwidth can be achieved, the main beam tends to scan or change direction over frequency, making it difficult to provide constant beam direction across the whole bandwidth.

L-Shaped Feeding

Figure 9:
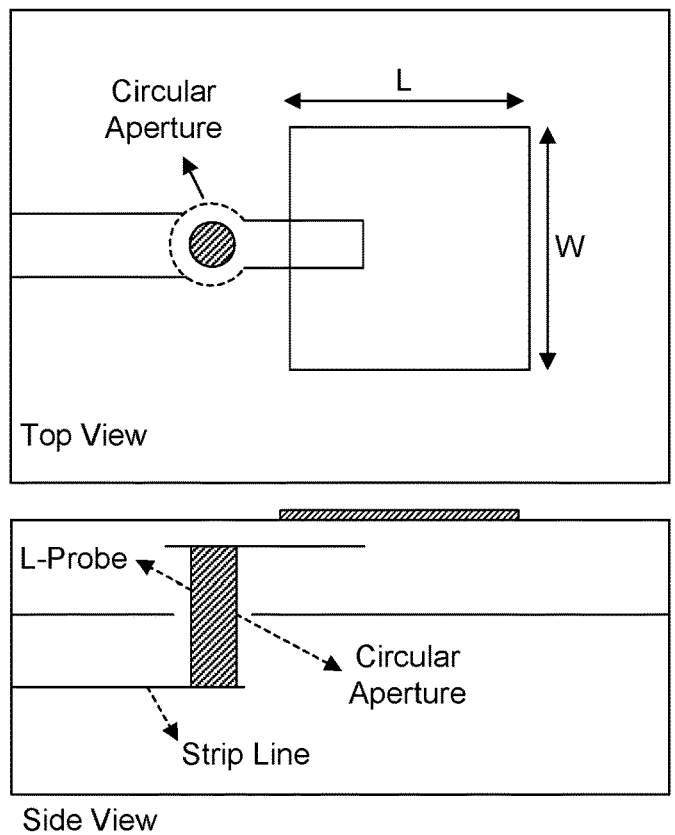
FIG. 9 depicts a patch antenna fed with an L-shaped probe & simulated S11.
Figure 9:
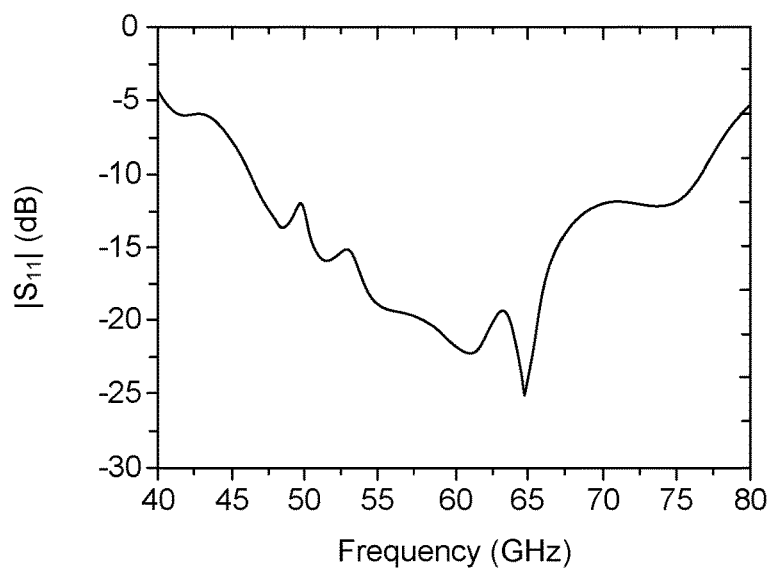

In Kuo 1-S, Wong K-L., A dual-frequency L-shaped patch antenna., Microwave and Optical Technology Letters., 2000; 27:177-179 and in Wang L, Guo Y X, Sheng W X., Wideband high-gain 60-GHz LTCC L-probe patch antenna array with a soft surface, IEEE Transactions on Antennas and Propagation., 2013; 61(4): 1802-1809, an L-shaped probe is used to feed a microstrip patch resulting in an increased bandwidth. This method can be interpreted as a combination of proximity coupled feeding and stacking technique. In FIG. 9, a rectangular patch antenna fed by an L-shaped probe is illustrated. As shown, the L-shape probe is realized by connecting a metalized via to the feed line. The probe is fed by a strip line in order to suppress parasitic radiation due to the feed structure. The simulated S11 as determined by Wang L. Guo Y X, and Sheng W X, above, is shown in FIG. 9. A bandwidth of 50.4% is achieved from 46-77 GHz.

A variety of techniques have been proposed over the years in the literature on methods to increase the bandwidth of microstrip patch antennas. Bandwidth enhancements ranging from 10% up to 100% relative to center frequency are possible with some notable challenges at the high end of the range. However, it's clear that our target range of 20% to 50% bandwidth, necessary for terahertz applications, is achievable, especially when combining some of the stacking and superposition techniques discussed above.

Transparency Windows (Molecular Absorption)

Within the THz band the received signal power spectral density (PSD) is related to the transmitted signal PSD using the following equation $$P_{rx}(f,d)=P_{tx}(f)-L_p(f,d)-L_A(f,d) \quad (1)$$

where f is the operating frequency, d is the separation distance between the transmitter and the receiver, $P_{tx}(f)$ is the transmitted signal PSD, $L_p(f, d)$ is the distance-dependent free-space propagation loss, and $L_A(f, d)$ is the distance-dependent molecular absorption loss. $L_A(f, d)$ then captures the loss created in response to the absorption of electromagnetic (EM) waves by molecules in the channel. The molecular absorption phenomena is a unique THz band feature that occurs when the frequency of the EM wave is close to the resonant frequency for internal vibrational modes of a molecule in the transmission medium. The absorbed EM energy by a certain molecule is then converted into kinetic energy. The absorption loss can be characterized by Boronin, Pavel, et al. "Capacity and throughput analysis of nanoscale machine communication through transparency windows in the terahertz hand." *Nano Communication Networks* 5.3 (2014): 72-82, as:

$$L_{A(f,d)} = \frac{1}{\tau(f,d)} = e^{K(f)d} \quad (2)$$

Where K(f) is the overall absorption coefficient estimated for different individual molecules and is dependent on the pressure (p) and temperature (T) of the medium, and the volume density and cross-section absorption of the molecules in the medium. $\tau(f, d)$ represents the transmittance of the medium and is approximated by the Beer-Lambert law.

Figure 10:
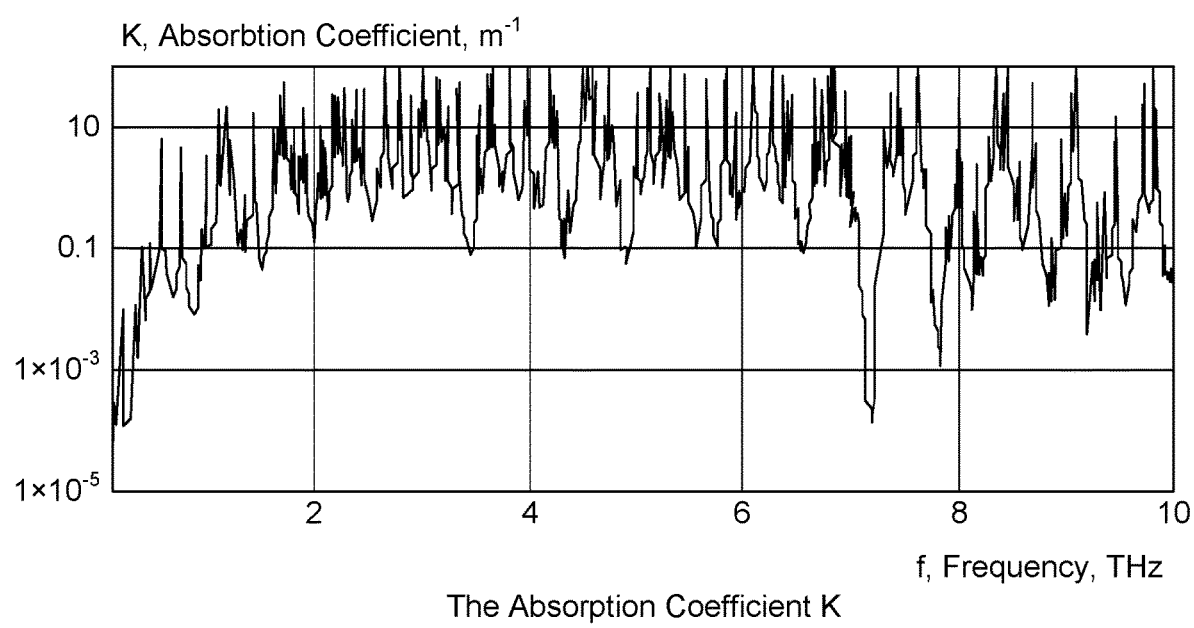
FIG. 10 depicts the absorption coefficient K.

The absorption coefficient K(f) was evaluated in by Boronin, Pavel, et al., above, for T=296 K and 1.8% concentration of water vapor and plotted versus frequency range 0.1-10 THz as shown in FIG. 10.

While the absorption coefficient is independent of the separation distance d, the medium transmittance is dependent on the distance and therefore to achieve the longest communication range, the absorption coefficient K is better kept at a minimum value. Another important observation is that molecular absorption is a highly frequency selective process as in Boronin, Pavel, et al., above, that is the absorption is very high at some frequencies which may limit communication range at those frequencies.

A transparency window is then used to define a continuous range of frequencies where the molecular absorption is significantly smaller than in the rest of the band. In these windows, the transmittance of the medium τ(f, d) is seldomly smaller than 95% for a certain separation distance d implying that the molecular absorption loss is as small as feasible as in Boronin. From this transparency window definition based on the medium transmittance, it is clear that transparency windows are distance dependent. For example, these windows are evaluated in Boronin for the distance d ∈ {0.01, 0.1, 1} m and are shown in Table 1 for d=1m. Transparency windows are also highlighted by hash marks in FIG. 11 for the plotted distances d ∈ {0.01, 0.1, 1} m where the total path loss is defined as Petrov, Vitaly, et al. "Terahertz hand communications: Applications, research challenges, and standardization activities." 2016 8th international Congress on Ultra Modem Telecommunications and Control Systems and Workshops (ICUMT). IEEE, 2016.

$$L(f,d) = L_p(f,d) + L_A(f,d)$$

TABLE 1

Transparency Windows at Separation Distance d = 1 dm

| Number | Frequency (THz) | Width (GHz) |
|---|---|---|
| 1 | 0.1-0.54 | 440 |
| 2 | 0.63-0.72 | 95 |
| 3 | 0.76-0.98 | 126 |
| 4 | 7.07-7.23 | 160 |
| 5 | 7.75-7.88 | 130 |
| 6 | 8.04-8.15 | 80 |

Figure 12:
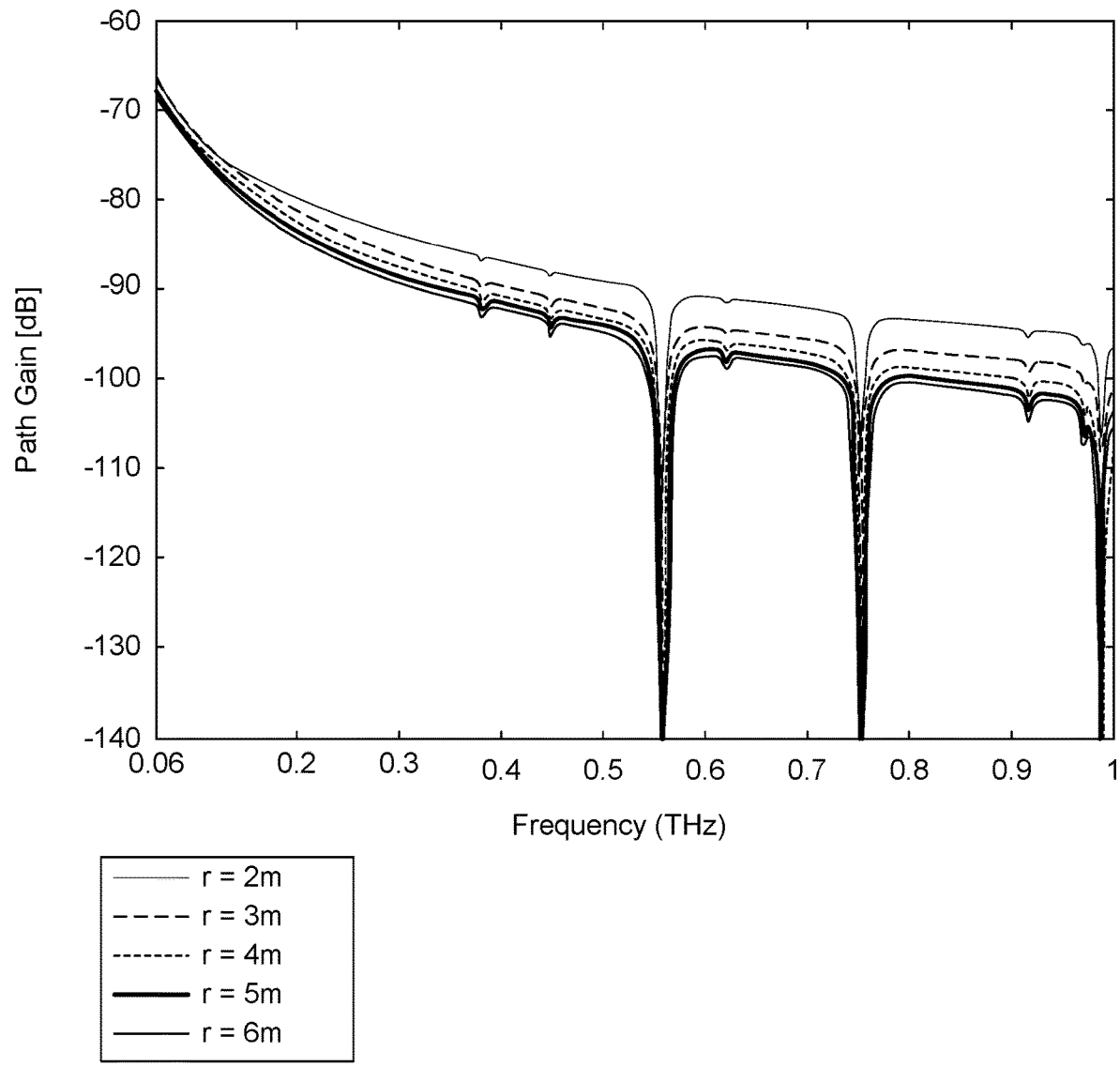
FIG. 12 depicts a path gain as a function of frequency for separation distances m.

The total path loss is also evaluated in C. Han, A. O. Bicen and I. F. Akyildiz, "Multi-Ray Channel Modeling and Wideband Characterization for Wireless Communications in the Terahertz Band," in IEEE Transactions on Wireless Communications, vol. 14, no. 5, pp. 2402-2412, May 2015 for separation distances d>1 m, d ∈ {2, 3, 4, 5, 6} m, and plotted as path gain (—L(f, d)) versus frequency range [0.06, 1] THz as shown in FIG. 12.

Figure 13:
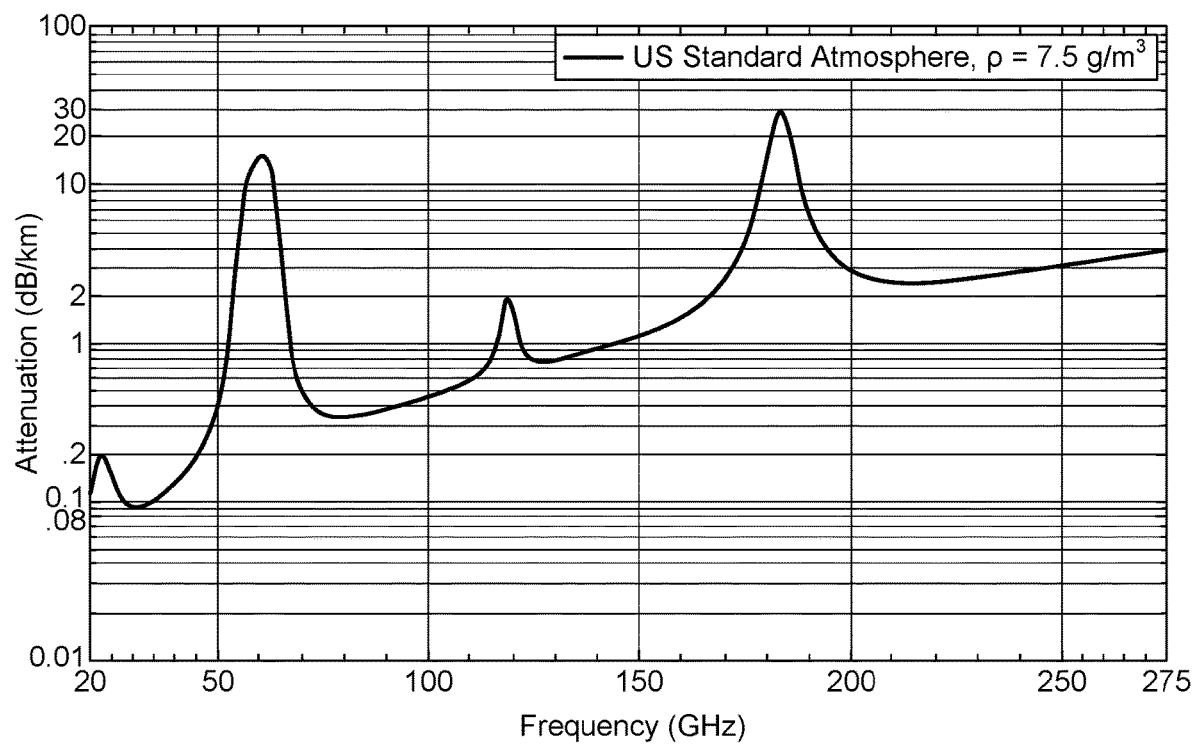
FIG. 13 depicts a distance normalized path loss versus frequency range in GHz for a US standard atmosphere.

The Federal Communications Commission (FCC) has also evaluated the distance normalized path loss (attenuation) versus frequency range [20-275] GHz in [5] for a US standard atmosphere with atmospheric gas density ρ=7.5 g/m³ as shown in FIG. 13.

Rectification Based Frequency Translation

Non-coherent receivers are a kind of receivers that can detect the received signal without the need of a carrier knowledge. By using non-coherent receivers, the burden of having a synchronized local oscillator with high power gain can be eliminated. Non-coherent detection is based on applying a nonlinear operation on the received signal that could produce the baseband version (mostly distorted) of the received one. A low pass filter (LPF) will follow to pick the desired baseband signal.

An example for the Non-coherent receivers is the diode-based circuits which act as an envelope detector where the diode is used to perform as a nonlinear device. The diode in the circuit can act as a switch that passes positive values and blocks negative ones.

Another example for envelope detectors is the square-law device such as driving a transistor in its nonlinear region and so the second harmonic will appear. The output of this circuit can be characterized as $y(t) = kx^2(t)$ where k is the gain of the used circuit. So, for an input $x(t) = m(t)\cos(w_c t)$ the output becomes $$y(t) = \frac{k}{2}m^2(t)(1 + \cos(2w_c t))$$

and the higher harmonic will be discarded by the LPF.

Figure 14:
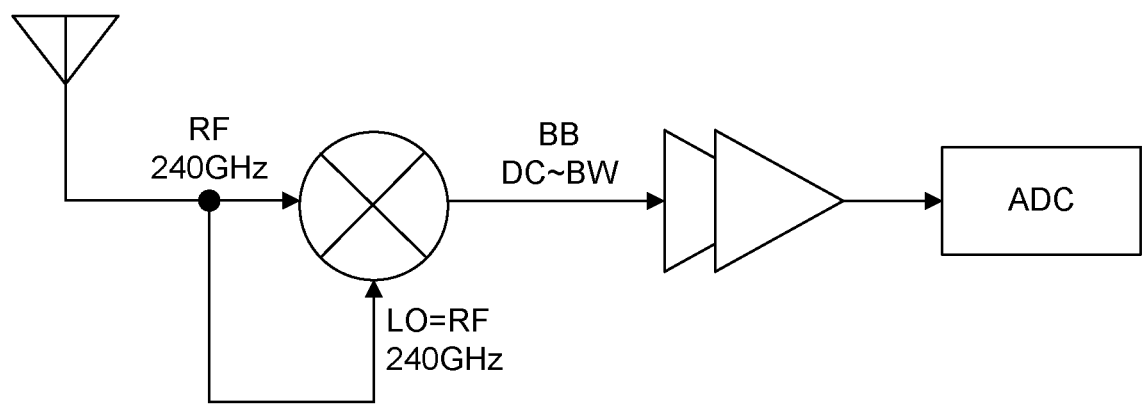
FIG. 14 depicts a self-mixing architecture.

Another example is the use of self-mixing architecture as depicted in FIG. 14. In this example architecture, the input signal is used as the local oscillator for the mixer. So, the input output relation becomes the same as in the square device. One of the problems of the self-mixers is that it requires high input power in order to modulate the data according to S. V. Thyagarajan, S. Kang and A, M. Niknejad, "A 240 GHz Fully integrated Wideband QPSK Receiver in 65 nm CMOS," in IEEE Journal of Solid-State Circuits, vol. 50, no. 10, pp. 2268-2280, Oct. 2015. doi: 10.1109/JSSC.2015.2467216.

To be able to use the non-coherent detection, the used modulation should be an amplitude modulation which is positive. Thus, most of the used modulation schemes used with non-coherent detection is on off keying (OOK).

Figure 15:
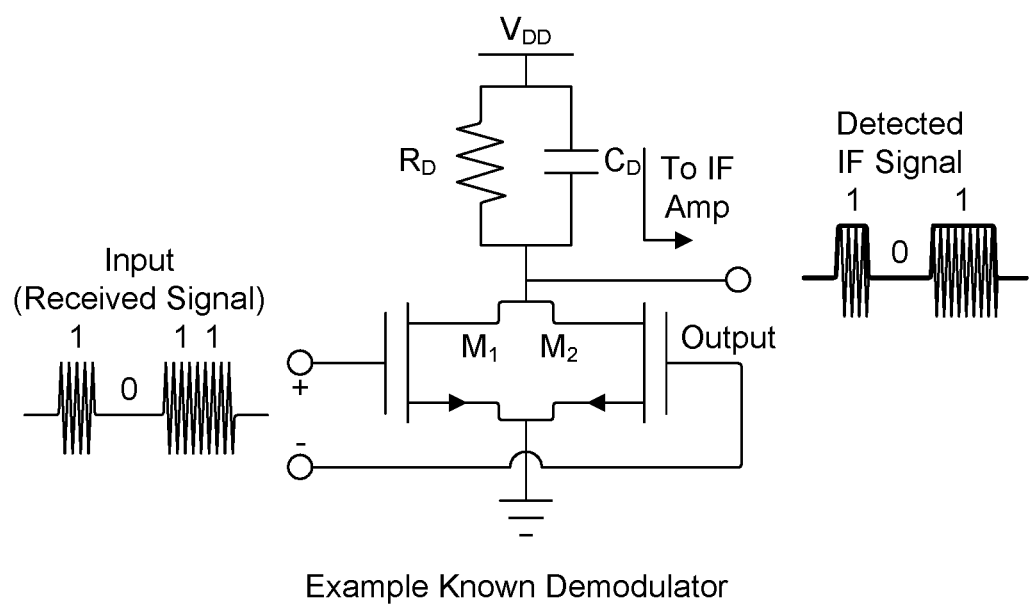
FIG. 15 depicts an example known demodulator.

For THz applications, a transceiver may be implemented in a 40 nm CMOS technology as in the example demodulator of FIG. 15. An on-off keying (00K) transmission is considered for use over 210 GHz. The receiver may be implemented using a non-coherent detector that is shown in FIG. 15 according to S. Moghadami, F. Hajilou, P. Agrawal and S. Ardalan, "A 210 GHz Fully-Integrated OOK Transceiver for Short-Range Wireless Chip-to-Chip Communication in 40 mu CMOS Technology," in IEEE Transactions on Terahertz Science and Technology, vol. 5, no. 5, pp. 737-741, Sept. 2015. doi: 10.1109/TTHZ.2015.2459673. The detector achieves an output swing of 245mv, input return loss of −18 dB and peak responsivity of 2.83 Kv/W. A data rate of 10.7 Gb/s is achieved with bit error rate less than $10^{-12}$ at a transmitter-receiver distance of 1 cm.

Figure 16:
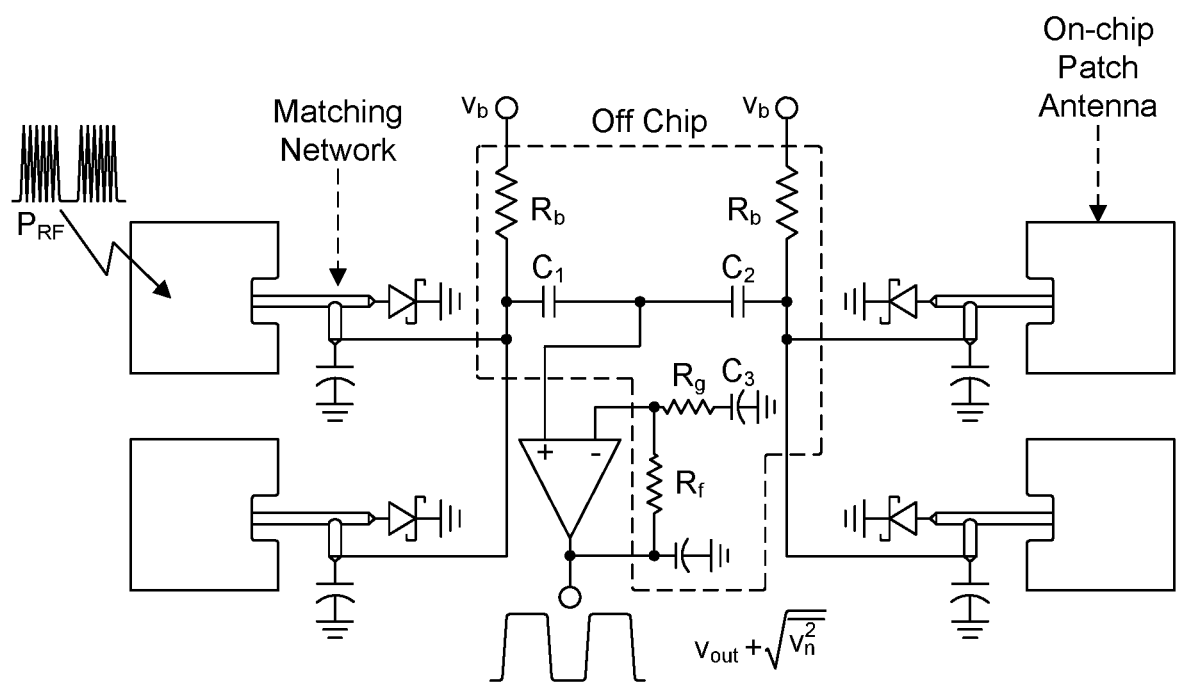
FIG. 16 depicts an example known 280 GHz Schottky diode detector.

Another non-coherent receiver based on the Schottky diode is presented in R, Han et al., "A 280-GHz Schottky Diode Detector in 130-nm Digital CMOS," in IEEE Journal of Solid-State Circuits, vol. 46, no. 11, pp. 2602-2612, November 2011, doi: 10.1109/JSSC.2011.2165234 and is shown in FIG. 16. The Schottky diode is implemented in a 130 nm CMOS technology. A 2×2 array is implemented to operate at 280 GHz with cut-off frequency 2 THz. A 1MHZ modulated signal is transmitted and the estimated voltage response and noise equivalent power are 250v/W and 33 pW/√Hz. To boost the voltage responsivity a low noise amplifier is used which boost the total responsivity to 80Kv/W. For multi-Gbps communications, this responsivity is insufficient and must be improved. Additionally, a wideband design is needed according to V. Petrov, D. Moltchanov, and Y. Koucheryavy, "On the efficiency of spatial channel reuse in ultra-dense THz networks," in 2015 IEEE Global Communications Conference (GLOBECOM), pp. 1-7, Dec. 2015.

Problems/Objectives

Ever increasing requirements for wireless communication systems to support low latency and high data rates necessitates the utilization of higher frequency bands such as Sub-THz/THz bands to access very large bandwidths. However, there are issues to overcome to take advantage of these desired bands.

Molecular Absorption in Sub-THz/THz Bands

Figure 11:
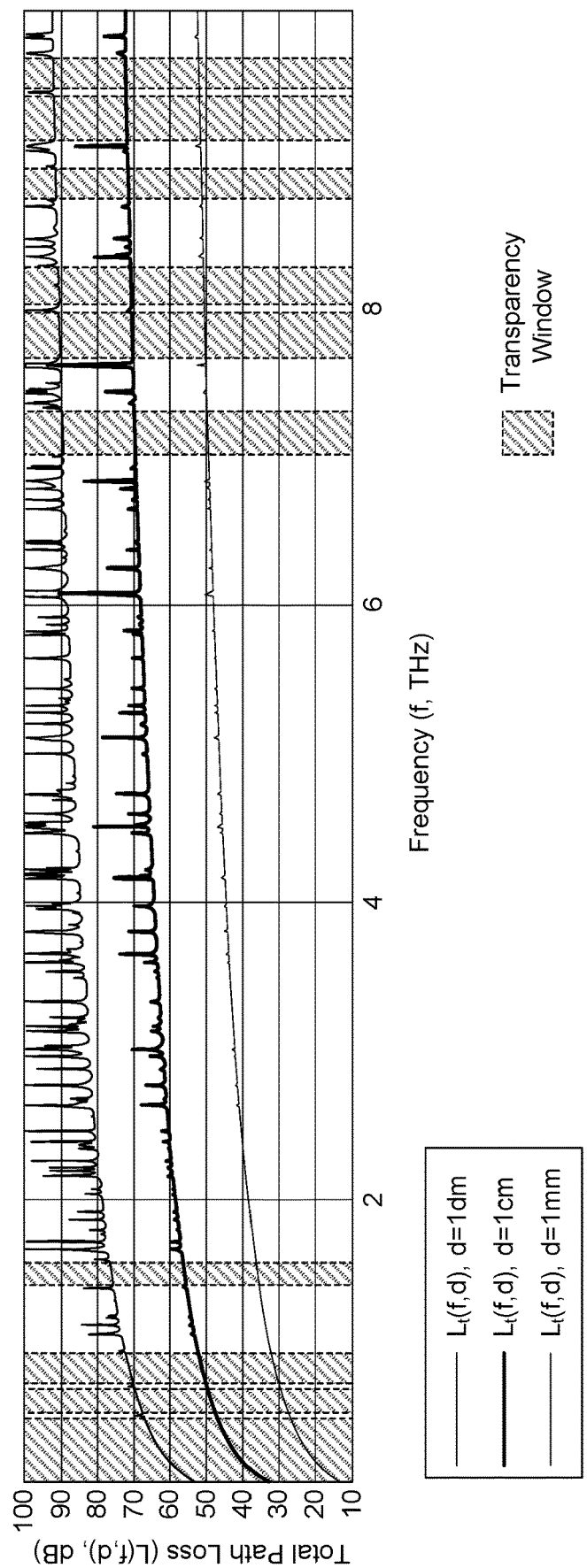
FIG. 11 depicts the total path loss and transparency windows in the THz frequency band.

The molecular absorption creates challenges on defining and designing systems deployed in sub-THz/THz bands with hundreds of GHz usable spectrum. The molecular level absorption is a fundamental physical phenomenon that can severely limit the device discovery and data throughput. The phenomenon has been explained above with respect to transparency windows and molecular absorption. The molecular absorption becomes a major obstacle as the distance increases between transmitting and receiving nodes as depicted in FIG. 11 and FIG. 12. The characteristics of transparency window (e.g. the depth and width of the notch) depends on the following:

(i) Range (distance) between the transmitting and receiving nodes
(ii) The carrier frequency
(iii) Environmental factors (humidity+dust+molecular structure of the air)

Figure 17:
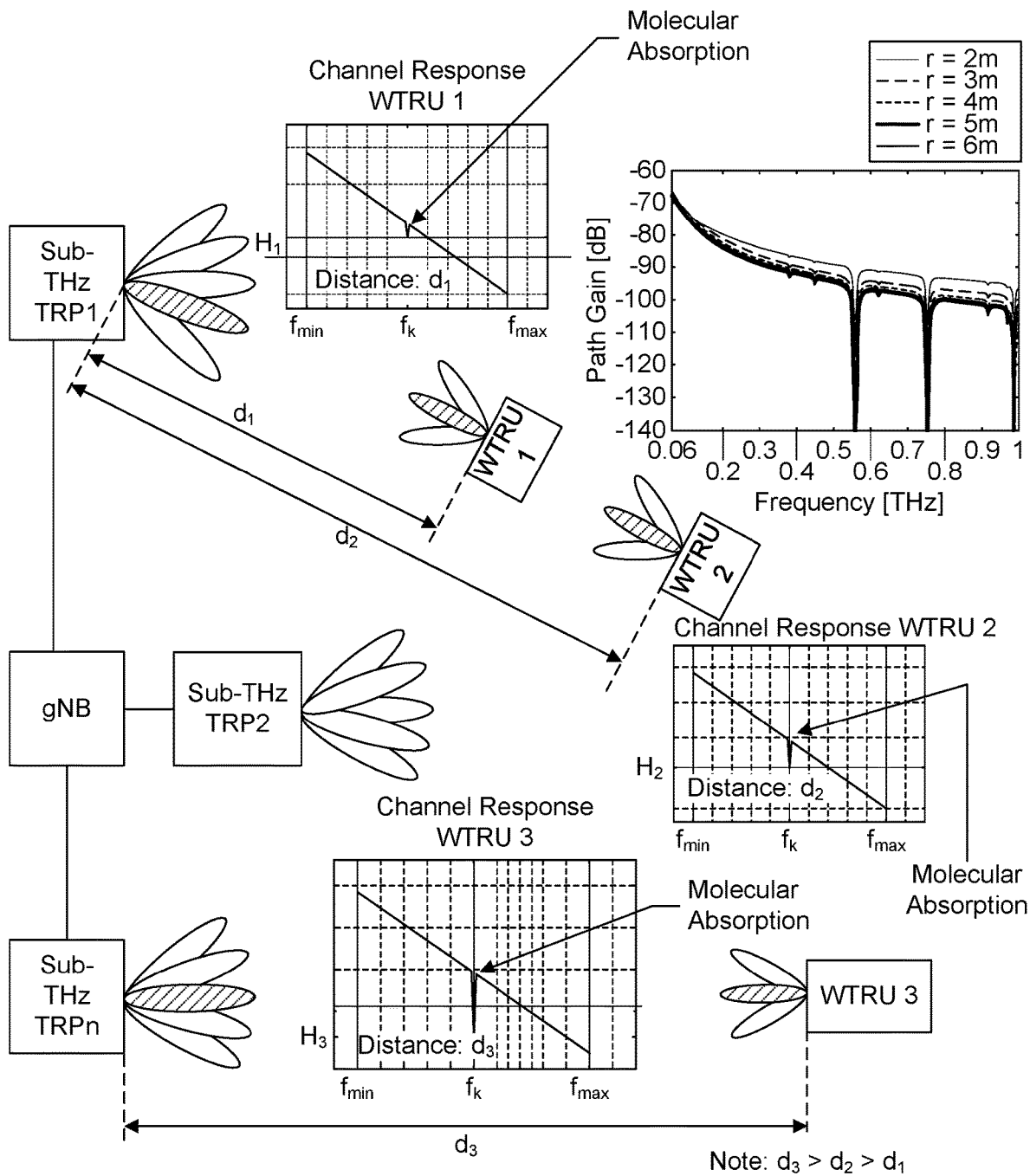
FIG. 17 depicts distance dependent channel variation at sub-THz/THz bands.

The communication system design in Sub-THz/THz frequency bands compared to lower frequency bands such as below 6 GHz requires different treatments due to the existence of molecular absorption as a frequency dependent phenomenon. The loss becomes significantly larger by increasing distance as shown for the WTRU channel responses in FIG. 17. FIG. 17 depicts an example system having a gNB driving three sub-THz Transmit Receive Points (i.e. TRP1, TRP2, TRPn), and three WTRUs (i.e. WTRU1, WTRU2, WTRU3). The respective distances of the WTRUs are such that WTRU1 is a distance of d1 from TRP1, WTRU2 is at a greater distance d2 from TRP1, and WTRU3 is at a distance d3 from TRPn. Distance d3 is greater than d2 or d1. Each WTRU has a respective channel response having a molecular absorption component in the frequency of operation and thus may be affected not only by molecular absorption but also by increasing distance. The molecular absorption loss is expected to get worse due to increasing number of molecules between the transmitters and the receivers due to increasing distance.

RF Circuit Design Constraints

The bandwidth to carrier ratio as defined in classical radio frontend designs is expected around 20%. For example, given a carrier frequency of 400 GHz, the anticipated RF frontend bandwidth is 80 GHz. In order to utilize several hundred GHz of spectrum to achieve data rates above 100 Gbps, the complex techniques such as superposition of antennae need to be considered in RF circuit designs as described above with respect to RF Front end capabilities to increase the bandwidth to carrier ratio. However, the utilization of superposition of antennae can cause an increased insertion loss with degraded link budget margin and decreased power efficiency.

The utilization of superposition of antennae can be tolerable with decreased DC power efficiency to enable very large bandwidths to achieve above 100 Gbps rates. However, keeping the superposition of antennae and continuously transmitting signals for initial synchronization can be very power inefficient and prohibitive in terms of energy utilization. Therefore, the initial synchronization procedures in sub-THz/THz bands may utilize hybrid on demand approaches.

Solution Approaches

Table 2 captures some definitions relevant to the proposed approaches/solutions.

TABLE 2

| | Definitions |
|---|---|
| Molecular absorption loss | The loss caused due to interaction between the very small particles with less than the wavelength in the air |
| Transparency window | Contiguous spectrum without molecular absorptions (i.e. the spectrum that exists between lower side of spectrum to the first valley caused by molecular absorption or the spectrum between two valleys caused by molecular absorptions) |
| Bandwidth to carrier ratio | The ratio of usable bandwidth to the carrier frequency |
| Superposition of antennae | Adding non overlapping narrower antennae bandwidths to make up larger RF bandwidth |
| Range | The distance between the transmitting and the receiving nodes |
| Partition | Smallest servable physical division of a deployment area |
| Cluster | Group of beams associated to the same partition within a deployment area (i.e. the beams illuminating the same partition) |
| PSD | Power spectral density |

Herein, the transparency-window aware code selection and range estimation procedure for device discovery has been proposed to overcome the limitations that can occur in Sub-THz/THz bands. Two different procedures for initial device discovery in Sub-THz/THz bands have been proposed as described in the following sections: Hybrid standalone, and On demand out-of-band (OOB) link assisted approaches/solutions.

EMBODIMENTS

Example Embodiment

One feature of the example embodiment is the generation of an initial timing synchronization sequence. An "initial timing synchronization sequence" may be defined as an in-channel narrowband sequence(s) located at lower part of the wideband communication channel to minimize molecular absorption impacts. They exhibit high autocorrelation and low cross-correlation properties, and favorable to detect with a matched filter structure that can enable determining coarse timing offset. In one embodiment, a bidirectional method for initial timing synchronization for a WTRU to communicate with a network includes:

1. The WTRU receiving an in-channel narrowband synchronization sequence from the network to perform initial coarse timing synchronization 2. The WTRU determining coarse timing offset and a range between a beam source of a network transmitter and the WTRU by using received in-channel narrowband synchronization sequence
   a. The range estimation is determined by examining the in-channel narrowband sequence correlation output 3. The WTRU selecting a wideband sequence for fine synchronization using the estimated range, wherein
   a. The sequence is selected to match the wideband communication channel spectral profile b. The wideband communication channel spectral profile describing the location(s) of the molecular absorption peak(s) in the operational channel 4. The WTRU transmitting the selected wideband sequence to assist the fine synchronization process during an uplink timing occasion 5. The WTRU receiving the selected wideband sequence from the network to complete the fine timing synchronization process.

Embodiment 1: Standalone Bidirectional Approach for Initial Timing Synchronization in Sub-THz/THz Bands The following steps outline a method for Embodiment 1:

1. The network periodically transmits an initial timing synchronization sequence to enable initial coarse timing synchronization.
   a. The initial timing synchronization sequence is defined as in-channel narrowband and located at lower part of the wideband communication channel 2. RF Frontend is set to basic mode during transmission and reception of the initial timing synchronization sequence for both the WTRU and the network.
   a. Basic mode RF frontend operations are energy efficient since the mode does not require superposition of antennae enabled. The basic mode may be defined as the energy efficient mode where super position of the antennas is not utilized. In addition, the "basic mode" specifically refers to a narrowband mode as opposed to a wideband mode. A narrowband RF frontend typically consumed less power than a wideband RF frontend operation on the same carrier frequency.

3. The WTRU upon detecting an initial timing synchronization sequence determines the coarse timing offset and estimates range between the beam source and the WTRU. The WTRU selects a predefined wideband fine timing sequence by using the estimated range and transparency window related knowledge
   a. The selected sequence PSD covers the entirety of the wideband communication channel
   b. Transparency window knowledge indicates molecular absorption frequencies and relevant range dependent losses. Measurements of distance dependent molecular absorption vs. frequency may be collected externally and stored at the gNB and/or WTRU to determine wideband sequence(s) selections. In one embodiment, distance dependent molecular absorption vs. frequency knowledge can be gained through an off-line measurements campaign performed the WTRU/Network or any other measurement apparatus and the information can be stored in memory on the WTRU and the network/base station.

4. The WTRU transmits the selected fine timing sequence during the uplink (UL) timing occasion that is one-to-one mapped to the detected downlink (DL) synchronization sequence timing
   a. Selected fine timing synchronization sequence over entire band enables fine timing synchronization between the WTRU and the network
   b. Superposition of antennae is activated for both the network and the WTRU to cover the entire intended wideband communication channel bandwidth 5. Once the selected fine timing synchronization sequence is detected by the network, the network responds to the WTRU with the same sequence.

6. The detection of the selected fine timing synchronization sequence by the WTRU establishes the fine timing synchronization Note: Tx and Rx beams are assumed to be reciprocal during the above process.

Embodiment 2: Minimum Offset Time with Flexible UL Transmission

1. The network periodically transmits an initial timing synchronization sequence to enable initial coarse timing synchronization.
   a. The synchronization sequence is defined as in-channel narrowband and located at lower part of the wideband communication channel 2. In-channel narrowband mode is active during transmission and reception of the in-channel narrowband initial timing synchronization sequence for both the WTRU and the network.

3. The WTRU selects the default receive beam and sets the dwell timer for the beam 4. The WTRU upon detecting the initial timing synchronization sequence determines the coarse timing offset and estimates the range between the associated beam source and the WTRU.
   a. The WTRU selects a predefined wideband fine timing synchronization sequence by using the estimated range and transparency window related knowledge
   b. The WTRU sets the minimum delay timer and waits for the opportunity to transmit the selected wideband fine timing synchronization sequence 5. The WTRU performs a channel sense to determine if the channel is clear to transmit
   a. The channel access process is performed at integer multiples of the minimum offset delay until maximum offset delay is reached or a beam-based dwell timer expires.
   b. Once the channel is clear, the WTRU transmits the selected wideband fine timing synchronization sequence during the UL timing occasion
   c. The WTRU sets the next available receive beam if the dwell timer expires
   d. All the receive beams are tested with the above steps 6. Once the selected wideband fine timing synchronization sequence is detected by the network, the network responds to the WTRU with the same sequence.

7. The detection of the selected wideband fine timing synchronization sequence by the WTRU establishes the fine timing synchronization.

Embodiment 3: DL Only Initial Synchronization Procedure

1. The network periodically transmits an in-channel narrowband initial timing synchronization sequence and an associated set of wideband fine timing synchronization sequences
   a. The associated wideband fine timing synchronization sequence set may contain a single or multiple sequences
   b. If the deployment scenario results in a fixed distance between the DL beam source and the illuminated area, a single wideband fine timing synchronization sequence transmission may be sufficient to establish fine timing synchronization for the beam; otherwise, multiple wideband fine timing synchronization sequences based on varying distance may be transmitted to mitigate distance dependent molecular absorption.

2. In-channel narrowband mode may be active during transmission and reception of the in-channel narrowband initial timing synchronization sequence for both the WTRU and the network.

3. The WTRU may select the default receive beam and sets the timer based on dwell-time for the beam 4. The WTRU upon detecting an initial timing synchronization sequence determines the coarse timing offset and estimates the range between the associated beam source and the WTRU.

a. The WTRU may select a set of predefined wideband fine timing synchronization sequences by using the estimated range and transparency window related knowledge b. The WTRU may set the minimum delay timer and waits for the reception of the selected wideband fine timing synchronization sequence(s) until either reaching at the maximum delay offset or the dwell time expiry.

c. The WTRU may set the next available receive beam if the dwell timer expires d. One or more of the receive beams are tested with the above steps.

5. The detection of the selected wideband fine timing synchronization sequence by the WTRU establishes the fine timing synchronization.

Embodiment 4: Non-standalone OOB Link Based Approach for Initial Timing Synchronization in Sub-THz/THz Bands The following steps outline a method for Embodiment 4:

1. The sub-THz/THz link establishment is activated

2. OOB link assistance determines the best possible beam pairs between the network and the WTRU based on coarse timing and range estimation a. Measurements are taken by using OOB links b. Initial timing is referenced to the OOB link timing that may create a coarse timing synchronization in Sub-THz/THz bands 3. A fine timing synchronization sequence is created based on the range and transparency window knowledge a. Transparency window knowledge indicates molecular absorption frequencies and relevant range dependent losses b. Transparency related parameters can be determined either in the deployment phase or by the measurement campaigns in Sub-THz/THz bands 4. The parameters for regeneration of the selected sequence and on-demand initial synchronization timing occasion are transmitted to the WTRU via OOB link assistance 5. The network or the WTRU transmits the fine timing synchronization sequence during synchronization timing occasion 6. Once the network or the WTRU detects the initial timing synchronization sequence, the initial timing synchronization is achieved Note: Superposition of antennas is enabled at the RF front-end for both the WTRU and the network. Embodiment 2 utilizes a coarse timing and range estimation from an OOB link and then a fine timing synchronization may be used.

Solution 1: Bidirectional Standalone Approach (Non-OOB Link Assisted) Sub-THz Link The discussion of Solution 1 addresses aspects of example Embodiment 1 discussed hereinabove. In sub-THz/THz bands, it is assumed that only Line of Sight (LOS) communications are possible due to very stringent pathloss values.

Deployment Set Up

It is assumed that the network deployment ensures the full coverage such that there is at least one of the network beams paired with at least one of the WTRU beams. The deployment can be configured such that a partition in the coverage area may be illuminated by multiple network beams. That guarantees beam paring between the network and the target WRTU in any angle or orientation.

Figure 18:
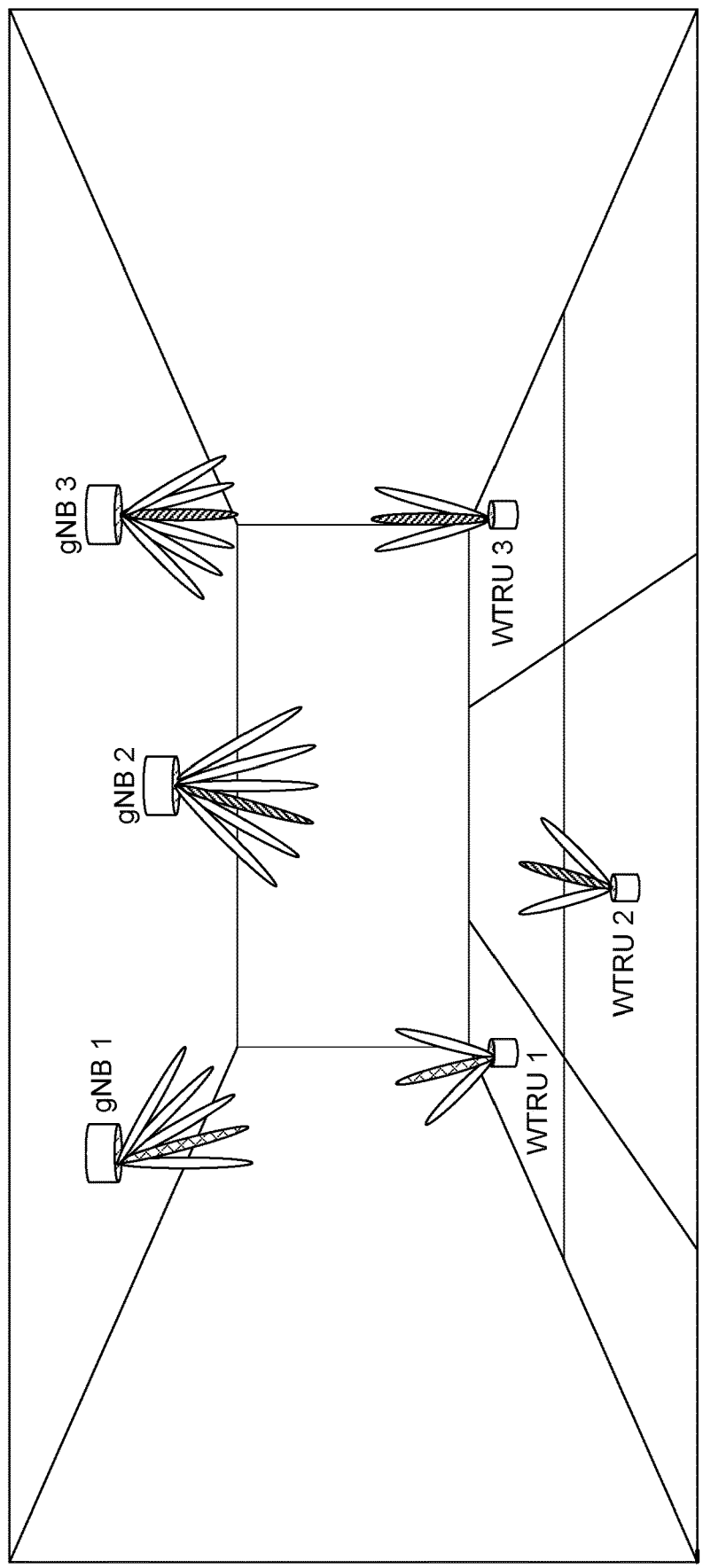
FIG. 18 depicts an Indoor full coverage scenario example.

In a single RAT Sub-THz/THz communications system, it is expected that the beams are narrower to make up for the experienced pathloss at the high frequencies. Also, it is expected that the design can assume direct LOS communications for a viable radio link establishment and maintenance. An example deployment scenario is illustrated in FIG. 18, where the gNBs are deployed on the ceiling with a full coverage for any WTRU (i.e. UE) located on the floor. As depicted in the figure, the gNBs are assumed to support more number of beams than the WTRUs. In FIG. 18, any gNB may communicate with any WTRU, however, depicted is the condition where gNB 1 may communicate with WTRU 1 via selected beams on gNB 1 and WTRU 1 (i.e a beam pair). A similar condition is shown that gNB2 may communicate with WTRU 2 using selected beam pairs. Also, gNB3 may communication with WTRU 3 using selected beam pairs.

The synchronization procedure for the deployment scenario as shown in FIG. 18 is initiated and maintained by periodic transmission of synchronization sequence bursts. The synchronization bursts are coordinated among the gNBs not to cause collisions at the WTRU antenna. It is assumed that the beams illuminating the same coverage partition on the floor are paired and coordinated. For example, they create a beam cluster. One beam cluster example is shown in FIG. 18. As can be seen in FIG. 18, not all the DL beams from the gNBs can be paired and coordinated in a particular coverage partition on the floor. The coordinated DL beams that are part of the same beam cluster are scheduled to transmit periodic synchronization burst(s) sequentially to mitigate possible interference especially at the WTRU receivers that can only perform low order modulation decoding such as BPSK. The coordinated and paired DL clustered beams can have their own frame timing. For example, if there are N groups of gNB beams (e.g. N clusters) that are associated to each other as the beams that can illuminate a particular partition in the deployment area, then there can be "N" independent frame timing and associated scheduling created for the entire deployment area. In another approach, a single frame timing for all beams can be used, for example, to support the least complex deployment scenario.

The above coordination between the coverage area and the beam pairs with or without partition and cluster pairing can be used to enable initial access procedures. For example, in a deployment scenario a single beam or multiple beams in the DL direction can illuminate portion(s) of a coverage area, where synchronization burst(s) scheduling can be performed by using a pattern that can enable round-robin or any other scheduling among the available DL beams.

Dwelling, Sequence Selection and Transmission

Figure 19:
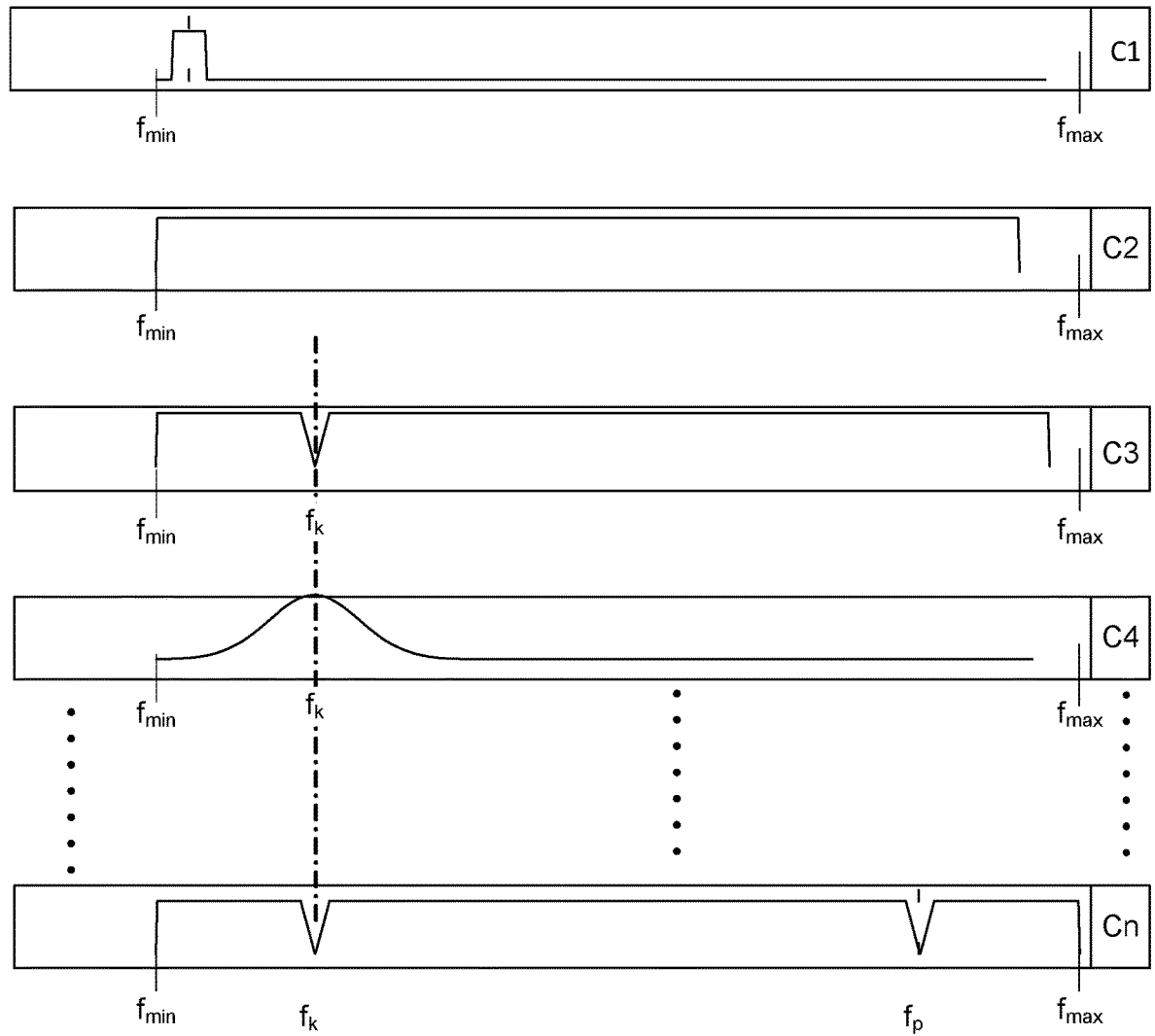
FIG. 19 depicts Synchronization Burst(s) Sequences.

Once the DL beam pairing established via either dynamic measurement campaigns with already connected WTRUs or static deployment dependent measurements during the network planning phase, the synchronization burst(s) can be transmitted periodically by the beam(s) separately in each beam cluster. For example, if the beam IDs 1, 10, and 15 make up a cluster to cover a partition, then the beams are configured to transmit the selected synchronization sequence(s) periodically in time division multiplex mode for the synchronization during the allocated synchronization burst(s) occasion. In each beam cluster, one or some combinations or all of the beams can be used periodically to transmit the synchronization burst(s). The synchronization burst(s) can consist of one or more combinations of the sequences similar to C1 of FIG. 19. The synchronization sequence (i.e. C1) PSD properties are depicted in FIG. 19.

The synchronization burst(s) transmissions must be periodic and known to the WTRUs. The synchronization burst(s) such as the ones similar to C1 are defined as reference signals to establish coarse frame timing. Also, the synchronization burst(s) can be used to estimate the range between the WTRU and the detected gNB based on the procedures covered hereinbelow with respect to embodiment 2.

Once the WTRU detects the basic periodic synchronization sequence, the best possible sequence for fine synchronization among C2, C3, . . . , Cn can be selected based on the associated estimated range and the transparency window knowledge.

Coarse Synchronization Sequence Definition

The coarse synchronization can be defined as the partial timing and frequency offset establishment between the transmitting and the receiving nodes, i.e. WTRU's achieving coarse synchronization with respect to gNB reference clock.

The intended sequence has the following properties
  (i) The sequence has in-channel narrowband with low band edge PSD concentration, e.g. similar to C1 in FIG. 19, that mitigates a molecular absorption problem due to relatively lower frequency.
  (ii) The sequence can be transmitted and received in in-channel narrowband mode of both the gNB(s) and the WTRU(s).

Using the in-channel narrowband sequence (e.g. C1) at lower side of the wideband communication channel for continuous beaconing for initial timing synchronization is more energy efficient than using a sequence covering entire band that requires enabling of superposition of antennae at the RF frontend. However, the timing synchronization accuracy based on the coarse synchronization sequence only can have limitations (e.g. C1 only detection may produce only coarse timing accuracy). Therefore, a bidirectional approach to achieve initial fine timing accuracy is desirable, where the emerging WTRU may select and transmit additional sequence(s).

Bidirectional Initial Synchronization Procedure

Figure 20:
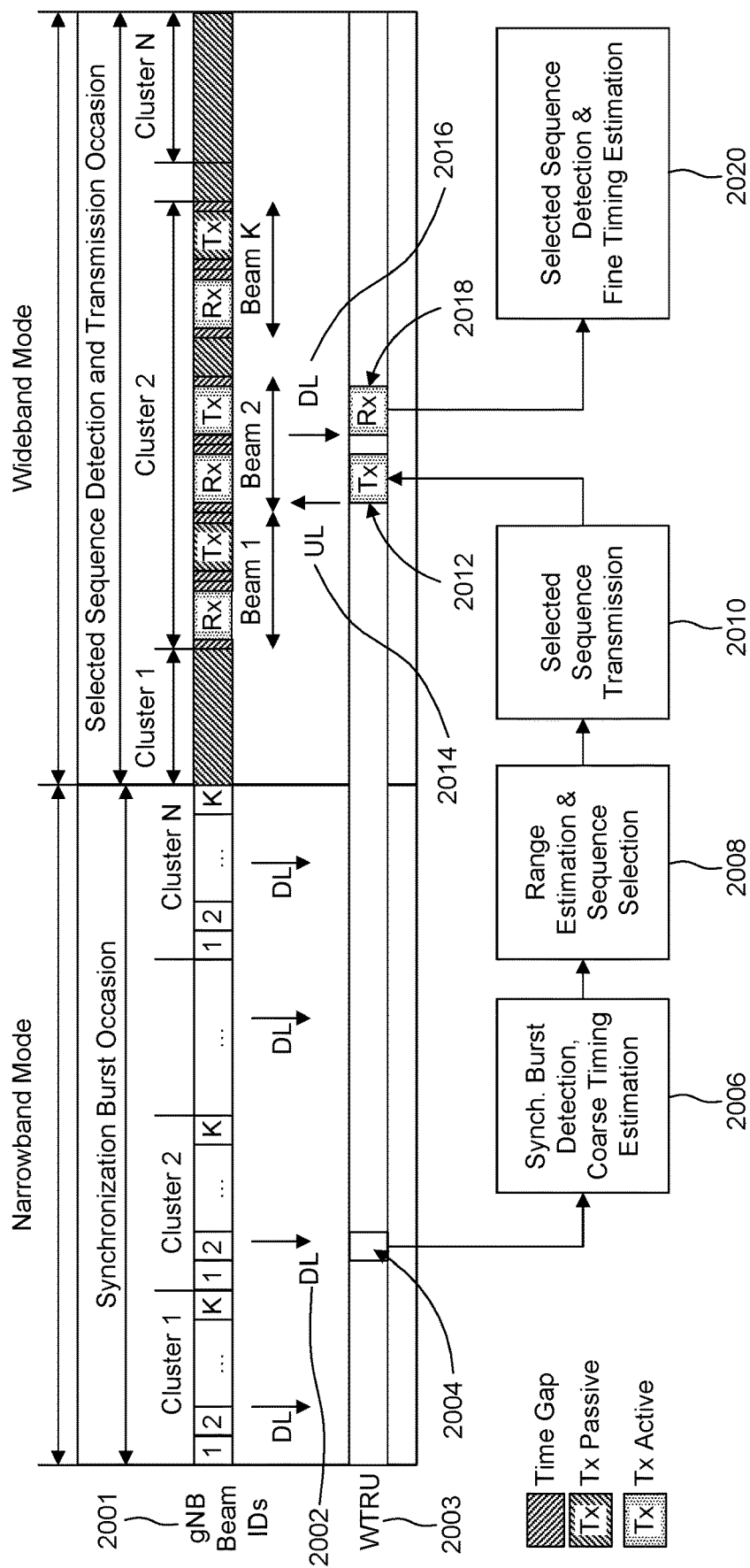
FIG. 20 depicts cluster based Initial timing synchronization.

The network periodically transmits an initial timing synchronization sequence to enable coarse timing synchronization as depicted in FIG. 20. The figure shows an example frame structure and captures only the portion of a frame to depict the relevant procedure for the initial timing synchronization, the other time slots for UL/DL data or control exchange is not shown for simplicity. The synchronization sequence is defined as in-channel narrowband and located at lower part of the wideband communication channel as described hereinabove with respect to Coarse Synchronization Sequence Definition section above. It is assumed that the beams within each cluster are transmitting initial timing synchronization sequences sequentially. Also, it is assumed that there is only one cluster active at a time for simplicity.

In FIG. 20, a timeline 2001 of gNB beam identifiers (IDs) is shown as a series of beam clusters. A respective timeline 2003 of a WTRU is also depicted. A synchronization burst transmission in the downlink (DL) direction 2002 from the gNB to the WTRU is shown as received by the WTRU at time period 2004. The WTRU processes the received initial timing synchronization 2004 in blocks 2006 through 2010. At 2006, synchronization burst detection and coarse timing estimation are conducted. At 2008, range estimation and fine timing sequence selection are performed. At 2010, the selected wideband fine timing sequence selection is prepared for transmission by the WTRU. At 2012 the WTRU transmits the fine timing sequence selection which is in UL direction at 2014 to the gNB. The gNB verifies the fine timing sequence selection and sends the same sequence in DL direction at 2016. The WTRU receives the same sequence at 2018 and then performs the selected fine timing sequence detection and fine timing estimation at 2020. In FIG. 20, The Tx active legend is defined for both the gNB and the WTRU as being messages transmitted by either the gNB or WTRU and received by the other unit. The Tx passive legend indicates Tx opportunities that are not specifically used by the gNB and WTRU to communicate with each other. Note that the gNB periodically searches for a wideband sequence that would be transmitted by a WTRU that has already detected a narrowband sequence and selected a wideband sequence. If the gNB does not detect a wideband sequence in an UL opportunity from the WTRU, then the gNB does not transmit a DL message to the WTRU.

Figure 21A:
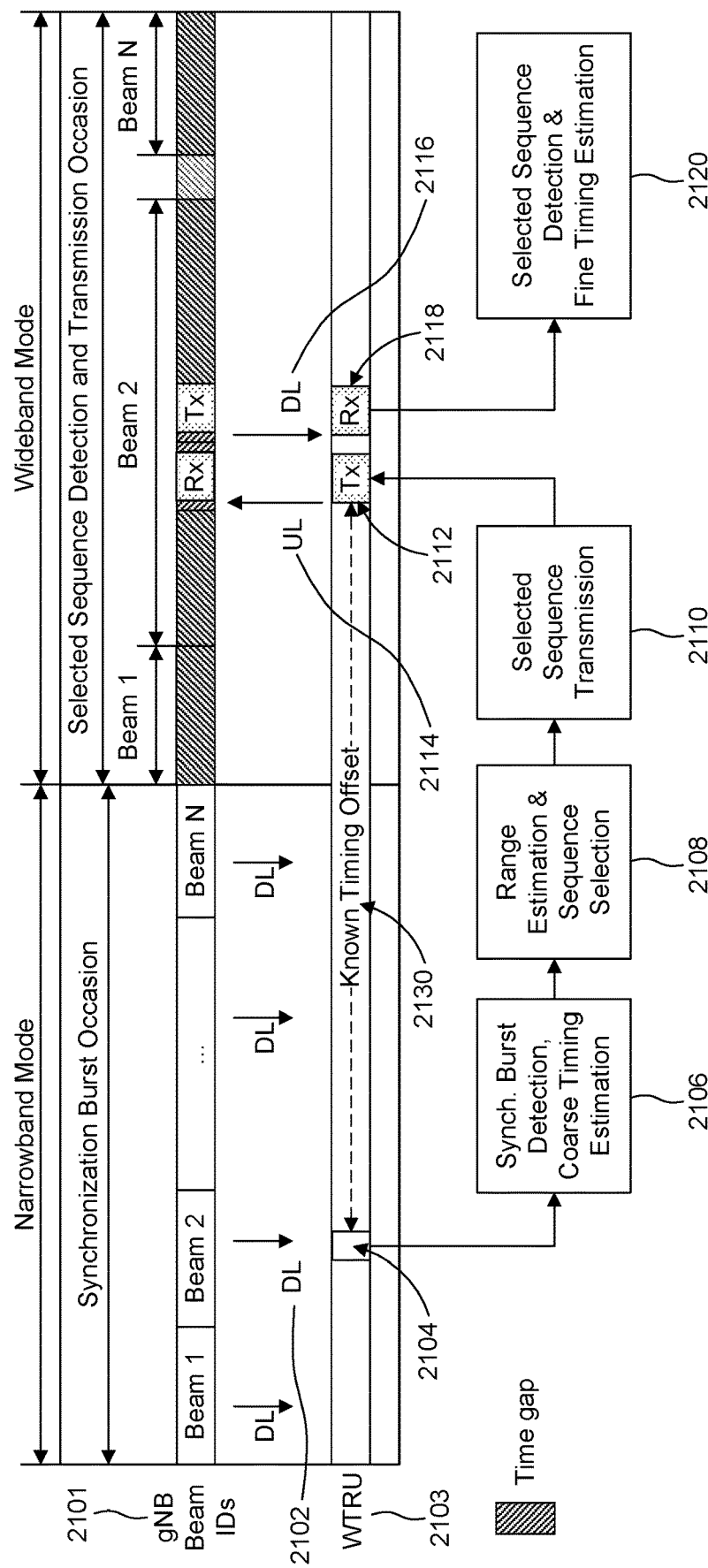
FIG. 21A depicts an example generic approach to initial timing synchronization.

The synchronization burst(s) transmissions can be non-cluster based, for example, as shown in FIG. 21A, where a deployment scenario can employ synchronization burst(s) transmission scheduling. This may be accomplished in an exhaustive manner. In-channel narrowband synchronization sequence(s) can be transmitted in the first period where the in-channel narrowband mode is active for both the gNB and the WTRU radio. Also, there is known timing offset (a configured offset) between the beam number and its corresponding wideband selected sequence transmissions.

In FIG. 21A, a timeline 2101 of gNB beam identifiers (IDs) is shown as a series of individual beams. A respective timeline 2103 of a WTRU is also depicted. A synchronization burst transmission in the downlink (DL) direction 2102 from the gNB to the WTRU is shown as received by the WTRU at 2104. The WTRU processes the received initial timing synchronization at 2104 in blocks 2106 through 2110. At 2106, synchronization burst detection and coarse timing estimation are conducted by the WTRU. At 2108, range estimation and fine timing sequence selection are performed. At 2110, the selected fine timing sequence selection is prepared for transmission by the WTRU. At 2112 the WTRU transmits the fine timing sequence selection after a Known Timing Offset (a Configured Offset) from the received DL synchronization burst at 2104 from the gNB. At the WTRU TX timeline 2112, an uplink direction transmission at 2114 of the selected fine timing synchronization sequence to the gNB is performed. The gNB verifies the fine timing sequence selection and sends the same sequence in a transmission in the DL direction at 2116. The WTRU receives the same fine timing synchronization sequence at 2118 and then performs the selected fine timing sequence detection and fine timing estimation at 2120.

Referring to FIG. 21A, the RF Frontend is set to basic mode during transmission and reception of the synchronization sequences for both the WTRU and the network. Basic mode RF frontend operations are energy efficient since the mode does not require superposition of antennae enabled. The WTRU upon detection of a synchronization sequence establishes the coarse timing offset and estimates range as more fully depicted in FIG. 22 below. The WTRU, then, selects a predefined sequence by using the estimated range and transparency window related knowledge. The selected sequence is among the ones already known to the network, thus the network side beam-based search space looks for all these known sequences. The number of selectable sequences by the WTRU is limited to reduce the search space. The WTRU waits for the corresponding UL occasion that has fixed timing offset to the detected synchronization, then it transmits the selected sequence during the UL timing occasion. The selected sequence with spectral contents spread over entire band enables fine timing synchronization between the WTRU and the network. Once the selected sequence is detected by the network, the network responds to the WTRU with the same sequence. The detection of the selected sequence by the WTRU establishes the fine timing synchronization.

The timing offset 2130 (a configured offset) between the in-channel narrowband sequence transmission(s) and corresponding UL timing occasion(s) may be pre-configured based on a standardized approach or provided via a subscriber identification module (SIM)-card.

Figure 21B:
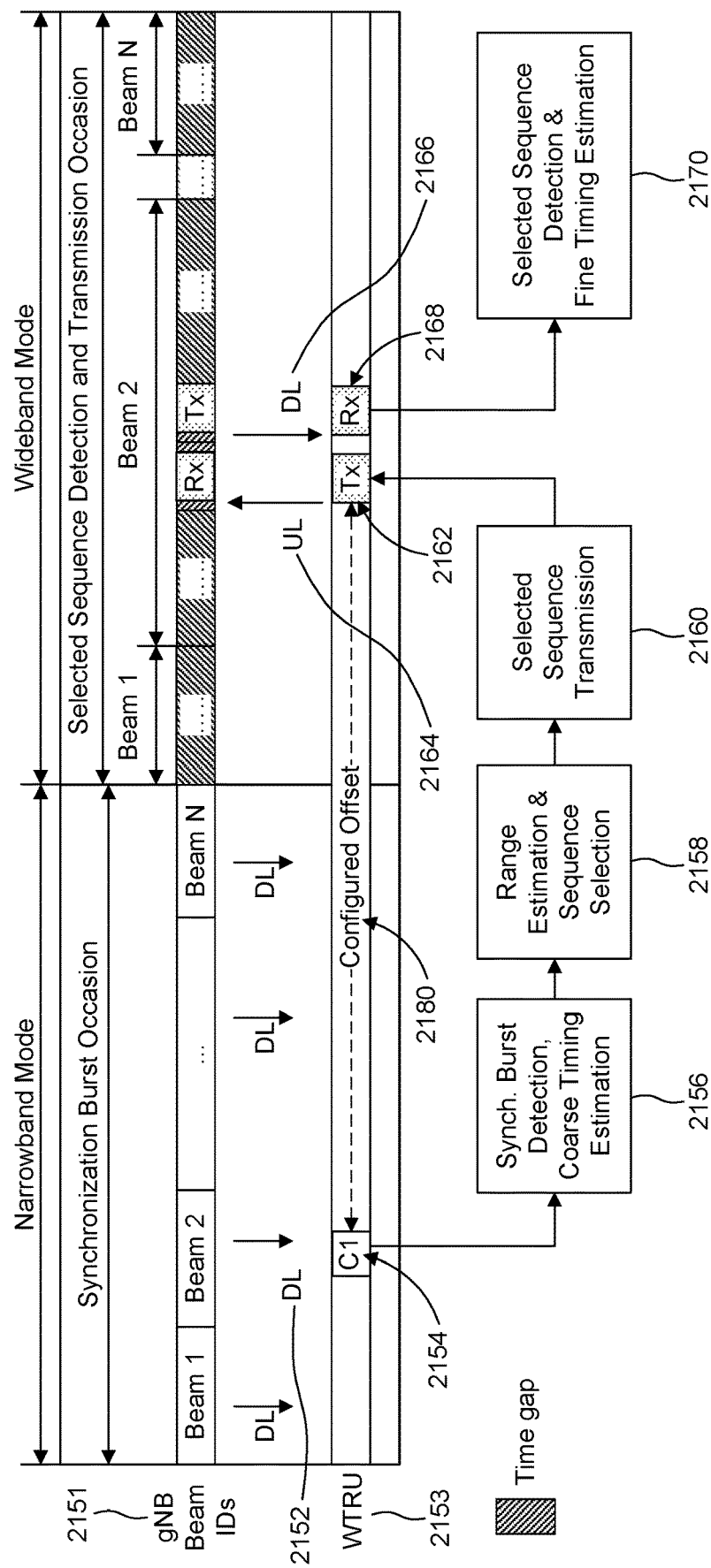
FIG. 21B depicts an example bidirectional SubThz/Thz initial timing synchronization.

FIG. 21B is an application of FIG. 21A addressing a Bidirectional Sub-THz/THz Initial Timing Synchronization timing scheme. In FIG. 21B, a timeline 2151 of gNB beam identifiers (IDs) is shown as a series of individual beams. A respective timeline 2153 of a WTRU is also depicted. A synchronization burst transmission in the DL direction at 2152 from the gNB to the WTRU timeline 2153 is shown as received by the WTRU at 2154. In this example, a C1 timing synchronization sequence, as shown in FIG. 19, is received by the WTRU at 2154. The WTRU processes the received initial timing synchronization 2154 in blocks 2156 through 2160. At 2156, synchronization burst detection and coarse timing estimation are conducted. At 2158, range estimation and fine timing sequence selection are performed. At 2160, the selected fine timing sequence selection is prepared for transmission by the WTRU. At 2162 the WTRU transmits the fine timing sequence selection after a Configured Offset 2180 (a Known Timing Offset) from the received DL synchronization burst from the gNB. From the WTRU timeline transmission at 2162, an uplink direction transmission at 2164 of the selected fine timing synchronization sequence to the gNB is performed. The gNB verifies the fine timing sequence selection and transmits the same fine timing synchronization sequence in the DL direction at 2166. The WTRU receives the same sequence at 2168 and then performs the selected fine timing sequence detection and fine timing estimation at 2170.

Figure 22:
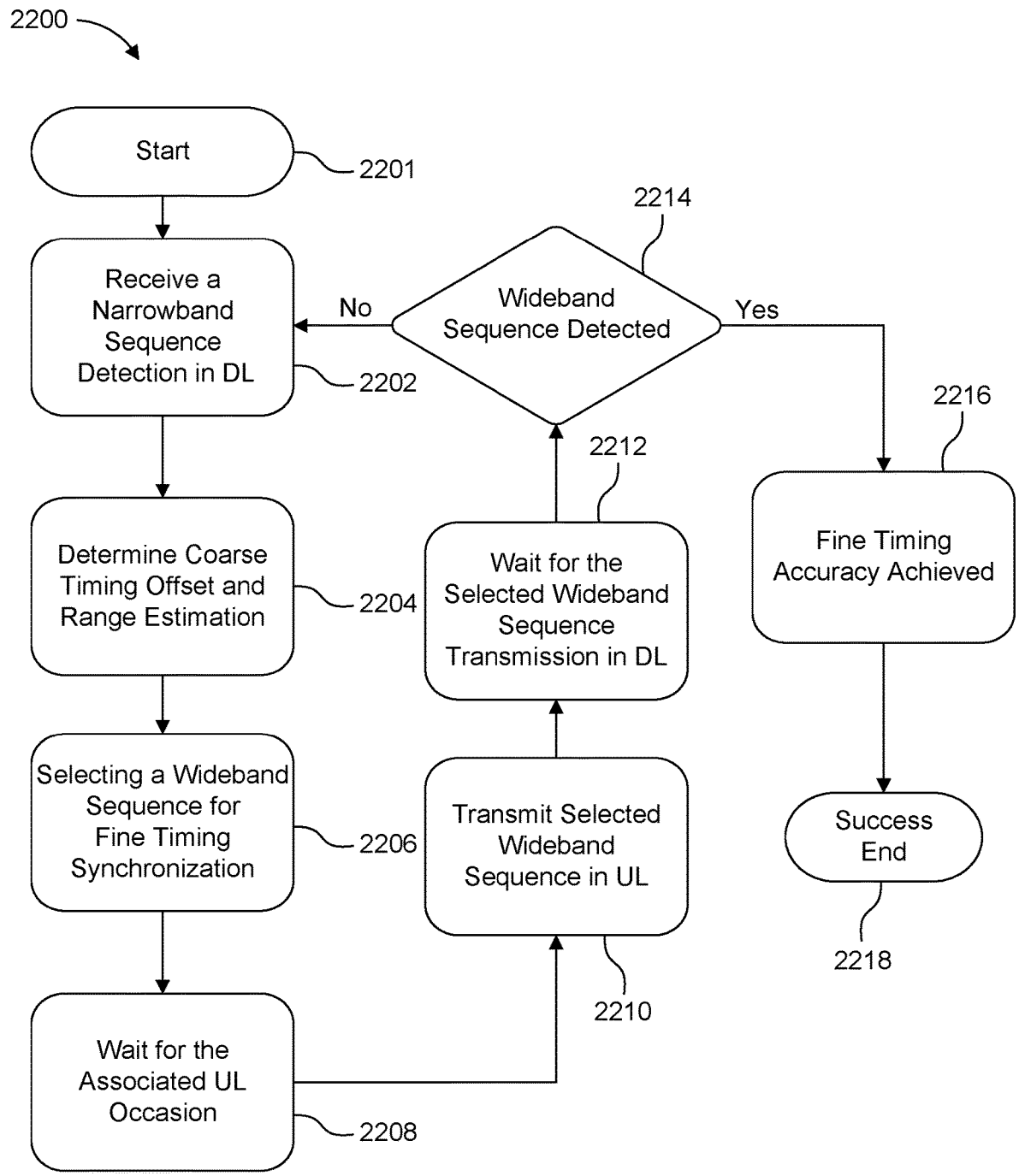
FIG. 22 depicts a high-level flow chart of main processing blocks.

FIG. 22 depicts an example bidirectional method 2200 performed by a WTRU similar to the example of FIG. 21. Referring to FIG. 22, the process 2200 starts at 2201. A WTRU receives an in-channel narrowband initial timing synchronization sequence detection in the DL (from a network component such as a gNB) at 2202. The WTRU determines coarse timing offset and range estimation at 2204. This may be accomplished by the WTRU examining an in-channel narrowband sequence correlation output of the received in-channel narrowband sequence. In one example, the coarse timing offset and the range estimation are made between a beam source of a network transmitter and the WTRU using a received in-channel narrowband synchronization sequence. At 2206, a wideband sequence for fine timing synchronization is selected by the WTRU. Wideband sequence selection may be accomplished by the WTRU using one or more of a variety of selection criteria. In one example criterion, selecting a wideband synchronization sequence includes selecting a wideband sequence that matches a wideband communication channel spectral profile. The range estimation may assist in the selection. A wideband communication channel spectral profile may describe the locations of the molecular absorption peaks in an operational channel. In another example criterion, selection of a wideband sequence includes using transparency window frequency location. Knowledge of transparency window frequency location may include information of molecular absorption frequencies and relevant range dependent losses. The location information of transparency windows may also be termed a frequency span of transparency windows. At 2208, the WTRU may then wait for an available UL occasion. Upon the UL availability, the selected wideband sequence is transmitted to the network (e.g. to a gNB) at 2210. In one embodiment, transmitting the wideband selected sequence for fine synchronization during an uplink timing occasion includes transmitting the selected sequence at a configured time offset (known time offset) related to the received coarse time synchronization (in-channel narrowband) sequence. At 2212, the WTRU the waits for a verification of the wideband sequence selection from the network (e.g. gNB) to be provided to the WTRU via a DL transmission from the network. At 2214, the WTRU determines if the wideband sequence in the DL was detected. If not, the method 2200 returns to 2202. If a wideband sequence detection is received by the WTRU in the network's DL to the WTRU, then the method 2200 proceeds to 2216 where the fine timing synchronization is accomplished by the WTRU and the network. The received DL wideband synchronization sequence from the network may enable the WTRU to establish the fine timing accuracy between the WTRU and the network. The method 2200 may end at 2218.

Figure 23:
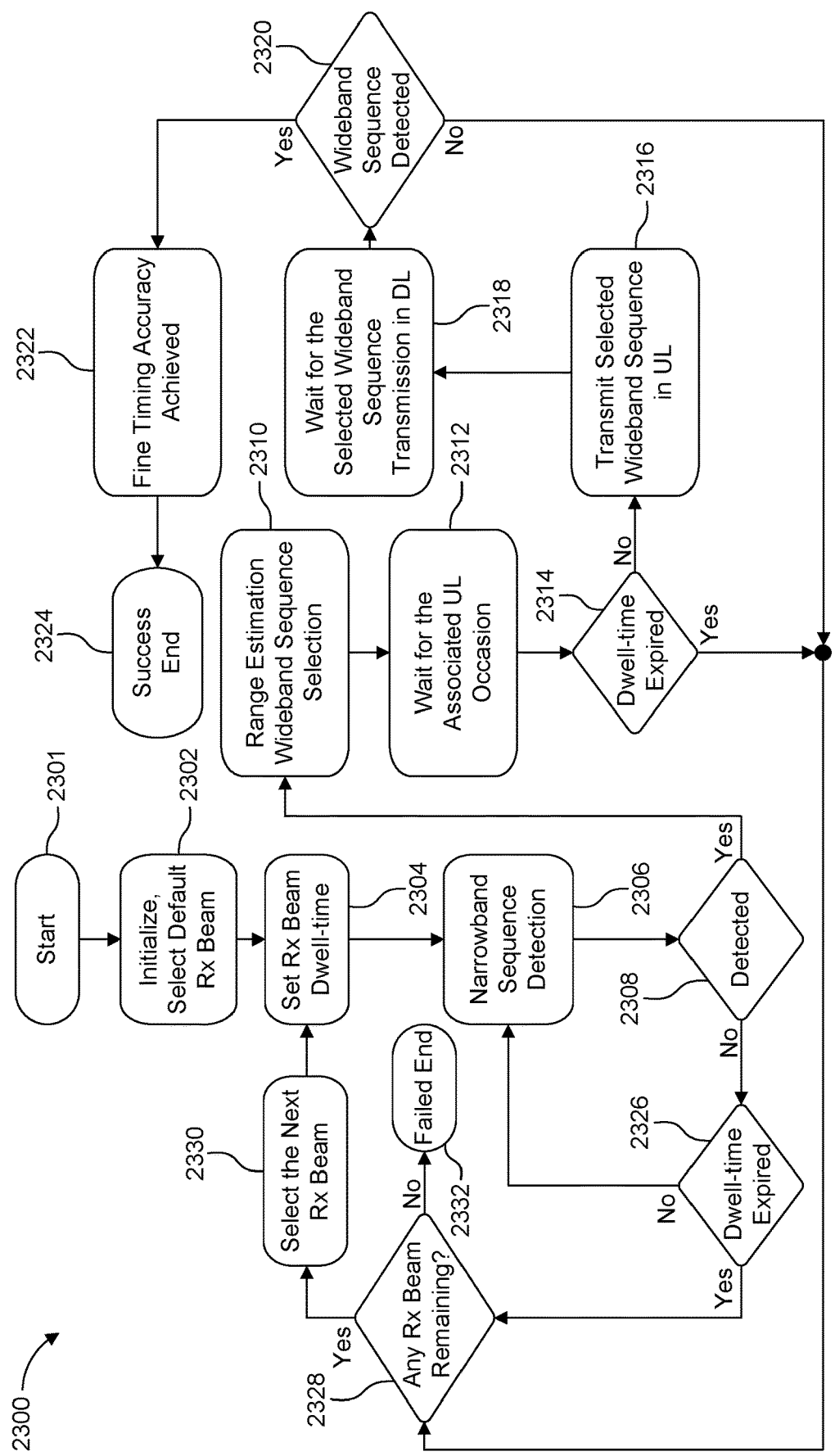
FIG. 23 depicts an example high level flow diagram of Bidirectional Standalone Approach.

The WTRU may start searching for the network by an event that may be triggered by upper layer procedures and employ an example control flow method 2300 as depicted in FIG. 23 or any other combinations. The example method starts at 2301. The WTRU may select a default Rx beam at 2302. The WRTU may set a RX beam dwell time at 2304. The WTRU starts searching for the in-channel narrowband sequence at 2306 within the dwell-time. At 2308, if no in-channel narrowband sequence is detected, then at 2326, and if the dwell time has not expired, then in-channel narrowband sequence detection continues at 2306. If at 2326, the dwell-timer expires, the WTRU determines if any RX beams are remaining. If no Rx beams remain, the sequence detection method 2300 ends at 2332. If at 2328, there are RX beams remaining, the WTRU configures another Rx beam at 2330 and sets a RX beam dwell time at 2304. The method 2300 then starts searching for the in-channel narrowband sequence within the dwell-time at 2306. This process continues until all Rx beam options are exhausted. If the in-channel narrowband sequence is detected at 2306 and 2308, the WTRU performs a range estimation between the transmitter and the receiver at 2310. Also at 2306, the WTRU selects a wideband sequence based on apriori knowledge of the molecular absorption peaks within the operational wideband communication channel, where the selected wideband sequence occupies the whole operational band. After selecting the wideband sequence at 2310, the WTRU waits for the UL timing occasion(s) at 2312. If at 2314, a dwell time is not expired, the WTRU transmits the selected wideband sequence at 2316. The WTRU then waits at 2318 for a response from the network (e.g. from the gNB). As the response, the network detects and transmits back the selected wideband sequence. If at 2320, the WTRU detects the selected wideband sequence response from the network, that at 2322, the WTRU establishes the fine DL synchronization. The method may end at 2324. If after waiting for an uplink occasion at 2312, if the dwell time at 2314 has expired, then the process may return to determine if there are any remaining RX beams at 2328. Likewise, if a t 2320, no wideband sequence response was detected from the network, then the method 2300 may return to determine if there are any remaining RX beams at 2328.

The flow diagram of FIG. 23 depicts only a single transmission in the beam associated UL timing occasion; however, the WTRU may transmit selected wideband sequence in multiple beam associated UL timing occasions if provisioned by the SIM Card or any other way.

Solution 2: Minimum Offset Time with Flexible UL Transmission

Figure 24:
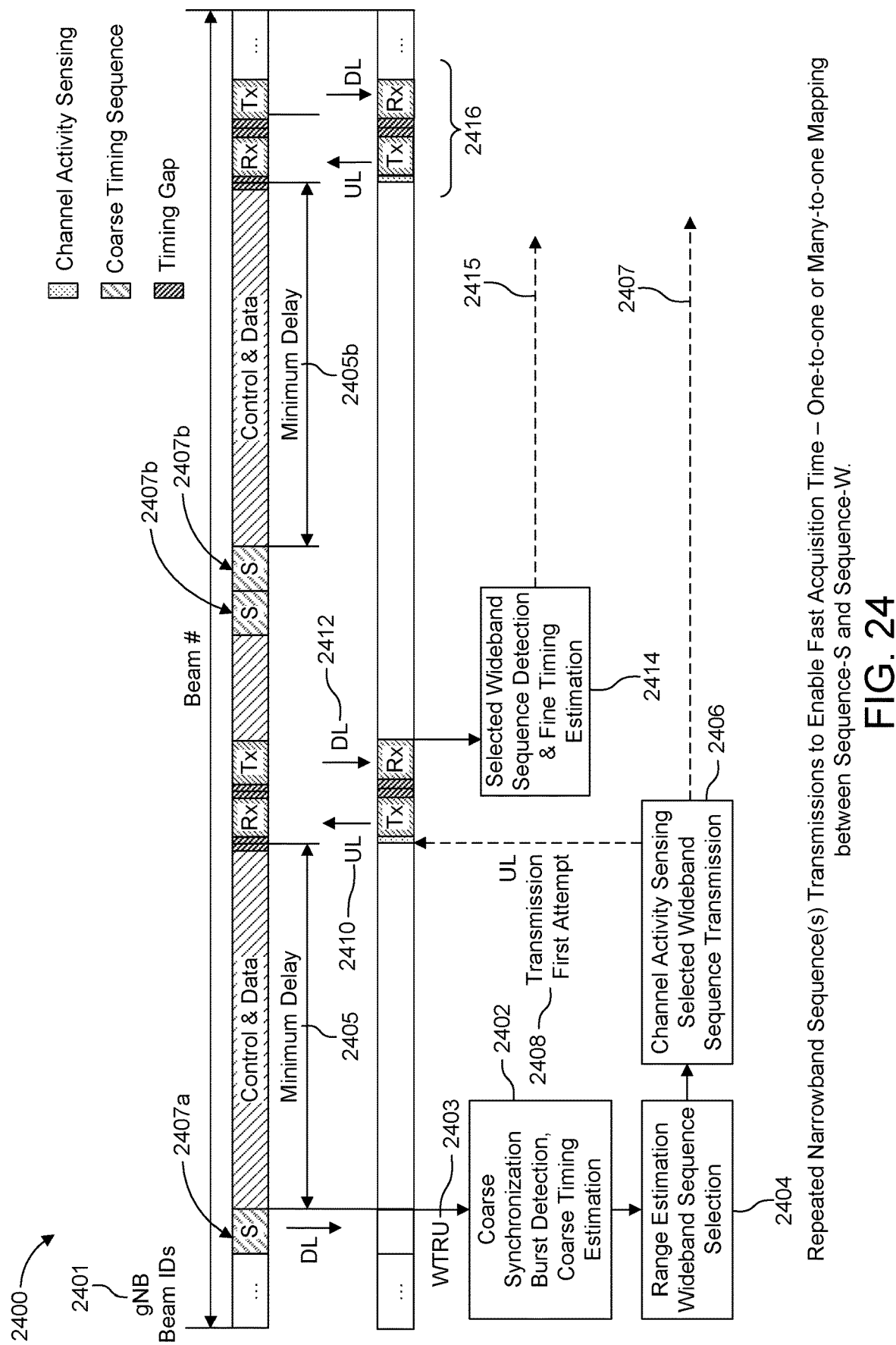
FIG. 24 depicts repeated in-channel narrowband sequence transmissions to enable fast acquisition time.

The discussion of Solution 2 addresses aspects of example Embodiment 2 discussed hereinabove. FIG. 24 depicts a timeline 2400 of interactions between a timeline 2401 for a gNB and a timeline 2403 for a WTRU involving aspects of Embodiment 2. The gNB timeline 2401 indicates that the gNB may transmit an in-channel narrowband coarse synchronization sequence(s) in the DL direction to the WTRU in time periods 2407a, 2407b. The minimum offset time 2405 enables flexible resource utilization to support initial WTRU synchronization with the network. The minimum delay offset 2405 guarantees the delay necessary for the WTRU to process coarse timing sequence detection and coarse timing estimation 2402, range estimation and wideband sequence selection 2404 for fine timing synchronization. A channel activity sensing step may be performed by the WTRU as part of the transmission preparation of the selected wideband sequence transmission at 2406. If the channel detected to be occupied by other transmissions, the WTRU waits for the next UL opportunity 2408 to access the channel. The WTRU may transmit the selected wideband sequence in the UL direction to the gNB at 2410. A downlink direction transmission from the gNB to the WTRU of the selected wideband sequence is received by the WTRU at 2412. Thereafter, the WTRU may perform sequence detection and fine timing estimation at 2414 using the received wideband sequence from the gNB. In order to facilitate flexible resource allocation after transmission of in-channel narrowband coarse timing synchronization sequence (sequence-S), UL and DL transmission and reception of selected wideband fine timing synchronization sequence (sequence-W) can be repeated periodically to enable fast acquisition time as shown in FIG. 24 at 2416. The sequence-S can be transmitted once or multiple times, separated by the Minimum Delay, such as at 2405b. The minimum timing delay can be set, for example, starting at the tail of the last sequence-S transmission. In FIG. 24, if the first UL transmission attempt at 2408 is missed, other attempts may be made (such as at opportunity 2416 or other future instances) using a future next UL attempt at 2407. Likewise, if the operation at 2414 fails, then another DL W sequence may be received and processed by the WTRU (such as at 2416 or other future instance) and the WTRU may perform step 2414 at such future received DL instance as indicated by 2415. As such, dotted lines at 2407 and 2415 may represent repeated multiple attempts at an UL and/or DL of a w-sequence if a first attempt is missed.

Figure 25:
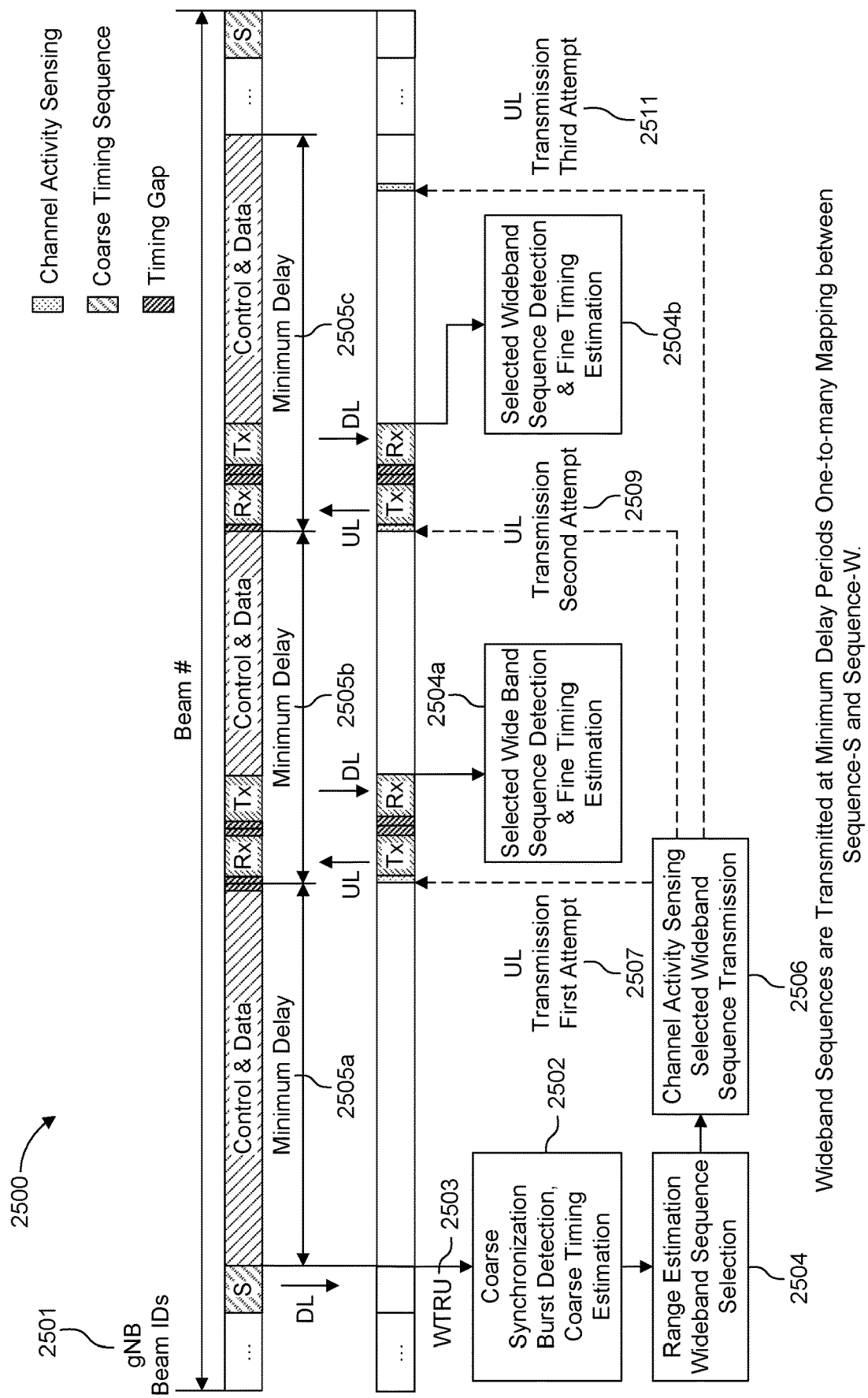
FIG. 25 depicts wideband sequences transmitted at minimum delay periods.

Additionally, sequence-S to sequence-W transmission mapping can be one-to-one or one-to-many as shown in FIG. 25 or any other mapping combination can be set to optimize among latency, detection performance, energy efficiency, etc. FIG. 25 depicts an example similar to the basic framework of FIG. 24. FIG. 25 depicts a timeline 2500 of interactions between a timeline 2501 for gNB activity and a timeline 2503 for WTRU activity. As before, upon DL of a sequence-S, coarse synchronization burst detection and timing estimation are conducted at 2502, range estimation and wideband sequence selection is conducted at 2504. Channel activity sensing and wideband sequence selection is conducted at 2506 prior to a first UL transmission attempt 2507 of the selected sequence-W to the gNB after minimum delay period 2505aa. In FIG. 25, wideband sequences (sequence-W) selections may be transmitted at UL transmission attempts 2507, 2509, and 2511 by the WTRU after minimum delay periods 2505a, 2505b, and 2505c respectively. In a first UL attempt 2507, a WTRU may transmit a selected wideband synchronization sequence (selected sequence-W) and possibly receive a verification of the same sequence from the gNB for WTRU processing at 2504a. An UL second attempt 2509 at a transmission of a sequence-W may occur after a minimum delay 2505b from the missed first attempt. Thereafter, a second possible receipt of a sequence-W from the gNB for processing by the WTRU at 2504b may occur. A third attempt at transmitting a selected W sequence may occur at 2511 after minimum delay period 2505c.

Figure 26:
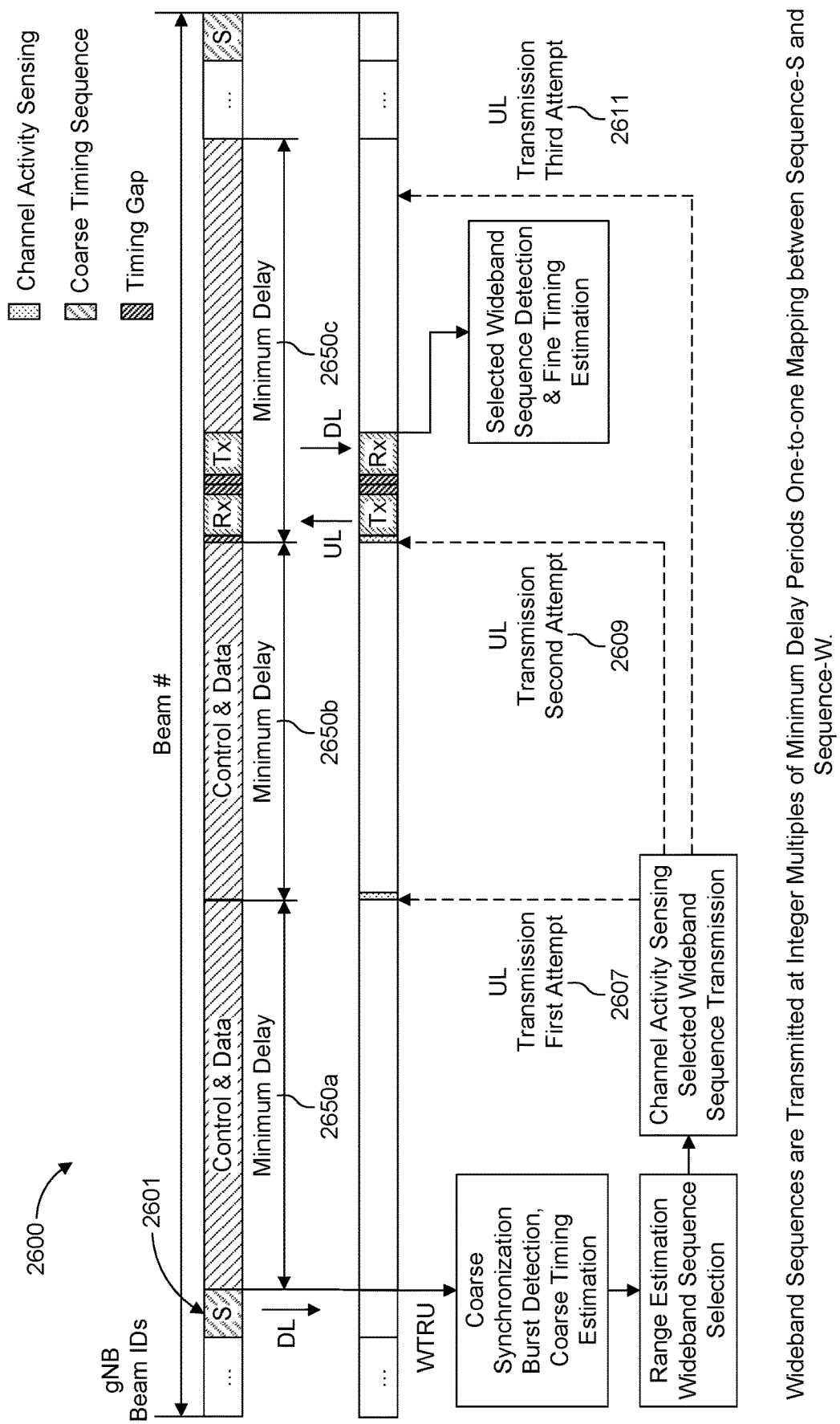
FIG. 26 depicts wideband sequences are transmitted at integer multiples of minimum delay periods.

The scheduling of sequence-S and sequence-W can be set such that after sequence-S transmission, the sequence-W transmission can be allowed at lower periodicity as depicted in the timeline 2600 of FIG. 26. FIG. 26 depicts a timeline of gNB beam ID and WTRU activity similar to FIG. 25. However, in FIG. 26, the condition occurs where wideband sequences are transmitted at integer multiples of minimum delay periods in a one-to-one mapping between sequence-S and sequence-W. In FIG. 26, an in-channel narrowband coarse timing synchronization sequence is transmitted by a gNB at 2601. As in FIG. 25, the WTRU conducts the sequence-S burst detection, range estimation, and wideband W-sequence selection. At 2607 in FIG. 26, a first attempt at UL transmission of the selected wideband W sequence may be made after minimum delay 2650a. A second attempt at a W-Sequence UL transmission is made at 2609 after minimum delay 2650b. This successful example UL attempt at 2609 occurs at an integer multiple of the minimum delay period 2650a, 2650b. The transmission of sequence-W can be mapped to integer multiple(s) of the minimum delay period. A third possible attempt at a sequence-W UL transmission may be made at 2611 after minimum delay 2650cthis may or may not coincide with a specific integer multiple of minimum delay periods.

Figure 27:
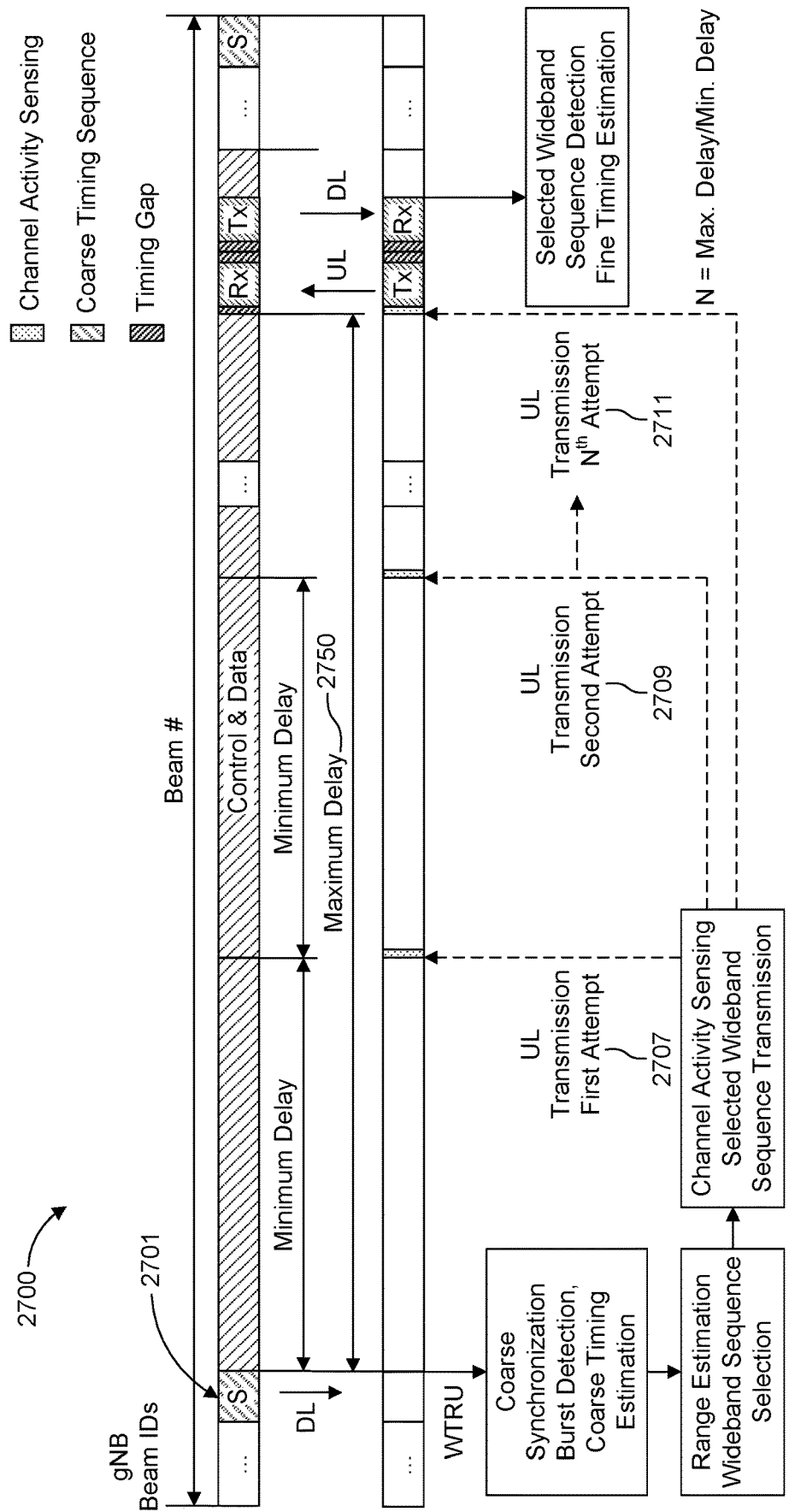
FIG. 27 depicts wideband sequences are transmitted at maximum delay periods.

In another possible embodiment, sequence-S can be mapped to a single sequence-W transmission at the maximum delay period as illustrated in the timeline 2700 of FIG. 27. FIG. 27 depicts a timeline of gNB beam ID and WTRU activity similar to FIG. 25. However, in FIG. 27, the condition occurs where wideband sequences are transmitted at maximum delay periods (2750) in a one-to-one mapping between sequence-S and sequence-W. Thus, it can be seen in FIG. 27 that an in-channel narrowband coarse timing synchronization sequence is transmitted by a gNB at 2701. As in FIG. 25, the WTRU conducts the S-sequence burst detection, range estimation, and wideband sequence-W selection. At 2707, a first attempt at UL transmission of the selected wideband sequence-W may be made. A second attempt at a Sequence-W UL transmission is made at 2709. At 2711, a third UL transmission attempt may be made where the WTRU activity shows a subsequent successful UL and received DL. This successful UL and DL example occurs at a maximum delay period 2750. The sequence-S and sequence-W mapping is not limited to FIGS. 24-26, the scheduling can be created to maximize energy saving as captured in FIG. 27 or to minimize acquisition time as shown in FIG. 25.

The above Solution 2 only focuses on creating the flexibility for a single beam in mapping and transmission of sequence-S and sequence-W. It should be clear that the WTRU receive beam selection and necessary dwell time for sequence-S detection must take place first, then the depicted timelines or other combinations for sequence-W transmissions can follow.

Figure 28:
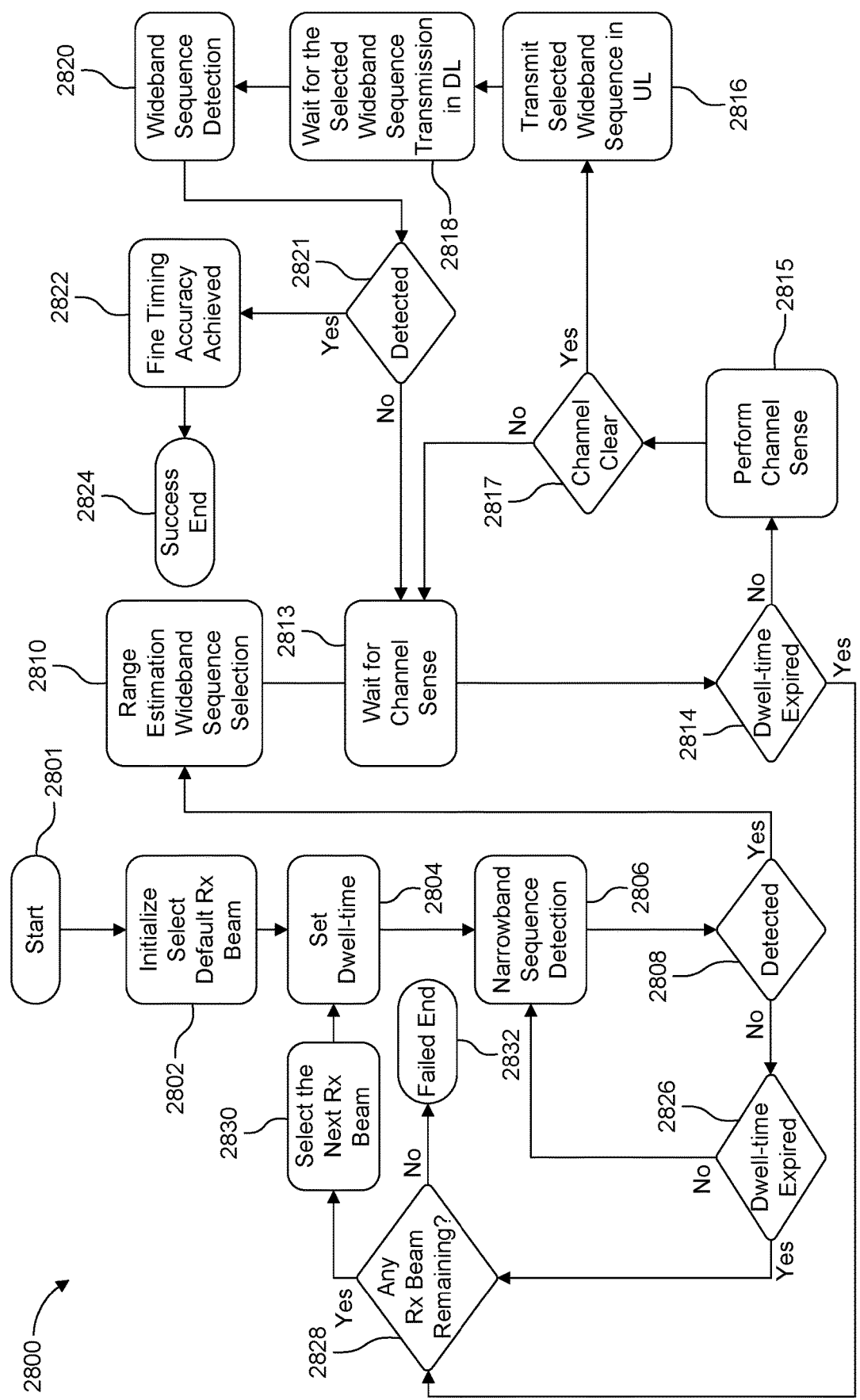
FIG. 28 depicts an example High level flow diagram of flexible uplink transmission.

The example flexible UL transmission high level flow diagram is captured in the example method 2800 of FIG. 28. The example method starts at 2801. The WTRU selects a default Rx beam at 2802. The WTRU sets the dwell-timer after initialization at 2804. The WTRU starts scanning the input to detect an in-channel narrowband sequence-S at 2806. At 2808, if no in-channel narrowband sequence is detected, then at 2826, and if the dwell time has not expired, then in-channel narrowband sequence detection continues at 2806. If at 2826, if the dwell-timer expires, then the WTRU at 2828 determines if there are any remaining Rx beams. If no, the process 2800 fails and ends at 2832. If there are remaining Rx beams at 2828, then the WTRU selects the remaining Rx beam(s) at 2830 and the process continues at 2804 by setting new dwell time. The process continues to detect the sequence-S at 2806 until all beams are exhausted. If the sequence-S was detected at 2808, the range estimation is performed at 2810 via sequence-S parameter extraction such as signal power level. Then, a sequence-W candidate list is created based on molecular absorption peak locations on the wideband communication channel. The list can include more than one wideband sequence. Once the wideband sequence(s) is determined at 2810, the WTRU checks (waits) for channel sense at 2813 periodically at integer multiples of the minimum delay amount. If at 2814, a dwell time is expired, the method 2800 returns to 2828 to check for any RX Beam remaining. However, if at 2814, the dwell time is not expired, then the WTRU performs channel sense at 2815. At 2817, if the channel is not clear, the method returns to 2813 to wait for channel sense. If at 2817, the channel is clear, then the WTRU may transmit the selected wideband sequence(s) in UL at 2816. At 2818, the WTRU waits for the wideband sequence-W to be returned via a DL from the network (gNB). At 2820, the received DL sequence is detected as received. At 2821 if the DL sequence is not detected, the method moves to 2813 to await a channel sense. If at 2821, a DL sequence is detected as the sequence-W, then fine timing accuracy may be achieved at 2822. The method may then successfully end at 2824.

The indication of the start time of wideband sequence transmission (the offset) via coarse timing sequence transmissions can be achieved in multiple ways. For example, the in-channel narrowband sequence can have a bit field that explicitly indicates the offset, the number of in-channel narrowband sequence repetition can indicate the offset implicitly, where any timing reference can be created as the beginning of the offset timing based on the first or the last in-channel narrowband sequence or any other combination can be used to set the beginning of the offset timing reference.

Solution 3: DL Only Initial Synchronization Procedure

Figure 29:
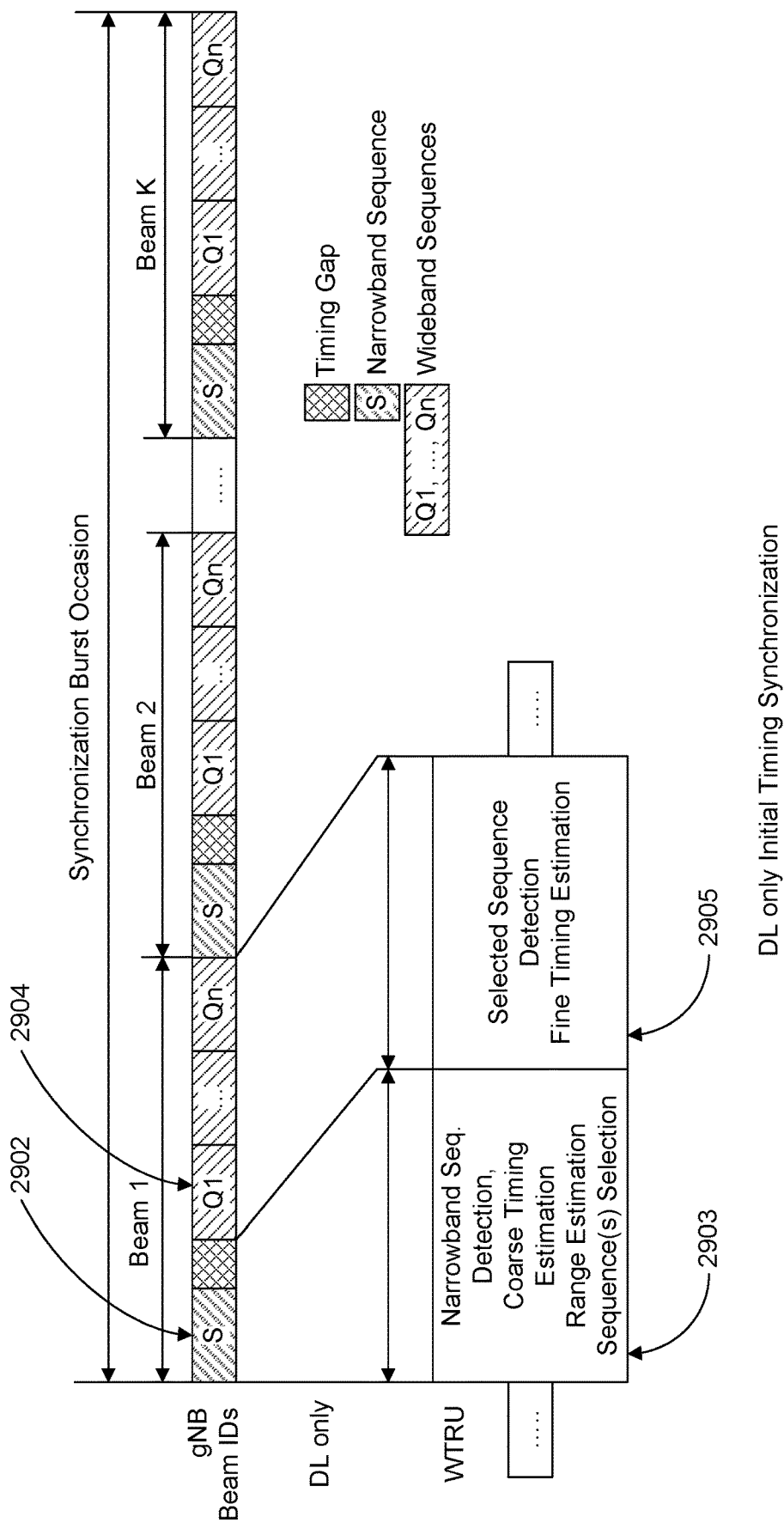
FIG. 29 depicts an example downlink only Initial timing synchronization.

The discussion of Solution 3 addresses aspects of example Embodiment 3 discussed hereinabove. The network periodically transmits synchronization sequences to enable coarse timing synchronization via coarse timing sequence and distance dependent fine timing sequences as depicted in FIG. 29. The coarse timing synchronization sequence is defined as in-channel narrowband and located at lower part of the wideband communication channel as described hereinabove in the section entitled Coarse Synchronization Sequence Definition. The distance dependent sequences are designed to occupy the entire wideband communication channel to enable the fine timing synchronization while avoiding energy concentration on the expected molecular absorption peaks in the wideband communication channel. The FIG. 29 shows an example frame structure and captures only the portion of a frame to depict the relevant procedure for the initial timing synchronization, the other time slots for UL/DL data or control exchange is not shown for simplicity. FIG. 29 is presented to show a DL only initial timing synchronization option.

The narrowband mode is active during transmission and reception of the coarse timing synchronization sequence(s). Similarly, the wideband mode is active during the transmission and reception of the wideband fine timing sequence(s). The WTRU upon detection of the coarse timing synchronization sequence(s) establishes the coarse timing offset and estimates the range. The WTRU, then, selects predefined wideband sequence(s) by using the estimated range and transparency window related parameters. The selected wideband sequence(s) is among the ones already known to the network and the WTRU, thus the WTRU searches for selected known wideband sequences.

For example, within Beam 1 of FIG. 29, an initial coarse timing synchronization (sequence-S) transmitted by the gNB at 2902 is received by the WTRU where the processing of block 2903 occurs. The WTRU processing includes a course timing estimation, a range estimation, and wideband sequence selection. During the Beam 1 time period, the gNB also transmits one or more fine timing synchronization sequences (sequences labeled as Q1-Qn). Q1 at 2904 is one example. The WTRU can select one of the wideband Q fine timing synchronization sequences to then perform the processing of block 2905. The WTRU processing then includes selected sequence detection and fine timing estimation.

In order to reduce the overhead and save energy, the in-channel narrowband coarse synchronization sequence(s) can be transmitted multiple times before transmitting wideband distance dependent sequences. For example, a selected beam is used to transmit the coarse synchronization sequence over M iterations, then the wideband sequences can be transmitted once at periodicity of M, 2M, 3M, PxM. The integer number PxM indicates the largest amount of time before transmitting wideband sequences. In this approach the in-channel narrowband sequence(s) can indicate an index to locate boundary of M where there is actual wideband transmissions. The WTRU detecting coarse timing sequences can establish coarse timing and frequency offset with respect to the network and starts waiting for wideband sequences to be transmitted at periods M, 2M, PxM. Once the wideband sequence(s) is detected fine timing synchronization is established.

Figure 30:
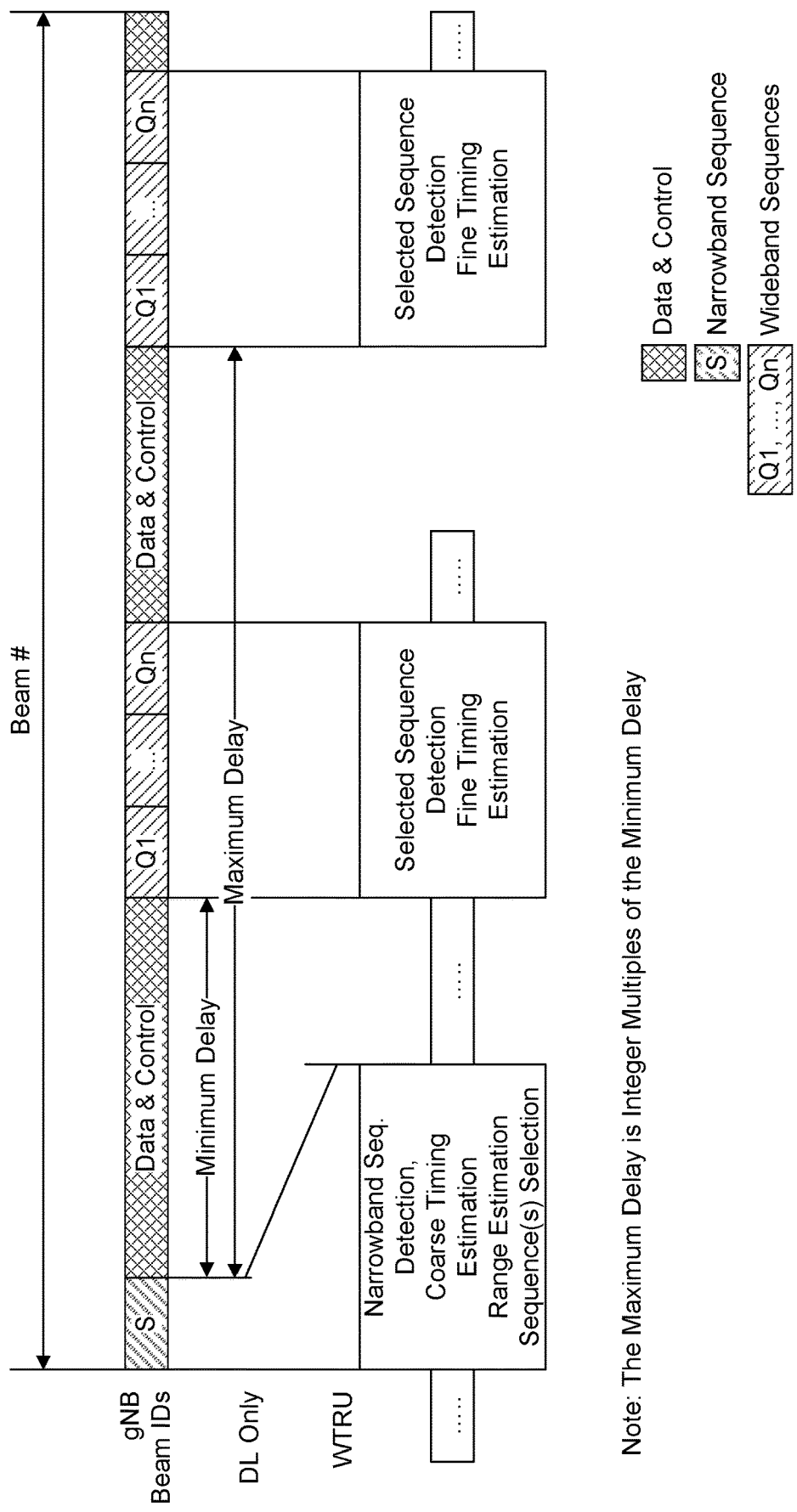
FIG. 30 depicts a downlink only initial timing synchronization with minimum and maximum delay.

There are various ways to create flexibility in DL narrow and wideband sequence transmissions. For example, the in-channel narrowband sequence "S" can be followed by distance dependent, molecular absorption aware wideband sequences "Q1, . . . , Qn" by a minimum delay as shown in FIG. 30. FIG. 30 depicts a DL only initial timing synchronization with minimum and maximum delay. The figure only shows the example frame structure for a single beam. In order to minimize the transmission of wideband sequences, a single set of "Q1, . . . , Qn" can be transmitted at maximum delay as depicted in FIG. 30.

There can be different frame structures made of one-to-one, one-to-many, many-to-one or many-to-many in between "S" and "Q1, . . . , Qn" as depicted in figures of the hereinabove section entitled Solution 2 Minimum Offset Time with Flexible UL Transmission. Also, wideband sequences Q1, . . . , Qn can be sequentially transmitted as shown in FIG. 30 or staggered such that multiple sets of wide wideband sequences can be transmitted over multiple occasions or any other combination can be used.

Figure 31:
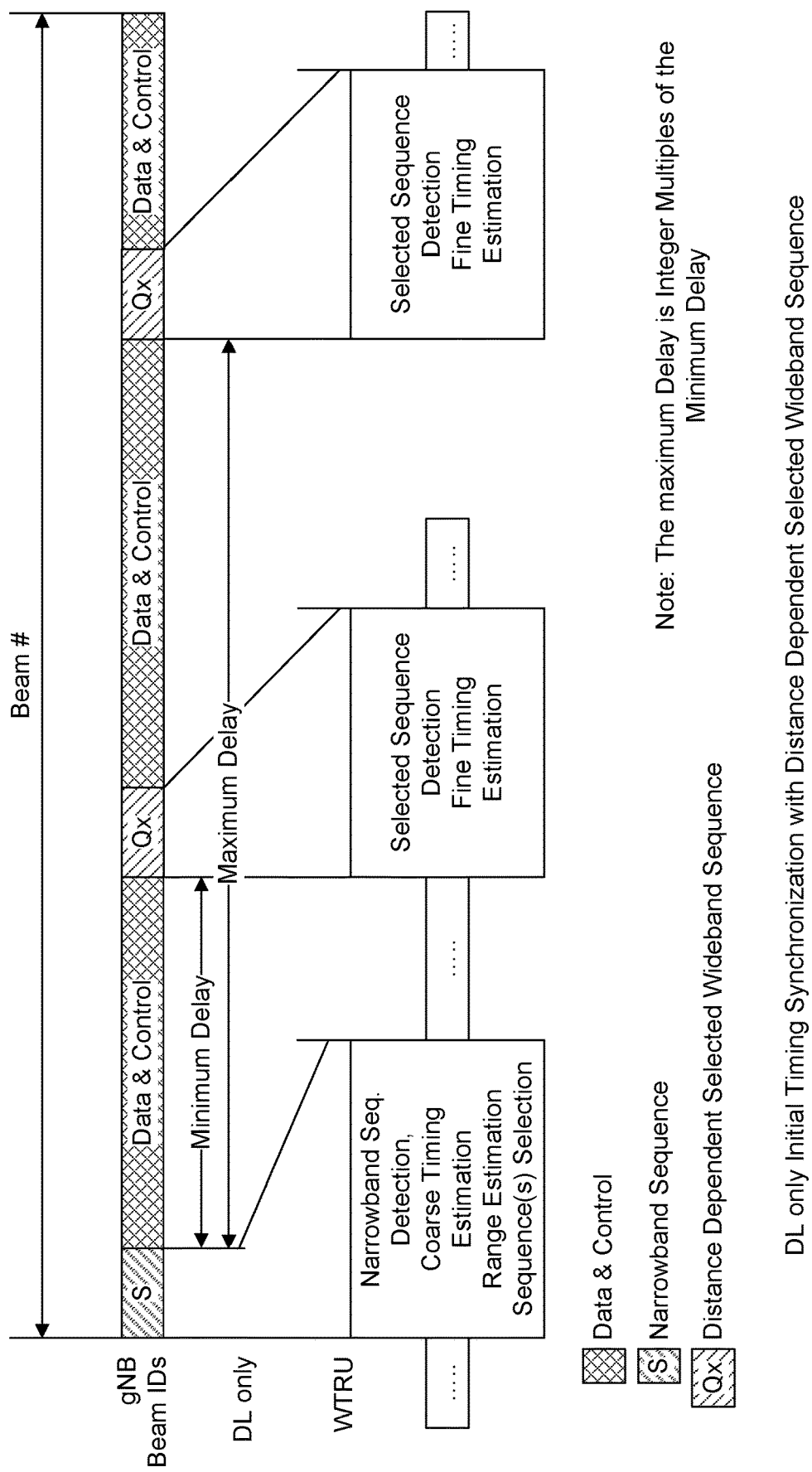
FIG. 31 depicts a downlink only initial timing synchronization with distance dependent selected wideband sequence.

In a deployment scenario where a beam source's distance to the illuminated area is relatively fixed, especially when the beam is normal to the illuminated surface, transmission of a single selected wideband sequence or a subset of all wideband sequences can be performed. The beam illuminating distance can dictate which Q sequence(s) to use to increase resource utilization efficiency. For example, a single selected distance dependent wideband sequence Qx is transmitted in the DL direction as depicted in FIG. 31. FIG. 31 depicts DL only initial timing synchronization with distance dependent selected wideband sequence. Since the WTRU does estimate the distance based on detection of in-channel narrowband sequence-S, it can narrow down the search space to look for sequence Qx. FIG. 31 only shows a single wideband sequence transmission; however, a single or multiple distance dependent wideband sequences with various repetitions can also be transmitted.

Solution 4: on Demand OOB Assisted (Non-Standalone) Approach

The discussion of Solution 4 addresses aspects of example Embodiment 4 discussed hereinabove. The OOB link assisted approach assumes two different use cases as captured in FIG. 32 and FIG. 33. In Sub-THz/THz band(s), the communication systems are expected to employ highly directional beams due to high propagation losses. In order to create proper coverage, there has to be many directional beams deployed. That can cause an increase in the search space for initial device discovery. The OOB link assisted Sub-THz/THz device discovery approach minimizes the search space based on a priori knowledge gathered in OOB links. The OOB link assistance can be put into two main categories:

Coarse location/orientation information
Coarse timing reference

Coarse Location and Orientation Information Via OOB Link Assistance

Figure 32:
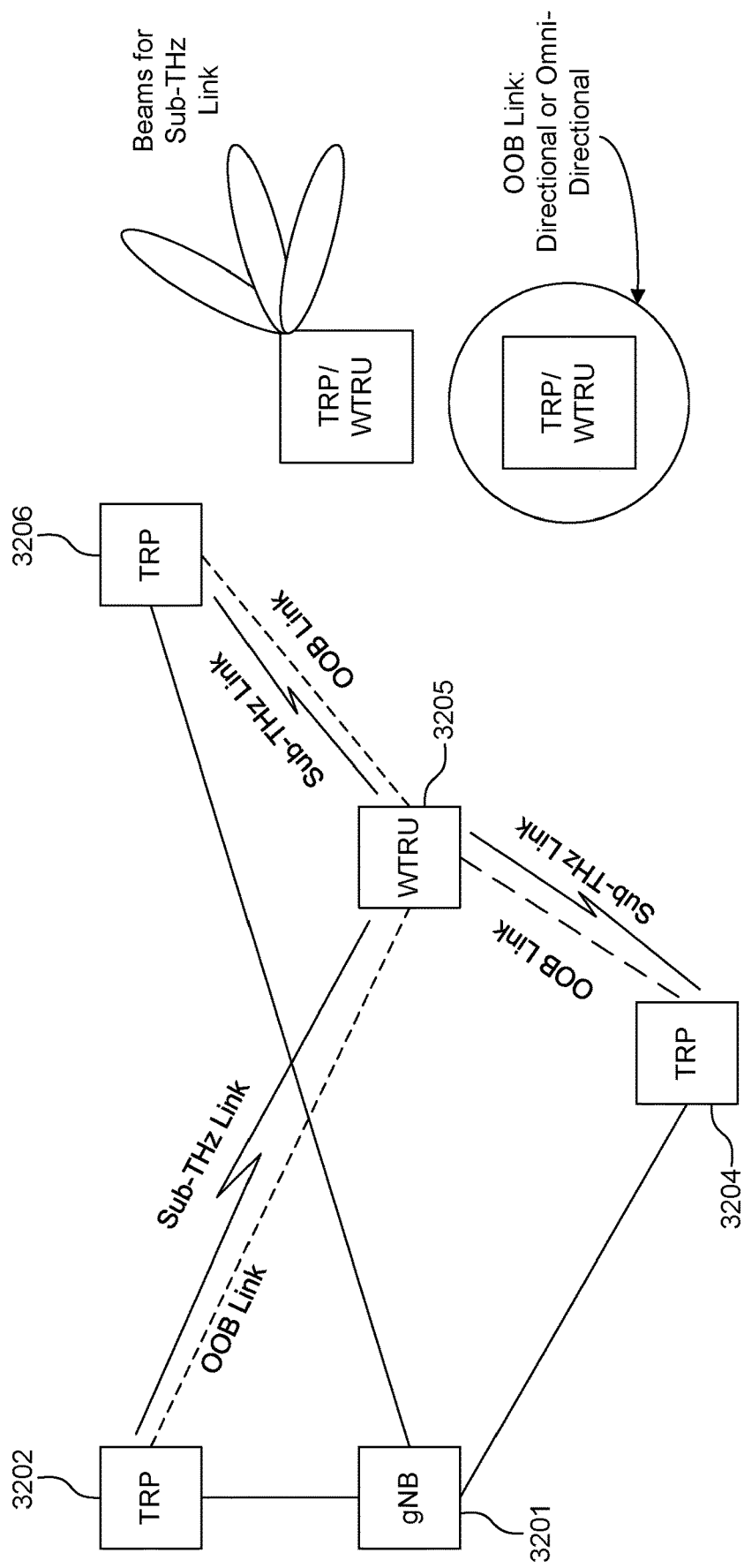
FIG. 32 depicts a deployment scenario showing single gNB with multiple transmission reception points.

The Sub-THz/THz band systems require dense deployment to ensure proper coverage. The coarse location and orientation information of an emerging WTRU via OOB link assistance enables the network to identify the Transmit Receive Points (TRPs) or the beam(s) to enable the associated TRP(s) and their beams to narrow down the search space to discover the WTRU in the deployment scenario of a single gNB with multiple TRPs as depicted in FIG. 32. In general, TRPs may be defined for given gNB. A gNB may be provisioned to have multiple TRPs to enable coverage enhancements. TRPs may have multiple beams associated to them and directly controlled by the gNB beam management algorithms. Note in FIG. 32 that a single gNB 3201 supports connectivity to three TRPs (3202, 3204, 3206). Each TRP has the capability to establish an OOB link with the WTRU 3205. The OOB links from each TRP to the WTRU 3205 are separate from the sub-THz links from each TRP. Also shown in FIG. 32 is the feature that a TRP /WTRU may have both beams for a given Sub-THz link plus an OOB omni-directional link or alternatively, directional OOB links. In the FIG. 32 configuration, the TRP/WTRU has these links to support communication between the WTRU 3205 and ultimately the gNB 3201. In one possible configuration of TRP/WTRU interfaces shown in FIG. 32, the main Sub-THz link may have a very large bandwidth to support above 100 GHz while the OOB link could be below 6 GHz with directional beams or omni directional connections. It is noted that the single gNB configuration of FIG. 32 also allows coordination in the network to minimize the interference in Sub-THz/THz band(s) if the synchronization bursts are transmitted in the DL direction. Also, the approach enables the network nodes that were identified as listening nodes based on OOB link assistance if the synchronization bursts are transmitted by the WTRU 3205 in the UL direction.

Figure 33:
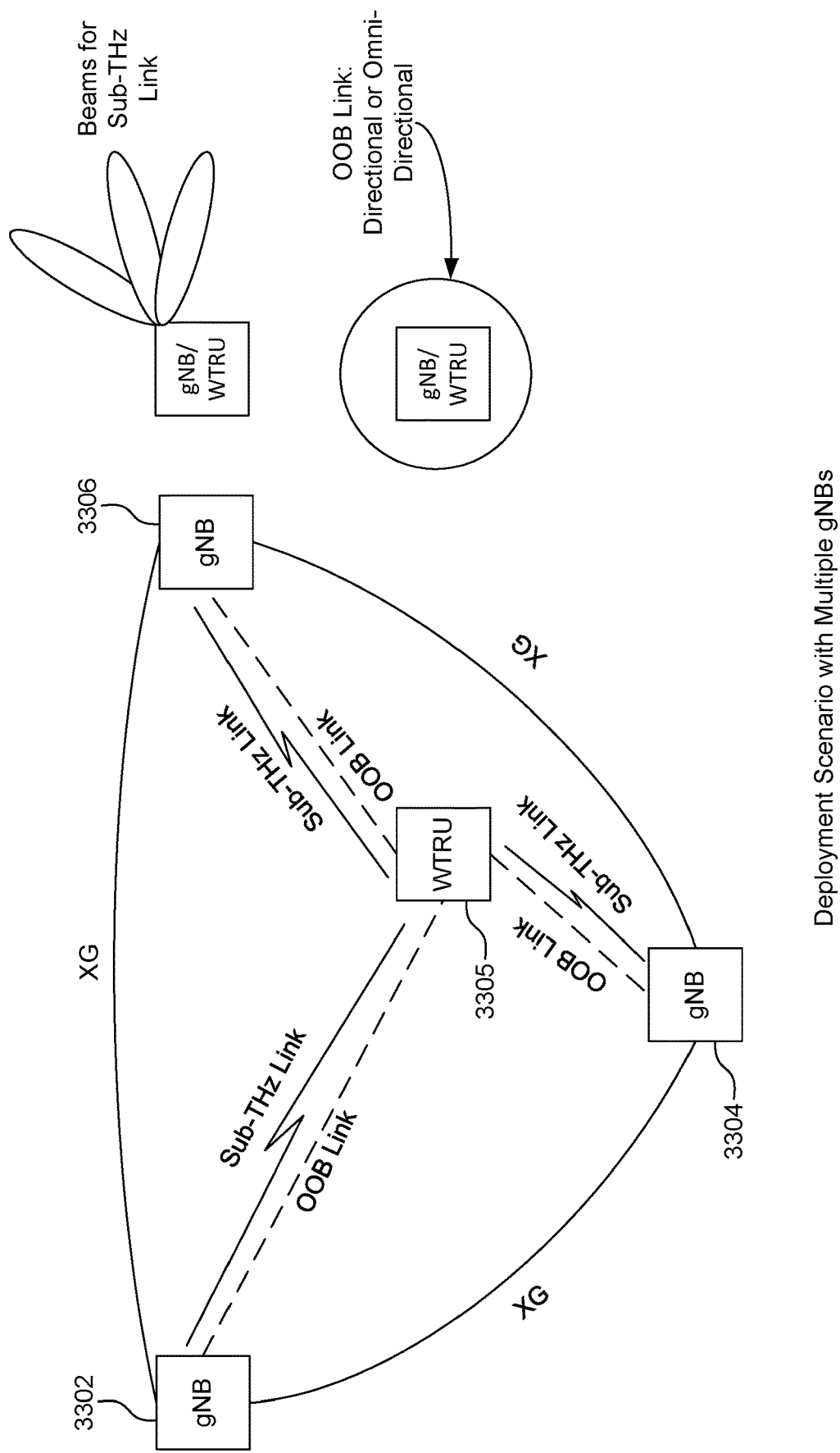
FIG. 33 depicts deployment scenario with multiple gNBs.

In the case of multiple gNB deployment scenario that is covering an area, the OOB link assistance and XG interface (i.e. interface between gNBs) can play a combined role to exchange information about a WTRU as illustrated in FIG. 33. In FIG. 33, a three gNB configuration is shown where gNB 3302, gNB 3304, and gNB 3306 directly support WTRU 3305 without a TRP. Here, each gNB can support a Sub-THz link and a separate OOB link. Thus, each gNB may have beams for a Sub-THz link and an OOB link using either an Omni-directional radiation pattern or a directional OOB beam pattern. In the multiple gNB system of FIG. 33, the OOB link assistance can create a coarse range estimation by using the exchanged location information about both gNB beams and the target WTRU 3305.

Coarse Timing Reference Via OOB Link Assistance

Figure 36:
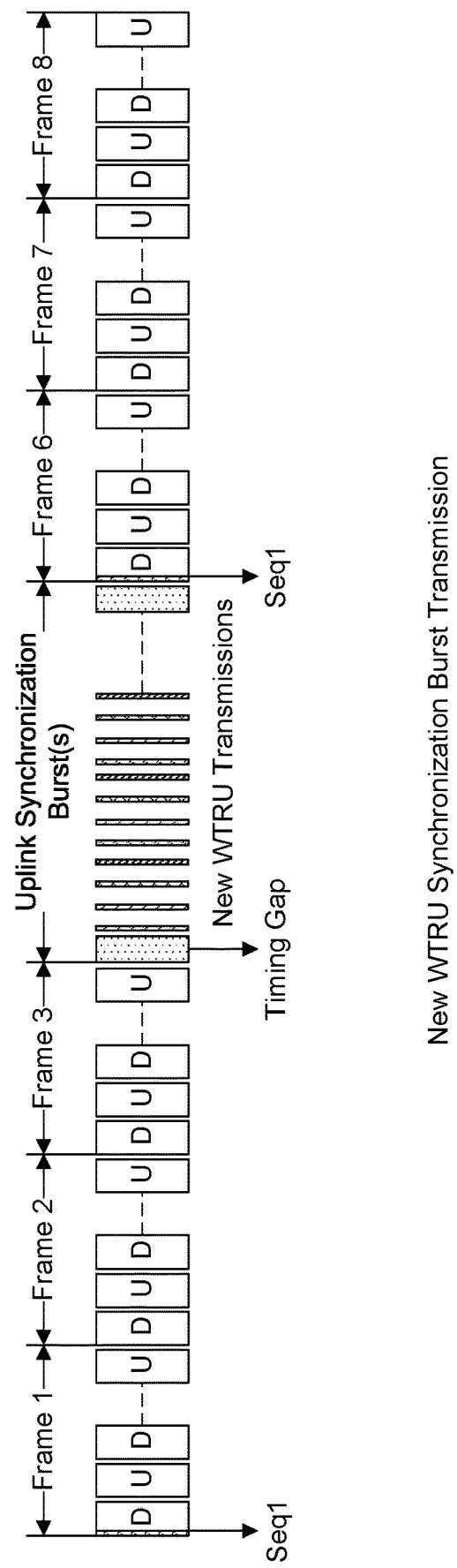
FIG. 36 depicts a new WTRU synchronization burst transmission.

In the initial device discovery procedure for Sub-THz/THz band(s), the OOB link timing can be used as coarse timing reference. The OOB link RAT(s) such as a 4G or 5G links below Sub-THz/THz band(s) have links established already between the network and the WTRU. The initial synchronization timing accuracy for cellular systems are defined in 3GPP standards as ±0.1 ppm relative to the carrier. It is expected that the WTRU for Sub-THz/THZ band device discovery procedure has already achieved the ±0.1 ppm timing accuracy via the OOB link. The timing gap at the beginning and in the end of synchronization occasion can be used to account for timing inaccuracy between the network and the WTRU in Sub-THz/THZ band as depicted in FIG. 36.

The approach described in this section assumes on demand OOB initiated device discovery. The triggering of Sub-THz/THz link establishment can be initiated by either the WTRU that needs services demanding higher data rates or the network that performs traffic offloading, load balancing etc. Similarly, the example synchronization burst shown in FIG. 36 can either be in UL or DL directions.

Figure 34:
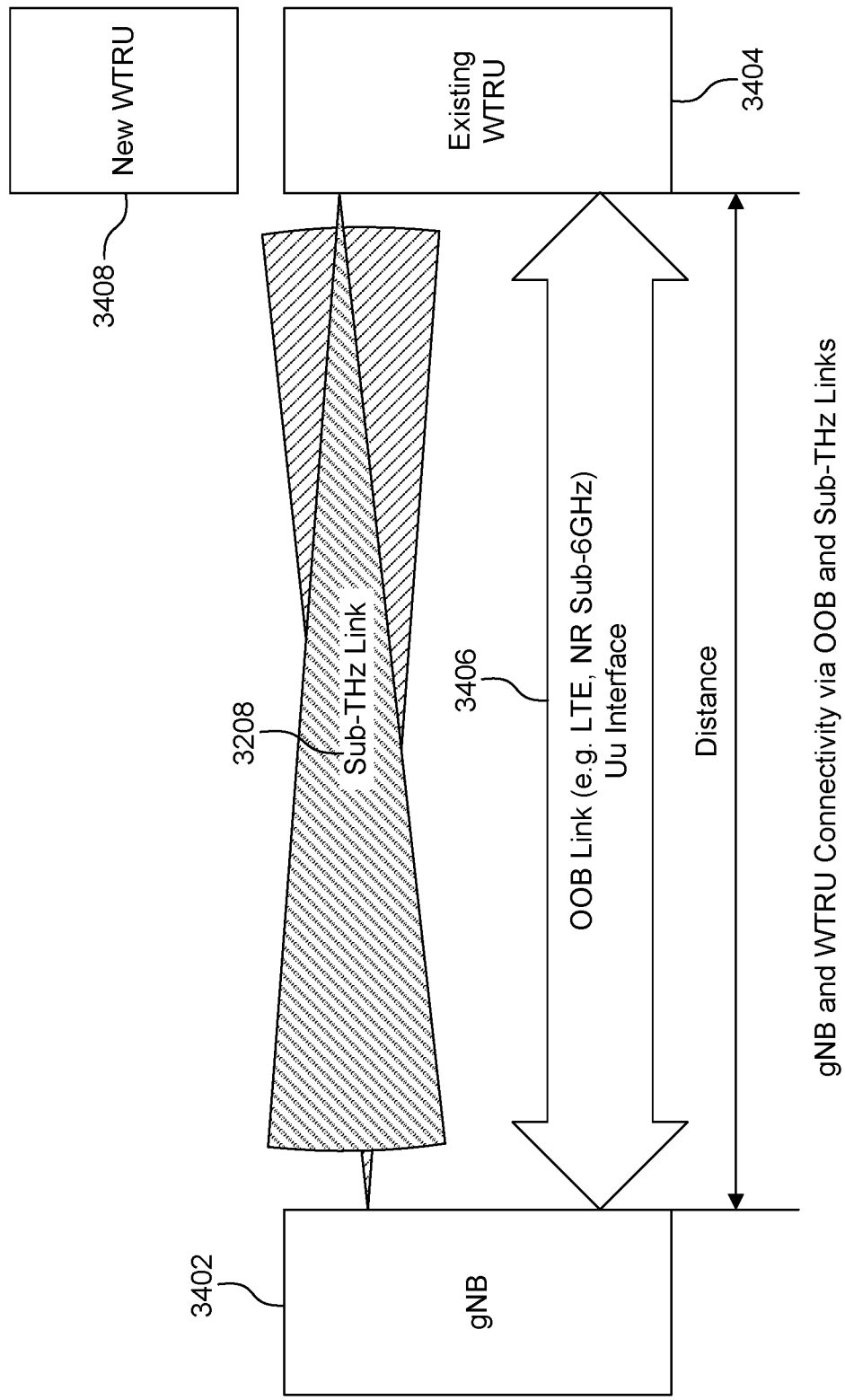
FIG. 34 depicts gNB and WTRU connectivity via out-of-band (OOB) and Sub-THz links.

OOB Assisted Sub-THz Synchronization Call Flow for a New WTRU Link Establishment FIG. 34 depicts a gNB 3402 having both Sub THz links and an OOB link 3406 with an existing WTRU 3404. It is assumed that a gNB 3402 and an existing WTRU 3404 have already had active communication established via Sub-THz and OOB links 3406 as illustrated in FIG. 34. It is also assumed that the best synchronization sequence selected between the existing WTRU 3404 and the network was determined as synchronization sequence 1. It is further assumed that the existing WTRU 3404 and the new WTRU 3408 would share the same gNB 3402 beam. The synchronization sequence selection and range estimation based algorithms are captured hereinbelow in the section entitled Sequence Selection and Range Estimation. The synchronization sequence properties and sequence generation are treated hereinbelow with respect to Sequence Design.

Figure 35:
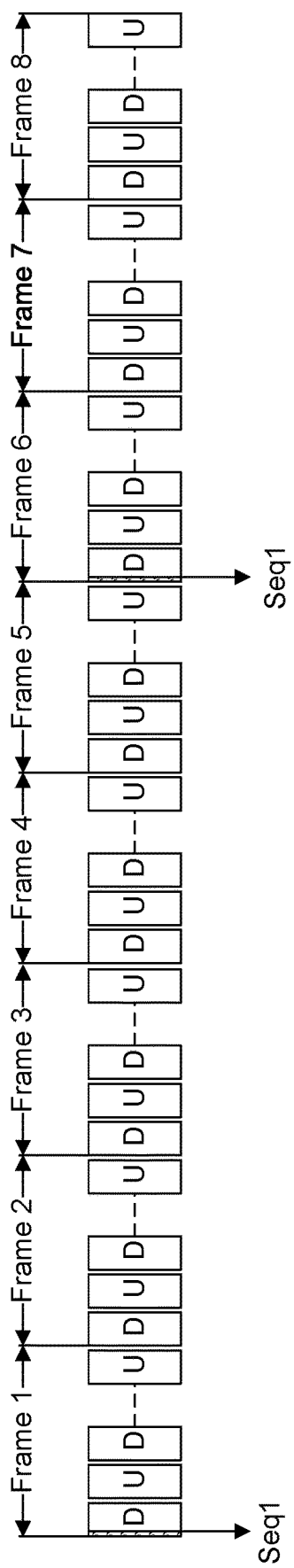
FIG. 35 is an Illustration of uplink/downlink (UL/DL) scheduling for a single WTRU.

In the case of a single beam pairing for Sub-THz/THz links, an example UL/DL slot scheduling between the gNB and the WTRU is depicted in FIG. 35, where synchronization sequence 1 is chosen to be the best sequence for the existing WTRU. The small gap shown between uplink and downlink timing slots is assumed for the RF switching latency. The successive UL or DL slots does not require such timing gaps.

When a new WTRU has been triggered via Sub-THz link to establish beam pairing with a gNB beam that is already paired with an existing WTRU(s), the gNB sends messages via OOB link to both the existing and the new WTRUs about synchronization burst timing and expects the new WTRU to transmit Uplink synchronization selection burst(s) as shown in FIG. 36. Although the figure only captures the uplink synchronization burst direction, the same approach can be used in the downlink direction.

Figure 37:
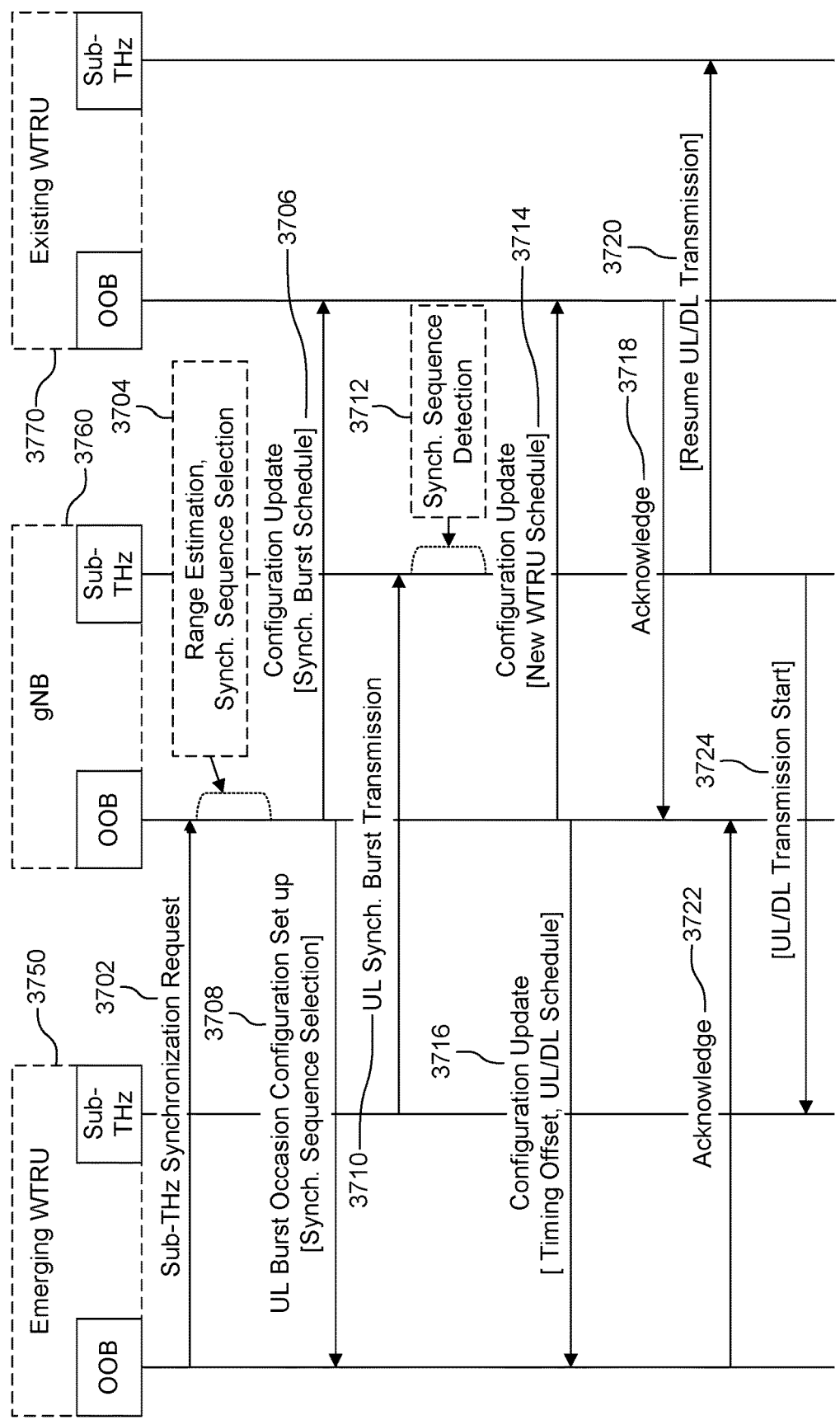
FIG. 37 depicts a OOB assisted Sub-THz synchronization call flow for a new WTRU link establishment.

The overall call flow for an emerging WTRU 3750 to synchronize to Sub-THz link with a gNB 3760 in a system with an existing WTRU 3770 is depicted in FIG. 37. The synchronization request 3702 can be initiated either by the WTRU 3750 or the network. Upon the reception of the initial request, the gNB 3760 determines which beam(s) to enable for listening the synchronization burst(s) that is transmitted by the emerging WTRU 3750. The gNB 3760 has a priori location, orientation and coarse timing information already as mentioned earlier about the emerging WTRU 3750 via OOB link to determine the best beam pairing choice(s) in the network among the beam(s) covering the deployment area. Thus, the gNB 3760 has the sequence selection 3704. Once the gNB determines details of synchronization burst occasion, it reconfigures the ongoing traffic to insert synchronization burst timing for the UL/DL timing slots in Sub-THz link. Then, the gNB sends configuration updates 3706, 3708 to both WTRUs and waits for synchronization busts(s).

Upon the reception of synchronization sequence burst(s), the gNB(s) 3760 performs the procedures defined hereinbelow in the section entitled Sequence Selection and Range Estimation to detect the best synchronization sequence and perform range estimation. A priori location information based on OOB link can be used to create coordination among the gNB(s) to select which beam(s) are to be in listening mode for the synchronization burst(s). For example, assuming that the new WTRU transmits synchronization burst(s) 3710 in the UL direction based on OOB link's coarse location and orientation estimations while the selected receive beams are activated in anticipation that the UL synchronization burst(s) can be captured. After completion of the synchronization burst detection and range estimation related measurements with corresponding beam IDs in the network, the best gNB beam, related synchronization burst and the estimated range are identified at 3712. As an outcome, the expected best gNB beam as well as the beam at the WTRU will be activated to establish the Sub-THz/THz band link.

Configuration updates are provided to the existing WTRU via message 3714 and to the emerging WTRU via message 3716. The existing WTRU may send an acknowledgement 3718 and the gNB may resume UL/DL transmissions 3720 to the existing WTRU. The emerging WTRU may acknowledge 3722 the configuration update. The gNB may then start UL/DL transmissions to the emerging WTRU via 3724.

Figure 38:
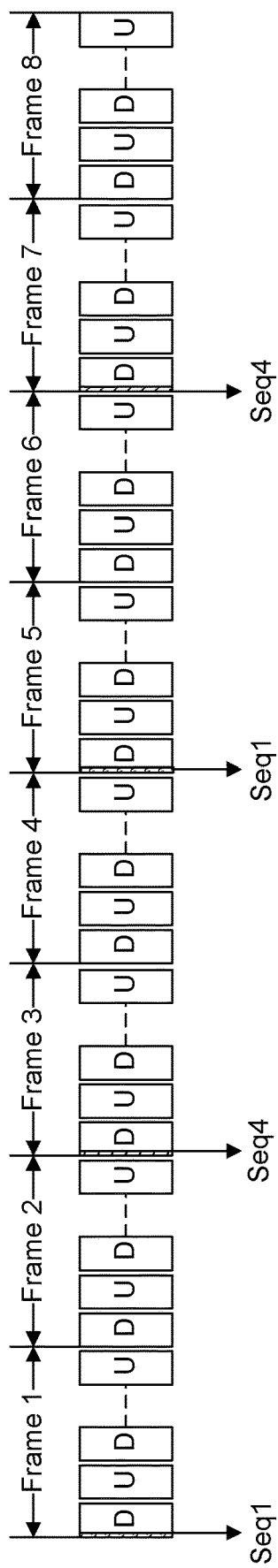
FIG. 38 depicts a two WTRU connected Sub-THz link.

The beam that the emerging WTRU initially used to transmit the synchronization burst(s) at 3710 may not necessarily be the same WTRU beam activated via OOB link. The selected synchronization sequence, for example synchronization sequence 4, will be inserted to the UL/DL slot timing for the new (emerging) WTRU as shown in FIG. 38. The UL/DL slot timing can be configured to indicate the frames with a particular synchronization sequence. For example, the odd frames with synchronization sequence 1 are allocated to the existing WTRU, whereas the even frames with synchronization sequence 4 are allocated the new (emerging) WTRU. The UL/DL slot timing can also be allocated differently to share the same frame among the WTRUs that are paired in the same gNB beam(s).

In other approach to achieve fine timing synchronization in Sub-THz/THz communication between the WTRUs and the network, the OOB link assistance helps determine the best possible beam pairs between the network and the WTRU based on coarse timing and range estimation. Then, a synchronization sequence is created based on the range and transparency window knowledge. The parameters for regeneration of the selected sequence and on-demand initial synchronization timing occasion are transmitted to the WTRU via OOB link assistance. The network or the WTRU transmits the already selected sequence during synchronization timing occasion. Once the WTRU or the network detects the sequence, the initial fine timing synchronization is achieved.

Sequence Selection and Range Estimation

Based on the discussion in the hereinabove background section on transparency window, there are two factors that contribute to the total path loss, the free-space propagation loss and the molecular absorption loss. As expressed in equation (2) hereinabove, the molecular absorption loss is characterized by an absorption coefficient K(f) which is dependent on frequency as well as pressure (p) and temperature (T) of the medium, and the volume density and cross-section absorption of the molecules. We can observe from the example in FIG. 10, that the values for the absorption coefficient is negligible for frequencies below 100 GHz, but they are not for higher frequencies. Therefore, the molecular absorption loss will play a significant role in determining the total path loss and can have a considerable impact on the communication link performance over those high frequencies.

As discussed hereinbelow, the characteristics of the molecular absorption loss are utilized to develop techniques that enable the estimation of the communication range between a transmit and receive units operating at sub-THz frequencies. Either one or combination of the following assumptions are considered for the range estimation procedure.

- The channel bandwidth is much larger than the potential frequency range spanned by path loss peak(s) caused by molecular absorption.
- Sequences considered for range estimation can have a power spectral density that avoids power allocation across the frequency ranges spanned by path loss peak(s), e.g. $C_3$ developed in next section.
- Sequences considered for range estimation can have a power spectral density that focuses power allocation across the frequency ranges spanned by path loss peak(s), e.g. $C_4$ developed in next section.
- Communication range as well as the maximum estimated range supported are designed based on the maximum path loss introduced by the peaks caused by molecular absorption, i.e. the receiver circuitry would still be capable of detecting a signal that has most of its power concentrated around the maximum path loss introduced by molecular absorption loss peaks.

Line-of-sight communication with extremely narrow beams are considered for connection establishment and therefore the only source of randomness at the receiver is noise.

As discussed herein, the problem of beam pairing is not specifically addressed, and it is assumed that transmit and receive beams are already paired. The received signal PSD $P_{rx}(f, d)$ in equation (1) expressed hereinabove may represent a measured quantity for a given, known, transmitted signal PSD $P_{tx}(f)$ where the relationship between distance and molecular absorption $L_A(f, d)$, in linear scale, is described in equation (2) and the propagation loss is defined in log scale as $$L_p(f, d) = 10\alpha \log \frac{4\pi d f}{c} - 10\log G_t G_r \rightarrow \quad (3)$$

where $\alpha$ is the environment-dependent path loss exponent, $G_t$ and $G_r$ are the transmit and receive antenna gains, and c is the speed of light constant. Integrating the expression in (1) over frequency to consider the received signal measured energy and combining with equations (2) and (3), we can write the following distance-dependent relationship for the $i^{th}$ measurement:

$$a_i \log d + b_i \times d = c_i \text{ where } a_i = 20\alpha(f_2 - f_1), b_i = 20\log e \times \int_{f_1}^{f_2} K(f) df$$

$$\text{and } c_i = 2\int_{f_1}^{f_2} \left(P_{tx}^{(i)}(f) - 10\alpha \log \frac{4\pi f}{c} + 10\log G_t G_r\right) df - E_{rx}^{(i)}$$

where $E_{rx}$ is the measured received signal energy and therefore, the term $c_i$ can be obtained using measurements as well as knowledge of the physical characteristics of antenna, signal propagation losses through the channel, and PSD of the transmitted sequence. The coefficient $b_i$ can be determined based on the molecular absorption model and the overall estimated absorption coefficient K(f). The coefficient $a_i$ is dependent on the path loss exponent and the considered transmission bandwidth $(f_2-f_1)$ where $f_1$ and $f_2$ are the lower and upper positive frequency limits within the transmission channel.

It is noted that the aforementioned integral expressions for $a_i$, $b_i$, and $c_i$ assume that the transmitted signal power has a continuous distribution over frequency (i.e. $P_{tx}^{(i)}(f)$ is continuous in frequency f), otherwise, the integral should be split into multiple integrals over regions of continuous power distribution over frequency. Therefore, the coefficients $a_i$, $b_i$, and $c_i$ will be dependent on the PSD of the transmitted sequence on the $i^{th}$ measurement $P_{tx}^{(i)}(f)$. The coefficient $c_i$ will also be dependent on the measurement uncertainties introduced by $E_{rx}^{(i)}$. An estimate for the range d can then be obtained as a solution to the following optimization problem $$\min_d \|\vec{a}\log d + \vec{b} \times d - \vec{c}\|$$

A feasible solution to the optimization problem can then be obtained by solving the following equation for the communication range d $$\vec{a}^T \vec{b} \times d\log d + \|\vec{b}\|^2 \times d^2 + \left(\vec{a}^T \vec{b} - \vec{b}^T \vec{c}\right) \times d = \vec{a}^T \vec{c} - \frac{\|\vec{a}\|^2}{2}$$

where $\vec{a} = [a_1, a_2, \ldots, a_n]^T, \vec{b} = [b_1, b_2, \ldots, b_n]^T, \vec{c} = [c_1, c_2, \ldots, c_n]^T,$ and n represents the number of measurements considered.

As mentioned earlier, the absorption coefficient K (f) is dependent on the type of molecules present in the environment as well as the density of those molecules. Therefore, the following procedure may be developed to determine the type of molecules present in the environment where the following are assumed:

olecular absorption peaks occur at frequencies that are molecule-dependent

A list of the frequencies where molecule-dependent peak losses occur are known a-priori at the receiver.

The type of molecules may then be determined based on the detected frequencies with high molecule absorption according to the following procedure where code structures C2 and C3, discussed in the hereinbelow section entitled Sequence Selection, are utilized.

Figure 39:
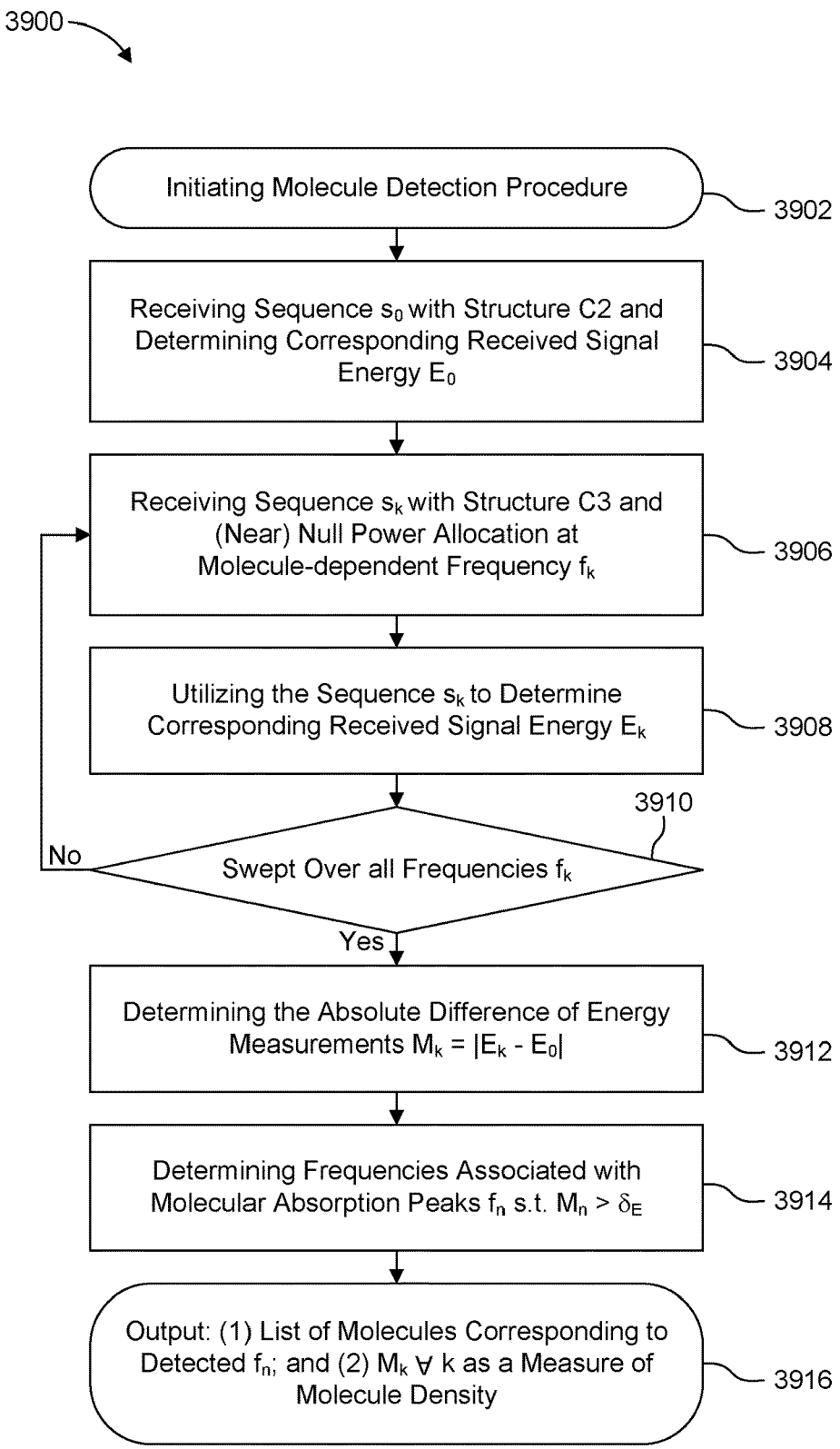
FIG. 39 depicts a flow chart of the molecule detection procedure/algorithm.

In an embodiment, an example molecule detection procedure 3900 may be performed by a WTRU as depicted in FIG. 39. In a system having a base station serving a WTRU, the WTRU initiates the molecule detection procedure in 3902 of FIG. 39. In a first step 3904, a base station (e.g. gNB) transmits and a WTRU receives at 3904 a predefined sequence $s_0$ with structure C2 and the WTRU uses the same sequence $s_0$ to match the received signal and determine a received signal energy $E_0$. In a second step, the base station utilizes the sequence structure C3 according to a predefined schedule to sweep over the apriori known list of molecule-dependent frequencies $f_k \forall k \in \{1, 2, \ldots, K\}$ using sequences $s_k$. The WTRU at 3906 receives sequences $s_k$ with structure C3 and (near) null power allocation at molecule-dependent frequency $f_k$. In a third step 3908, the WTRU follows the same schedule and consecutively utilizes the appropriate sequence $s_k$ to measure a corresponding received signal energy $E_k$. If all frequencies are not swept at 3910, the method of FIG. 39 loops back to 3906. If all frequencies are determined to be swept at 3910, then in a fourth step 3912, the WTRU determines the absolute difference between each of the measurements $E_k$ in the third step and the measurement value $E_0$ in the first step as $M_k = |E_k - E_0|$. In a fifth step 3914, the WTRU determines the frequencies associated with molecular absorption peaks based on determined values $M_k$ in the fourth step being greater than a predefined threshold, i.e. find $f_n$ such that $M_n > \delta_E$. Alternatively, for the case of an expected single peak, the associated frequency is determined based on the largest determined value in the fourth step. At 3916, the WTRU outputs (1) a list of molecules corresponding to the detected $f_n$ and (2) outputs $M_k$ for all k as a measure of molecule density. The molecule detection procedure described is depicted in FIG. 39.

The aforementioned procedure can be repeated multiple times or multiple measurement instances in the first and third steps can be considered to average the impact of noisy measurements. The type of molecules present in the environment can then be determined based on the detected peaks frequencies in the fifth step.

The absolute difference of measurements $M_k$, in the fourth step, is a representative quantity of the molecular absorption losses and is dependent on both the range between transmit-receive pair as well as the density of molecules in the environment/channel. Then, prior knowledge of the range between the transmit-receive pair might be required for the estimation of molecules densities and the corresponding absorption coefficient K(f). Additionally, prior knowledge of the absorption coefficient K(f) is required for range estimation as mentioned above. Therefore, an iterative algorithm can be developed to determine/estimate both the communication range as well as molecules density in the environment.

Figure 40:
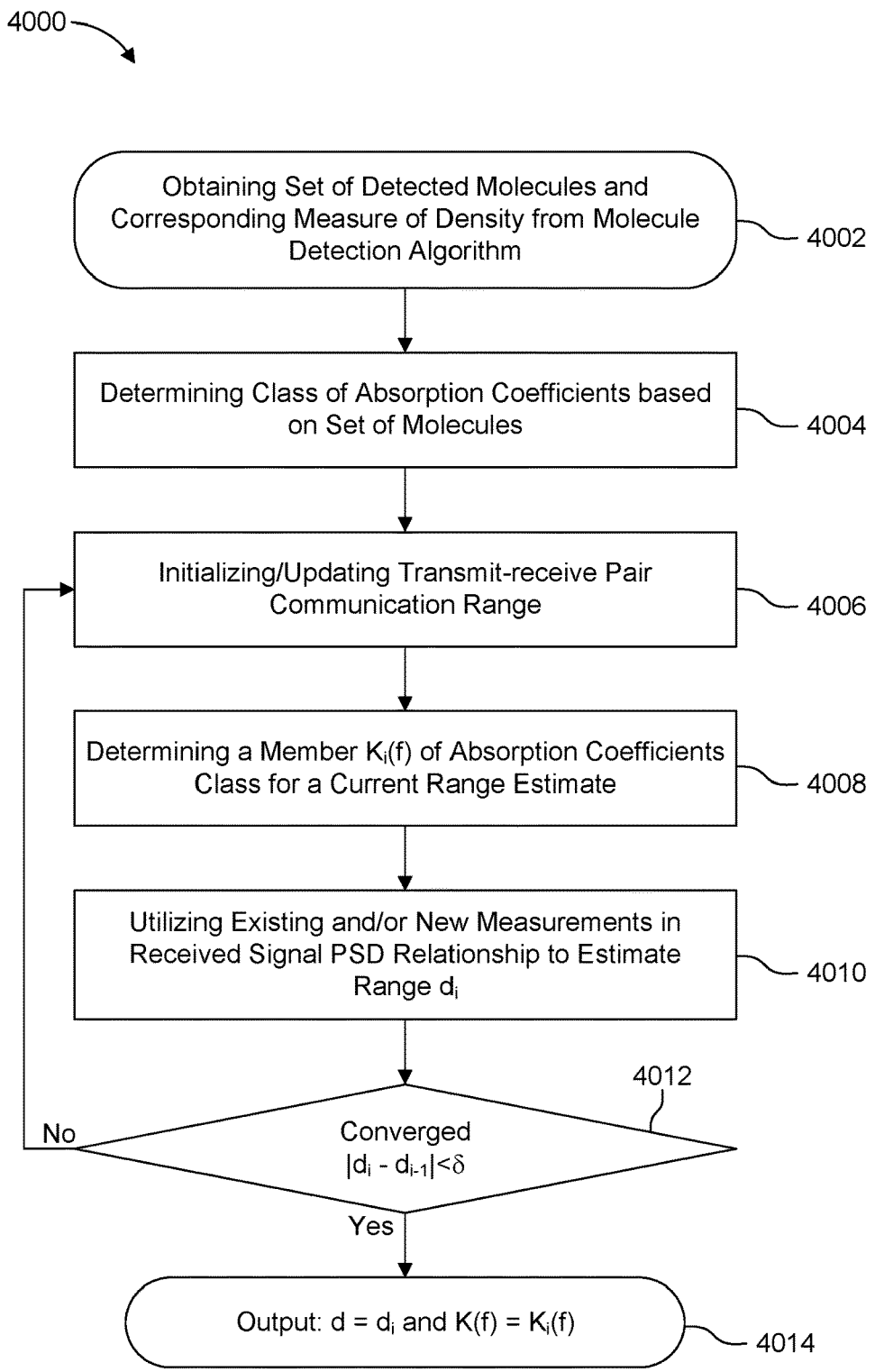
FIG. 40 depicts a flow chart of the range and equivalent molecular absorption coefficient estimation algorithm.
Figure 41:
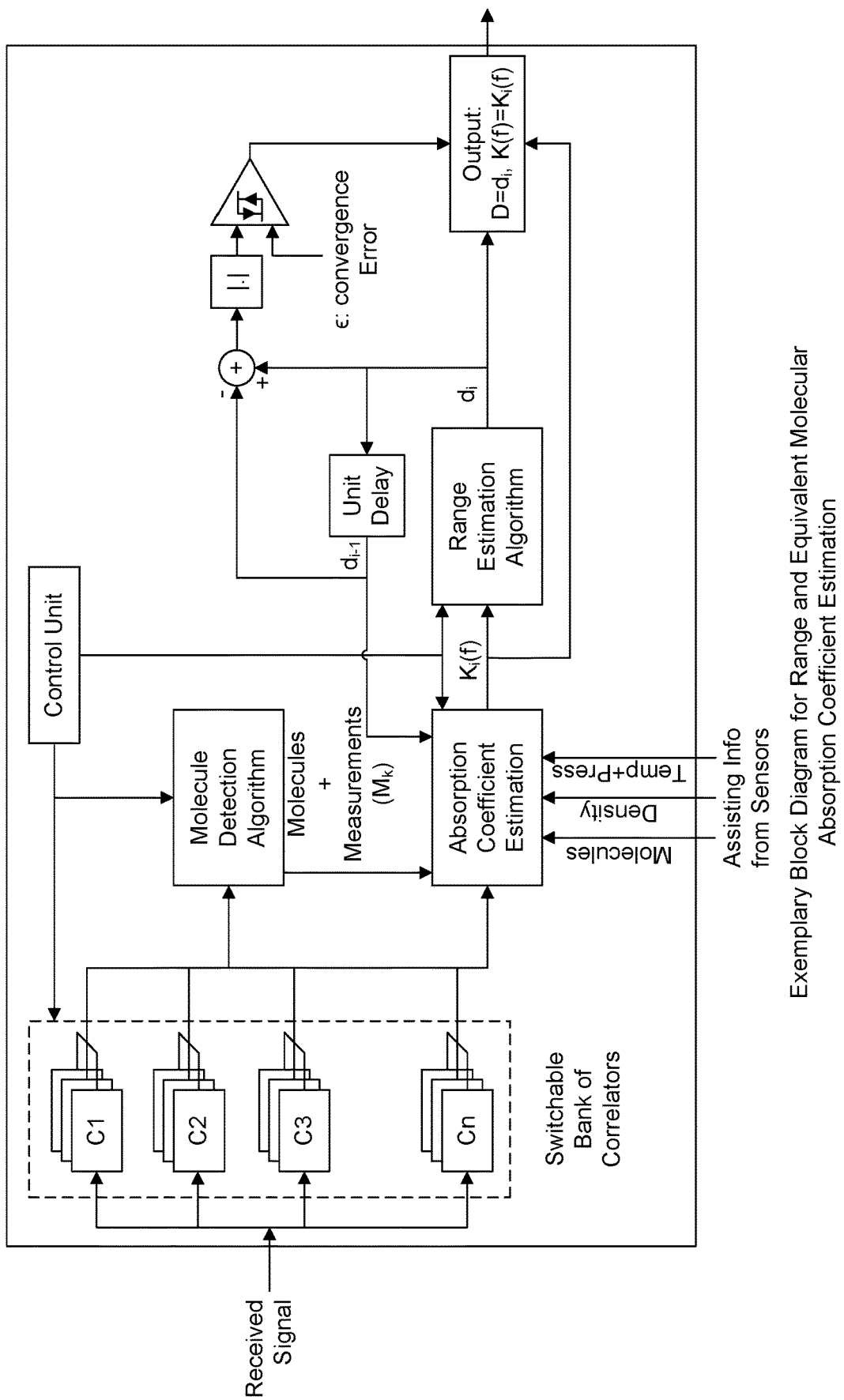
FIG. 41 depicts an exemplary block diagram for range and equivalent molecular absorption coefficient estimation.

In another embodiment method 4000 for a WTRU depicted in FIG. 40, a WTRU starts a procedure at 4002 in FIG. 40 for estimating a range and equivalent molecular absorption coefficients. In a first step at 4004, the WTRU utilizes the detected set of molecules available in the environment to determine a corresponding class of absorption coefficients. The WTRU may also initialize or update the transmit-receive pair communication range at 4006. In a second step 4006, the WTRU utilizes the absolute difference of measurements $M_k$, at the $i^{th}$ iteration, to determine a member $K_i(f)$ of the class for a specific range estimate where the range estimate can be initialized in a first iteration based on the maximum supported distance or based on an initial estimate that is provided by an OOB link. In a third step 4010, the WTRU utilizes a set of energy measurements in combination with the received signal PSD relationship to free-space and molecular absorption path losses to estimate/optimize for the transmit-receive pair communication range. The set of measurements utilized in the third step may be the $E_0$ and $E_k \forall k$ discussed in the first and third steps of molecule detection procedure in FIG. 39 and/or any other set of measurements that are particular to range estimation. In a fourth step 4012, the WTRU checks for convergence criteria e.g. absolute difference between current and last range estimate is less than some predefined threshold. In a fifth step, on the condition that convergence criteria fails, the WTRU repeats steps 1 through 5. Otherwise, in a fifth step 4014, the algorithm concludes and a final estimate of the communication range as well as the environment equivalent absorption coefficient K(f) is determined. A flow chart of the algorithm developed in this embodiment is depicted in FIG. 40. An exemplary block diagram of range and equivalent molecular absorption coefficient is also shown in FIG. 41.

In the molecule detection procedure, depicted in FIG. 39, the roles of the WTRU and serving base station can be reversed such that the serving base station is the entity that will perform the molecule detection process. In this case, the serving base station might allocate (nearly) orthogonal sequences to multiple WTRUs within the same code structures C2 and C3 and utilize measurements from the different WTRUs, that might be located at various ranges from the base station, to improve the detection of molecules in the environment.

In an embodiment, a WTRU receives a request from the serving base station to initiate molecule detection procedure in a first step. The WTRU then receives parameters that can be used to determine the sequences that will be used in the molecule detection process, e.g. an index/seed of an initial sequence with structure C2 and another for structure C3, number of sequences utilized within each structure, and separation between any two consecutive indices/seeds for the sequences of each structure. The WTRU might also receive the schedule it should follow in the transmission of the identified sequences. In a second step, the WTRU transmits the identified sequences with structures C2 and C3 according to the signaled or pre-configured schedule. In a fourth step, the serving base station utilizes the received signals from multiple WTRUs, that might be multiplexed in time as per a configured schedule or in code domain as per configured sequences, to measure the per-WTRU received signal energy associated with sequences from structure C2, $E_{c2}^{(i,j)}$ for the $i^{th}$ WTRU and $j^{th}$ sequence within structure C2, and structure C3 with a list of identified frequencies $f_k$, $E_{c3,k}^{(i,j)}$. In a fifth step, the BS utilizes the set of measurements $E_{c2}^{(i,j)}$ and $E_{c3,k}^{(i,j)}$ to detect frequencies associated with molecular absorption peaks and identify the corresponding list of molecules in the environment. The BS can then pass the detected set of molecules as well as the energy measurements to the range and absorption coefficient estimation algorithm in FIG. 40 where the BS tries to estimate a single distance-independent molecule absorption coefficient K(f), but instead of trying to estimate a single range for a single WTRU, it tries to estimate a vector of ranges $\vec{d}$.

Sequence Design

Figure 42:
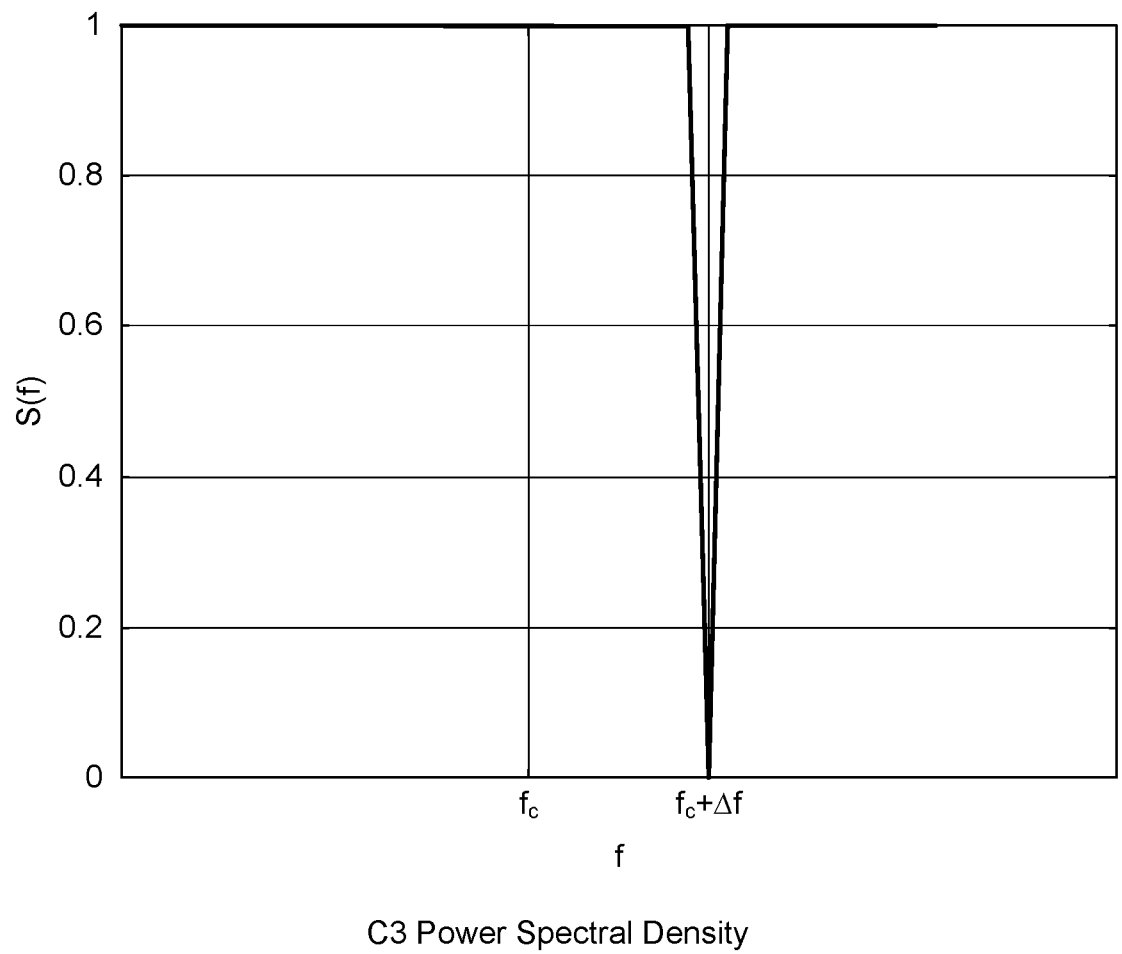
FIG. 42 depicts a C3 Power Spectral Density.
Figure 43:
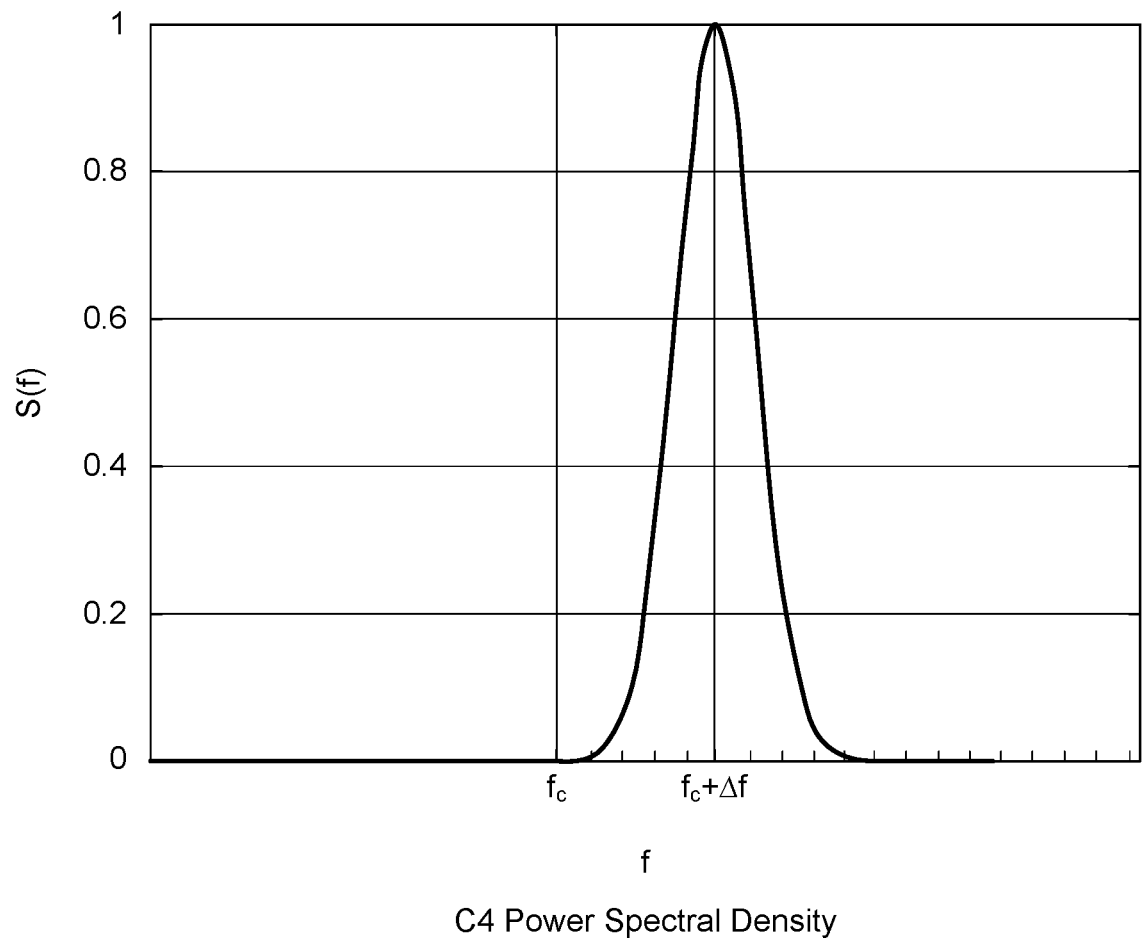
FIG. 43 depicts a C4 Power Spectral Density.

Table 3 is an example sequence design where all of the sequences have the same total power. Table 3 refers to a C3 power spectral density depicted in FIG. 42 and a C4 power spectral density depicted in FIG. 43. Table 4 is an example code utilization comparison.

TABLE 3

Sequence Design Showing Sequences Having Same Total Power

| C1 | C2 | C3 | C4 |
|---|---|---|---|
| Pilot with power spectral density concentrated on lower band edge | Power spectral density is flat across the band | Across the band with a notch based on transparency window (FIG. 42) | Across the band with a resonance based on transparency window (FIG. 43) |
| 2-level m-sequence with OOK, BPSK Complex QPSK sequence | 2-level chirp m-sequence with OOK, BPSK | Complex QPSK sequence | Complex QPSK sequence |

TABLE 1

Code utilization comparisons

| Task | Code used | Complexity | Energy penalty | Detection latency | Comments |
|---|---|---|---|---|---|
| Frame synchronization | C1 | lowest | Lowest | High with a single correlator, OK with correlator bank | |
| Range estimation | C2, C3, C4 C1 | high | high | low | N/A |
| | C2 and C3 | low | low | high | Sensitivity is low |
| | C3 and C4 | high | high | low | Sensitivity is high (Most accurate) |

Figure 44:
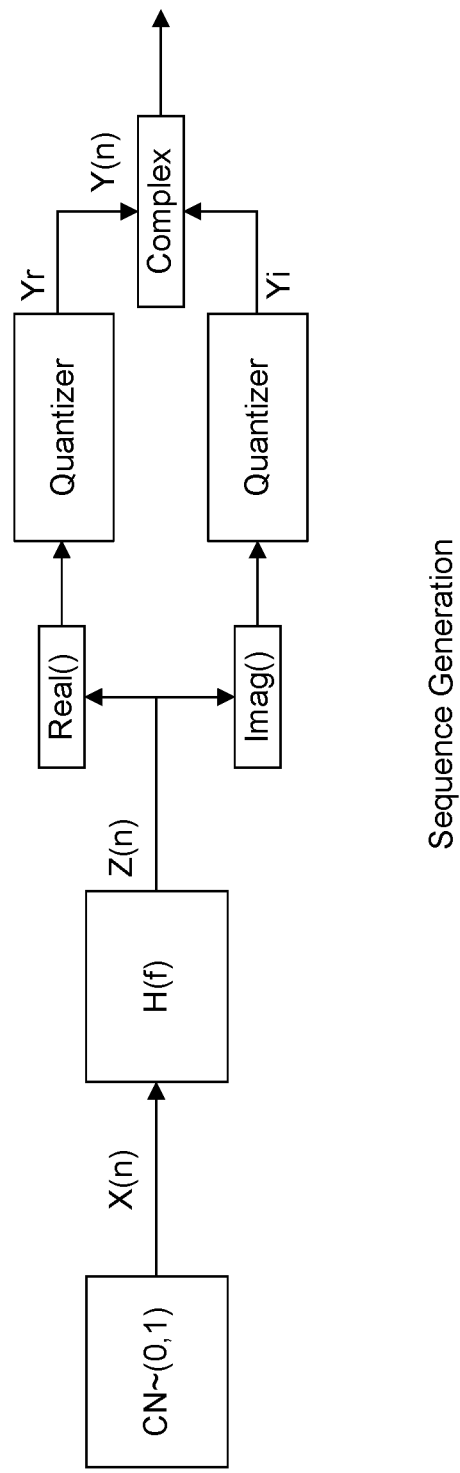
FIG. 44 depicts a sequence generation example block diagram.

To generate the designated sequences, the architecture in FIG. 44 is used. First, zero-mean, unity variance complex gaussian N i.i.d samples are generated with power spectral density (PSD)

$$S_{xx}(f)=1.$$

These samples are then passed through the shaping filter H (f) where $|H(f)|^2$ is the designated autocorrelation needed, and thus the filter output PSD becomes $$S_{zz}(f)=|H(f)|^2 S_{xx}(f)=|H(f)|^2.$$

The real and imaginary parts of the filter output will then be quantized to ±1 as $$y_r = \begin{cases} 1 & \Re\{z(n)\} \geq 0 \\ -1 & R\{z(n)\} < 0 \end{cases}$$

and $$y_i = \begin{cases} 1 & \Im\{z(n)\} \geq 0 \\ -1 & T\{z(n)\} < 0 \end{cases}$$

Figure 45:
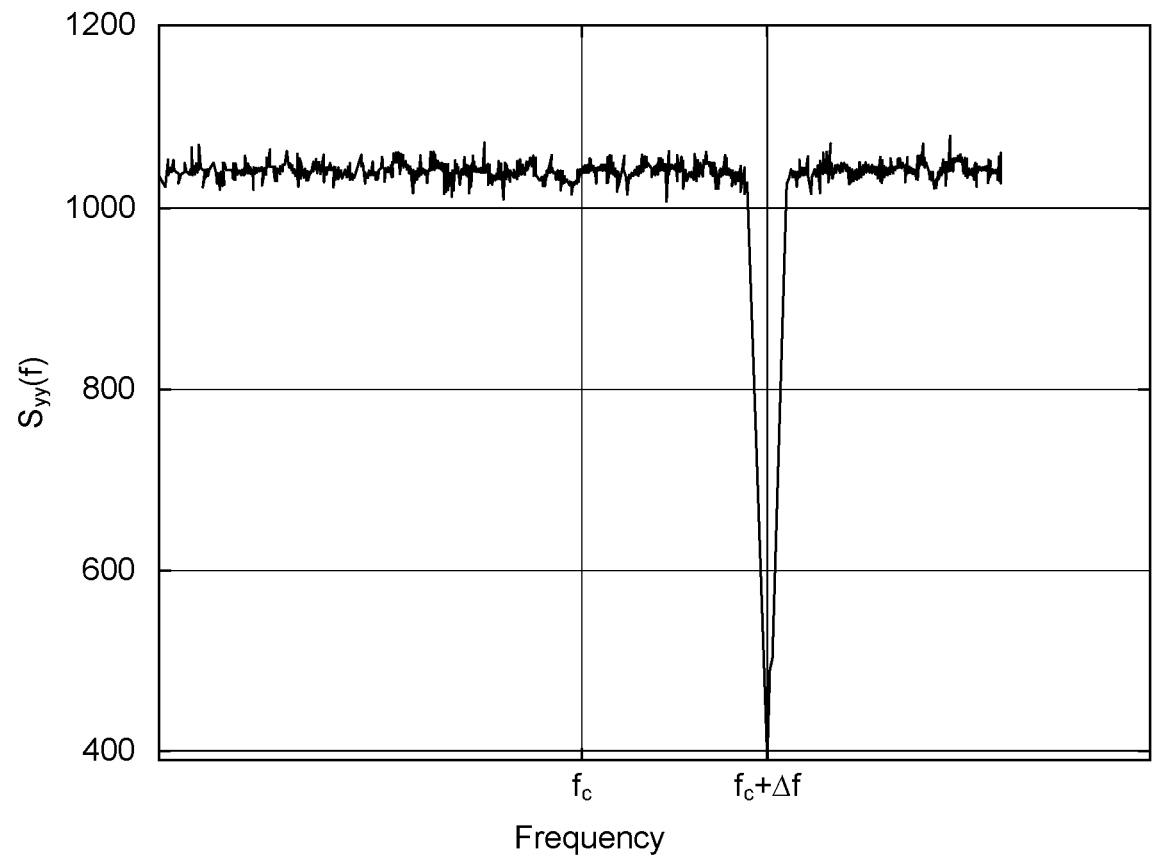
FIG. 45 depicts the power spectral density of a generated QPSK code that has the shaping of C3.
Figure 46:
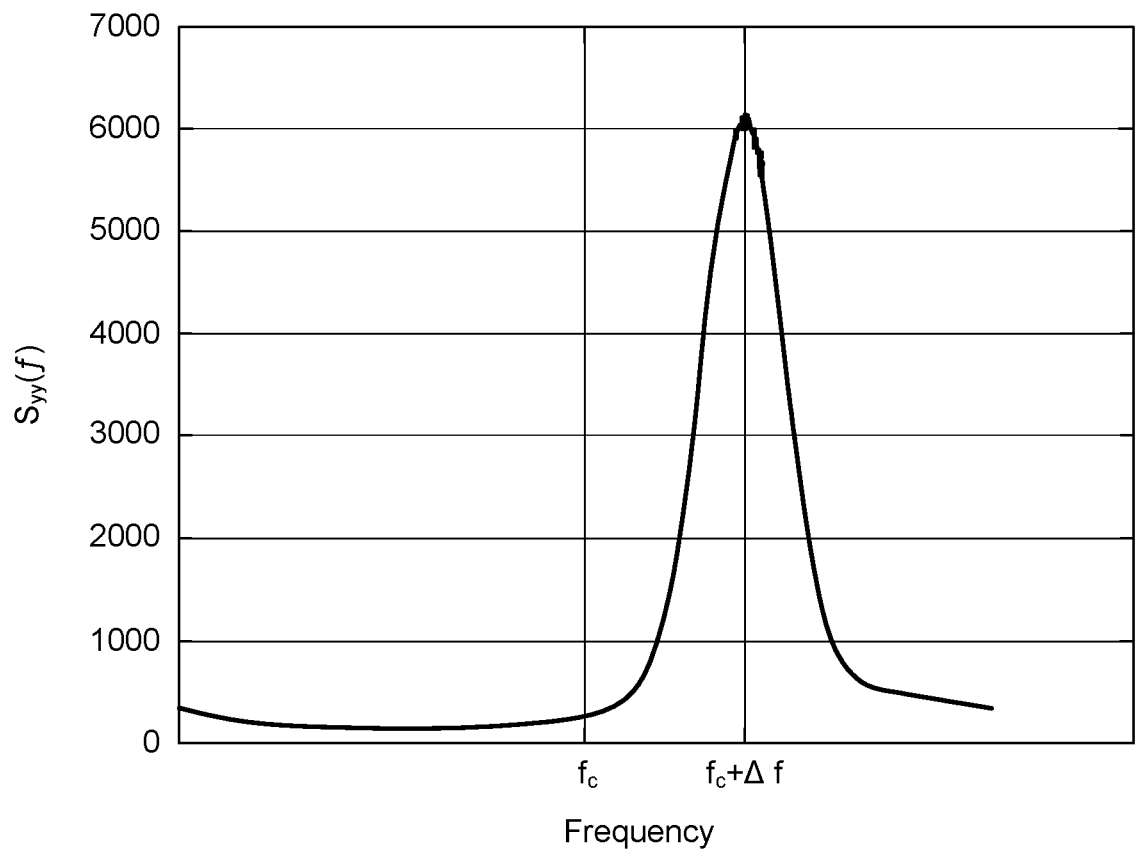
FIG. 46 depicts the power spectral density of a generated QPSK code that has the shaping of C4.

FIG. 45 and FIG. 46 and show the PSDs of QPSK generated codes that were shaped by C3 and C4 PSDs respectively. The dip of C3 and the peak of C4 could be tuned by making H (f) tunable or by multiplying the output of the filter (in time) by a phase that captures the frequency shift. Also, the width of the dip of C3 and the width of C4 can be changed by tuning the width of H (f). For the generated code that resembles C3, the ratio between the maximum and the minimum does not depend on the code length but on the quantization level. So, if we quantize the filter output using 4-levels quantizer, the ratio will increase.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the methods, apparatuses and systems provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM")) or non-volatile (e.g., Read-Only Memory (ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

What is claimed:

1. A method performed by a wireless transmit/receive unit, WTRU, for initial timing synchronization to communicate with a network, the method comprising:
receiving an in-channel narrowband synchronization sequence from the network to perform initial coarse timing synchronization;
determining coarse timing offset and a range estimation between a beam source of a network transmitter and the WTRU by using the received in-channel narrowband synchronization sequence;

selecting a wideband sequence for a fine timing synchronization using the range estimation, the selected wideband sequence matching a spectral profile of the channel;

transmitting the selected wideband sequence during an uplink timing occasion to the network; and receiving a verification of the selected wideband sequence from the network.

2. The method of claim 1, wherein determining the coarse timing offset and the range estimation comprises determining the range estimation by examining an in-channel narrowband sequence correlation output of the received in-channel narrowband synchronization sequence.

3. The method of claim 1, wherein selecting a wideband sequence that matches a spectral profile of the channel comprises a wideband communication channel spectral profile that describes the location of molecular absorption peaks in an operational channel.

4. The method of claim 1, wherein receiving the selected wideband sequence from the network completes a fine timing synchronization for the WTRU.

5. The method of claim 1, wherein selecting the wideband sequence further includes using information of a frequency span of transparency windows.

6. The method of claim 5, wherein the information of the frequency span of transparency windows comprises location information that indicates molecular absorption frequencies and relevant range dependent losses.

7. The method of claim 1, wherein transmitting the selected wideband sequence comprises transmitting the selected sequence after a configured offset time related to the received in-channel narrowband synchronization sequence.

8. The method of claim 1, wherein receiving the in-channel narrowband synchronization sequence from the network occurs in sub-terahertz to terahertz frequency bands.

9. A wireless transmit/receive unit, WTRU, comprising circuitry, including a transmitter, a receiver, a processor, and memory, configured to:

receive an in-channel narrowband synchronization sequence from the network to perform initial coarse timing synchronization with the WTRU;

determine a coarse timing offset and a range estimation between a beam source of a network transmitter and the WTRU by using the received in-channel narrowband synchronization sequence;

select a wideband sequence for a fine timing synchronization using the range estimation, the selected wideband sequence matching a spectral profile of the channel;

transmit the selected wideband sequence during an uplink timing occasion to the network; and receive a verification of the selected wideband sequence from the network.

10. The WTRU of claim 9, the wherein the WTRU determination of the coarse timing offset and the range estimation comprises the range estimation determined by examining an in-channel narrowband sequence correlation output of the received in-channel narrowband synchronization sequence.

11. The WTRU of claim 9, wherein the spectral profile describes locations of molecular absorption peaks in an operational channel.

12. The WTRU of claim 9, wherein the WTRU reception of the selected wideband sequence from the network completes a fine timing synchronization for the WRTU.

13. The WTRU of claim 9, wherein the wideband sequence is selected using information of a frequency span of transparency windows.

14. The WTRU of claim 13, wherein the transparency window location information indicates molecular absorption frequencies and relevant range dependent losses.

15. The WTRU of claim 9, wherein the the selected wideband sequence is transmitted after a configured offset time related to the received in-channel narrowband synchronization sequence.

16. The WTRU of claim 9, wherein the in-channel narrowband synchronization sequence from the network occurs in sub-terahertz to terahertz frequency bands.

17. The WTRU of claim 9, wherein the beam source of the network transmitter and a WTRU receiver are reciprocal.

18. A non-transient computer readable storage medium comprising instructions which when executed by a computer cause the computer to carry out the method of:

receiving an in-channel narrowband synchronization sequence from the network to perform initial coarse timing synchronization;

determining coarse timing offset and a range estimation between a beam source of a network transmitter and the WTRU by using the received in-channel narrowband synchronization sequence;

selecting a wideband sequence for a fine timing synchronization using the range estimation, the selected wideband sequence matching a spectral profile of the channel;

transmitting the selected wideband sequence during an uplink timing occasion to the network; and receiving a verification of the selected wideband sequence from the network.

19. The non-transient computer readable storage medium of claim 18, wherein determining the coarse timing offset and the range estimation comprises determining the range estimation by examining an in-channel narrowband sequence correlation output of the received in-channel narrowband synchronization sequence.

20. The non-transient computer readable storage medium of claim 18, wherein selecting a wideband sequence that matches a spectral profile of the channel comprises a wideband communication channel spectral profile that describes the location of molecular absorption peaks in an operational channel.

* * * * *

UNITED STATES PATENT AND TRADEMARK OFFICE
CERTIFICATE OF CORRECTION

PATENT NO. : 12,206,543 B2
APPLICATION NO. : 17/795773
DATED : January 21, 2025
INVENTOR(S) : Demir et al.

Page 1 of 1

It is certified that error appears in the above-identified patent and that said Letters Patent is hereby corrected as shown below:

In the Claims

In Claim 15: Column 48, Line 17, delete "the the" and insert -- the --.

Signed and Sealed this
Sixth Day of May, 2025

Coke Morgan Stewart
*Acting Director of the United States Patent and Trademark Office*